(12) United States Patent
Yencho

(10) Patent No.: US 7,862,728 B2
(45) Date of Patent: Jan. 4, 2011

(54) ULTRAVIOLET WATER PURIFICATION SYSTEM

(75) Inventor: Stephen A. Yencho, Menlo Park, CA (US)

(73) Assignee: Water of Life, LLC., Menlo Park, CA (US)

( * ) Notice: Subject to any disclaimer, the term of this patent is extended or adjusted under 35 U.S.C. 154(b) by 0 days.

(21) Appl. No.: 11/862,631

(22) Filed: Sep. 27, 2007

(65) Prior Publication Data

US 2009/0084734 A1    Apr. 2, 2009

(51) Int. Cl.
C02F 1/46 (2006.01)
(52) U.S. Cl. .................... 210/748.01; 422/22
(58) Field of Classification Search .............. 210/169, 210/178, 748, 178.01; 250/436, 437, 438; 422/22
See application file for complete search history.

(56) References Cited

U.S. PATENT DOCUMENTS

| | | | |
|---|---|---|---|
| 1,196,481 A | 8/1916 | Von Recklinghausen et al. |
| 1,200,940 A | 10/1916 | Henri et al. |
| 1,307,500 A | 6/1919 | Keyes et al. |
| 1,473,095 A | 11/1923 | Henri et al. |
| 2,504,349 A | 4/1950 | Prieto |
| 3,671,741 A | 6/1972 | Woodbridge et al. |
| 3,836,781 A | 9/1974 | Ellison |
| 3,903,000 A | 9/1975 | Miura et al. |
| 3,924,139 A | 12/1975 | Hirose et al. |
| 4,103,167 A | 7/1978 | Ellner |
| 4,304,996 A | 12/1981 | Blades |
| 4,336,223 A | 6/1982 | Hillman |
| 4,372,860 A | 2/1983 | Kaas |
| 4,400,270 A | 8/1983 | Hillman |

(Continued)

FOREIGN PATENT DOCUMENTS

KR    836720 B1 *    6/2008

OTHER PUBLICATIONS

International Search Report dated Jan. 26, 2009 and Written Opinion of the International Searching Authority dated Feb. 15, 2009.

(Continued)

*Primary Examiner*—Walter D Griffin
*Assistant Examiner*—Cameron J Allen
(74) *Attorney, Agent, or Firm*—Haynes & Boone, LLP

(57) ABSTRACT

An Ultraviolet-C (UVC) based portable water purification system employing a novel array of baffles increases the efficiency per unit energy of irradiating UVC light in the eradication of pathogens in the water. Closed loop feedback allows monitoring the application of UVC light power to ensure high levels of pathogen eradication. This system is capable of eradicating a wide range of waterborne bacteria, viruses, protozoa, helminthes, yeast, and mold found in natural freshwater sources worldwide. By adding pre- or post-filters, the system can remove harmful organic compounds, pesticides, inorganic compounds and heavy metals from the water. The system can also be used to eradicate pathogens in fluids other than water. As a feature of this invention, a communications systems that can reach geographically dispersed populations at low cost without the need to install costly wired communications infrastructure is combined with and powered by the water purification system. In one embodiment, a packet radio system is provided to create nodes in a wireless mesh communications system to provide voice, data, video and internet communications using an array of the water purifiers to create a wireless mesh network.

40 Claims, 58 Drawing Sheets

U.S. PATENT DOCUMENTS

| | | | |
|---|---|---|---|
| 4,471,225 A | | 9/1984 | Hillman |
| 4,482,809 A | | 11/1984 | Maarschalkerweerd |
| 4,609,900 A | * | 9/1986 | Bachhofer et al. ............ 336/58 |
| 4,629,896 A | | 12/1986 | Bridgen |
| 4,757,205 A | | 7/1988 | Latel et al. |
| 4,849,115 A | | 7/1989 | Cole et al. |
| 4,897,246 A | | 1/1990 | Peterson |
| 4,899,057 A | | 2/1990 | Koji |
| 4,909,931 A | | 3/1990 | Bibi |
| 4,952,376 A | | 8/1990 | Peterson |
| 4,968,437 A | * | 11/1990 | Noll et al. .................. 210/748 |
| 4,968,489 A | | 11/1990 | Peterson |
| 5,030,125 A | | 7/1991 | Toma et al. |
| 5,037,618 A | | 8/1991 | Hager |
| 5,178,758 A | | 1/1993 | Hwang |
| 5,208,461 A | | 5/1993 | Tipton |
| 5,227,053 A | | 7/1993 | Brym |
| RE34,513 E | | 1/1994 | Ellner |
| 5,352,359 A | | 10/1994 | Nagai et al. |
| 5,366,705 A | | 11/1994 | Reidy |
| 5,393,419 A | * | 2/1995 | Tiede et al. ................. 210/192 |
| 5,418,370 A | | 5/1995 | Maarschalkerweerd |
| 5,503,800 A | | 4/1996 | Free |
| 5,504,335 A | | 4/1996 | Maarschalkerweerd |
| 5,516,492 A | | 5/1996 | Dong et al. |
| 5,635,133 A | | 6/1997 | Glazman |
| 5,655,483 A | | 8/1997 | Lewis et al. |
| 5,660,719 A | | 8/1997 | Kurtz et al. |
| 5,683,589 A | | 11/1997 | de Lasa et al. |
| 5,707,594 A | | 1/1998 | Austin |
| 5,780,860 A | | 7/1998 | Gadgil et al. |
| 5,785,845 A | * | 7/1998 | Colaiano ................. 210/167.3 |
| 5,790,934 A | | 8/1998 | Say et al. |
| 5,846,437 A | | 12/1998 | Whitby et al. |
| 5,952,663 A | | 9/1999 | Blatchley, III et al. |
| 6,015,229 A | | 1/2000 | Cormack et al. |
| 6,039,460 A | | 3/2000 | Ng et al. |
| 6,083,387 A | | 7/2000 | LeBlanc et al. |
| 6,099,799 A | | 8/2000 | Anderson |
| 6,126,841 A | | 10/2000 | Whitby et al. |
| 6,129,893 A | | 10/2000 | Bolton et al. |
| 6,144,175 A | | 11/2000 | Parra |
| 6,193,894 B1 | | 2/2001 | Hollander |
| 6,200,466 B1 | | 3/2001 | Bender |
| 6,224,759 B1 | | 5/2001 | Whitby et al. |
| 6,303,086 B1 | | 10/2001 | Heimer |
| 6,332,981 B1 | | 12/2001 | Loyd |
| 6,461,520 B1 | * | 10/2002 | Engelhard et al. ........... 210/748 |
| 6,500,346 B1 | | 12/2002 | Taghipour et al. |
| 6,533,930 B1 | | 3/2003 | Kool et al. |
| 6,565,803 B1 | | 5/2003 | Bolton et al. |
| 6,614,039 B2 | | 9/2003 | Hollander |
| 6,773,584 B2 | | 8/2004 | Saccomanno |
| 6,773,608 B1 | | 8/2004 | Hallett et al. |
| 6,784,440 B2 | | 8/2004 | Fink et al. |
| 6,803,587 B2 | | 10/2004 | Gadgil et al. |
| 6,875,988 B1 | | 4/2005 | Sauska et al. |
| 6,932,903 B2 | | 8/2005 | Chang |
| 6,972,415 B2 | * | 12/2005 | Schaible et al. ............. 250/436 |
| 6,974,958 B2 | | 12/2005 | Gadgil et al. |
| 6,976,508 B2 | | 12/2005 | Ueberall |
| 7,018,544 B2 | | 3/2006 | Veenstra et al. |
| 7,031,849 B2 | | 4/2006 | Lawryshyn et al. |
| 7,077,965 B2 | | 7/2006 | Williamson et al. |
| 7,081,225 B1 | | 7/2006 | Hollander |
| 7,217,933 B2 | | 5/2007 | Gadgil et al. |
| 2005/0145552 A1 | * | 7/2005 | Sheets ........................ 210/192 |
| 2007/0051901 A1 | * | 3/2007 | Hopaluk et al. ............. 250/436 |

OTHER PUBLICATIONS

Ajay K. Ray & Antonie A.C.M. Beenackers, Novel Photocatalytic Reactor for Water Purification, Environmental and Energy Engineering, AIChE Journal, Feb. 1998, vol. 44, No. 2, p. 477-483.

Elster AMCO Water, Inc. Evolution—Migratability, 2007 by Elster.

US EPA, Guide Standard and Protocol for Testing Microbiological Water Purifiers, Report of Task Force, Submitted Apr. 1996.

Aquafine Corporation SL Series Installation, Maintenance, and Operation Manual Part No. 108-1, Revised Oct. 2003.

Cryptosporidium Inactivation by Low-Pressure UV in a Water Disinfection Device, A.C. Drescher, D.M. Greene and A.J. Gadgil, Journal of Environmental Health, Oct. 2001.

UV Waterworks 2.0: Answers to Ten Commonly Asked Questions about the Design, operation, and economics. Ashok Gadgil, Indoor Environment program Energy & Environment Division Lawrence Berkeley National Laboratory, Nov. 1995.

* cited by examiner

ULTRAVIOLET WATER PURIFICATION SYSTEM

FIELD OF THE INVENTION

This invention relates to the purification of fluids and particularly to the purification of water. Embodiments of this invention relate to the combination of water purification systems with communication systems.

BACKGROUND

The leading cause of death in the world today is waterborne disease. Over 2.3 billion people worldwide suffer from diseases linked to water, with 300 million people critically ill and 2.2 million people dying every year, mostly children below five years of age[1]. The majority of these people are living on less than two dollars per day, severely limiting the range of technologies they can afford for water purification.

[1] United Nations Task Force on Water and Sanitation 2003

At the same time, nations worldwide are using greater percentages of their freshwater resources every year, reducing the availability of safe drinking water and increasing the need for effective water purification systems. The United Nations Population Fund projects that in 2025, if present rates of water consumption are maintained, 5 billion of the world's projected 7.9 billion person population will live in areas where safe water is scarce.

Much of the unmet need for drinking water occurs in developing countries. The average per capita water consumption in the developing world is 2 gallons (7.6 liters) per person per day. For a typical 1000 person village in the developing world, the drinking water requirement is 2000 gallons (7600 liters) per day. Many existing UVC water purifying systems are designed for individual users or for small groups of people and therefore have too low of flow rate to supply this daily volume of water. The price per gallon of many of these small systems is too high to make them practical for use in developing countries.

Other water purification systems are intended to be used as fixed infrastructure for urban areas with much larger water volume and are often too expensive to be deployed in rural areas, especially since the rural areas in the developing world often lack the reliable electric power required for these large plants to operate. The present invention is intended for areas where large metropolitan water purification plants are cost ineffective. One embodiment of the water purification system is portable and lightweight, allowing it to be easily transported to remote areas or to be used in disaster relief or to be rapidly deployed in emergencies.

Existing Drinking Water Purification Techniques and Systems

Many natural drinking water sources are contaminated with waterborne pathogens. Lakes, rivers, and streams worldwide commonly contain bacteria, viruses, and protozoa which can cause serious health problems. Even dug wells and tube wells, which are commonly used as drinking water sources worldwide, can be contaminated by groundwater during the rainy season in many parts of the world when surface water contaminates the well introducing waterborne pathogens. If the tube well is poorly constructed or poorly maintained, contaminated groundwater can seep into the well on a more regular basis.

Many water purification techniques exist ranging from simple and inexpensive to very sophisticated and expensive, with a resulting wide range of levels of effectiveness in treating waterborne pathogens, organic contaminants, and inorganic contaminants. One simple and common technique is to boil the water. For many parts of the world, boiling is impractical for everyday use because of the significant amount of energy required and because of the possibility that the water will not be heated to a full boil or heated for too short a time so as not to inactivate or kill the waterborne pathogens. Boiling also increases the concentration of heavy metals already present in the water due to water loss during the boiling process.

A more recently developed technique is solar water disinfection, or SODIS. Unlike boiling, SODIS relies only on solar energy to disinfect the water. SODIS is a simple method to inactivate or kill pathogens using a combination of solar heat and sunlight. SODIS is used with 1 to 2 liter plastic bottles, preferably made of polyethylene terephalate and preferably painted black on the non-sunlit back surface of the bottles. The bottles are completely filled with water and placed on a corrugated steel sheet in the sun. SODIS requires the water to attain a temperature of 60° C. to 80° C. for a minimum of 4 hours to remove the pathogens. Under cloudy conditions, the bottles must be placed in the sun for two consecutive days. SODIS is very inexpensive to implement, but is not as effective against viruses and protozoa. SODIS processed water is not recommended for infants less than 18 months or for people with chronic gastrointestinal illness. The quality of the purified water is very difficult to control. The technique does not work as well with even partial shade. SODIS does not kill protozoa such as *cryptosporidium parvum* oocysts.

Other more advanced water purification systems are readily available but have limitations as well. Both iodine and chlorine are effective at eradicating most bacteria, viruses, and protozoa. However, *cryptosporidium parvum* is one of several chlorine-resistant pathogens which is increasing in importance. *Cryptosporidium parvum* is an intestinal parasite that can be life threatening to infants, the elderly and people with compromised immune systems. Typically, it takes about seven days for symptoms of cryptosporidiosis to appear, long after the initial exposure occurred. The illness often can last up to two weeks. Removing protozoa like *cryptosporidium parvum* oocysts and *giardia* with chlorine purification is difficult because it requires a high product of chlorine concentration and application time. Since adding too much chlorine to drinking water can cause organ damage or death in humans, the concentration of chlorine that can be used to disinfect the water is limited. Therefore, the time required for chlorine disinfection of cryptosporidium is often prohibitive.

Chlorine has been shown to produce hazardous trihalomethanes when it is added to water with organic contaminants, as is typically found in natural sources such as rivers, lakes and streams. Trihalomethanes are also environmental pollutants, and many such as chloroform are considered carcinogenic. Additionally, chlorine is ineffective if the pH of the water is below 7.5. If the chlorine is from a bleach bottle more than six months old, it loses its potency.

Both iodine and chlorine can cause side effects in humans if used for an extended time. Iodine treated drinking water is not suitable for pregnant women or women over age 50 or people with thyroid problems.

Many modern water purification systems use chloramines instead of chlorine, adding increased sophistication to the treatment systems.

Chlorine dioxide is also used as a purification agent that kills most bacteria, viruses and protozoa. Due to the explosion hazard, it is typically manufactured at the point of use, increasing purification system complexity and expense.

Chlorine dioxide purification produces reaction by-products, the toxicity of which is unknown.

Ozone is the most effective disinfectant for all types of pathogens in drinking water. It leaves minimal or no residue in the water. However, ozonation systems are expensive to implement.

Other approaches rely on advanced ceramics or membranes instead of disinfectants to filter pathogens from the water. Ceramic filters are effective for filtering protozoa, but may clog easily due to particulates in the water. Typical ceramic filter elements have pores from 2 to 5 microns in size. Since bacteria such as cholera and *salmonella* are typically between 0.2 and 1.0 microns in size, bacteria pass through many of these filters. Viruses such as Hepatitis A and B, rotavirus, and the Norwalk virus are typically below 0.004 microns in size, allowing them to pass easily through the ceramic filter element. These viruses and some bacteria may even penetrate reverse osmosis purifiers.

Reverse osmosis (RO) water purifiers are capable of rejecting bacteria, salts, sugars, proteins, particles, dyes, heavy metals, chlorine and related byproducts, and other contaminants with a molecular weight greater than 150-250 daltons. The reverse osmosis systems require pressurized water that is not available in many parts of the developing world. Reverse osmosis membranes may foul unless the incoming water is carefully filtered before the reverse osmosis system. The RO systems may also need water softening equipment upstream of the RO purifier where the water has high mineral content (hard water) to prevent membrane fouling.

There are two primary types of RO membrane: Thin Film Composite (TFC) and Cellulose Triacetate (CTA). TFC membranes filter out more contaminants than CTA membranes, but they are more susceptible to damage by chlorine. Since the RO membranes are subject to degradation by chlorine, iron, manganese, hydrogen sulfide, and to bacterial attack, a sediment filter and a granular activated carbon (GAC) pre-filter is often used ahead of the RO system. Additional treatment such as GAC is needed for volatile organic compounds such as benzene, MTBE, trichloroethylene, trihalomethanes, and radon.

The RO process is fairly slow and may require from 3 to 10 gallons (11.4 to 38 liters) of untreated water for each gallon (3.8 liters) of purified water, making it problematic for use in areas where water is scarce. RO water treatment is not recommended for use without secondary treatment such as UV treatment for water that may contain biological contaminants such as viruses and bacteria.

UVC purifiers work by irradiating the pathogens in the water, usually with low pressure mercury lamp(s) which emit a 253.7 nm peak wavelength. Other UVC systems are based on medium pressure mercury lamps. Many different types of UVC water purification systems currently exist.

UVC has a wavelength ranging from approximately 200 nm to 280 nm and is also called germicidal UV because of its proven effectiveness in inactivating or killing a very wide range of viruses, bacteria, protozoa, helminthes, yeast, and mold. An advantage of UVC purification systems is that they are capable of treating the drinking water for all segments of the population, unlike other disinfection technologies such as iodine and chlorine. UVC systems do not leave residual disinfection compounds in the water.

One of the most difficult pathogens to kill is the *cryptosporidium parvum* oocyst, which requires a UV-C irradiation density of approximately 200 $mJ/cm^2$ to kill.

Accordingly, what is needed is a water purification system which purifies all the water which is being treated, which requires no expensive chemicals or filters which will need to be replaced, which produces water which can be drunk by all persons, including pregnant women, small children and seniors and which allows the inexpensive adjustment of the purification process in response to the types and concentrations of impurities present in the water.

SUMMARY OF THE INVENTION

In accordance with the present invention, an ultraviolet-C (UVC) based water purification system employs a novel array of baffles to increase the efficiency of eradication of the pathogens in the water per unit energy of applied UVC light. The system is capable of treating a wide range of significant waterborne bacteria, viruses, protozoa, helminthes, yeasts, and molds found in natural freshwater sources worldwide. By adding pre-filter(s) or post-filter(s) or ozonation or hydrogen peroxide to the system, heavy metals, inorganic compounds, pesticides, and/or harmful organic compounds can be removed. Because it is capable of treating a large variety of the waterborne pathogens from around the world, this single purifier system design may be used to effectively treat the waterborne pathogens in the drinking water anywhere in the world.

A novel feature of one embodiment of the system is the use of an optional closed loop feedback system to monitor lamp power output to directly measure the radiation level. This can be done with a photodiode or indirectly by continuously measuring the UVC lamp electrical current or ballast current with a current transformer or a hall effect sensor. The feedback circuit compares the measurement of the actual power to a predetermined level and uses this comparison to control a valve that stops or reduces the water's flow rate if the system produces insufficient power to inactivate or kill the pathogens. The system may be equipped with flow rate measuring devices and a digital or an analog control system.

In accordance with one embodiment of the present invention sufficient amounts of UVC power are applied to the water to inactivate the *cryptosporidium parvum* oocysts. The present invention applies enough UVC energy to cause cell death of the pathogens.

In accordance with this invention, sufficient UVC radiation is applied to water to inactivate the *cryptosporidium parvum* oocysts and to cause cell death of the pathogens.

The prior art (U.S. Pat. No. 6,403,030) teaches that lower UVC power levels can be used to inactivate cryptosporidium under laboratory conditions instead of the higher power levels needed to cause cell death.

In the inactivation process, the thymine base of the DNA contains an aromatic ring that strongly absorbs the wavelength of the UVC light. When enough UVC light has been absorbed, the chemical bond is broken between the thymine base and its base pair across the DNA strand. The thymine base then chemically bonds to a neighboring base, creating a thymine dimer, which prevents the replication of the pathogen. However, in field conditions the protozoa are often attached to particles which block the UVC light, so higher amounts of UVC energy may need to be applied to ensure sufficient kill of the protozoa than the amount of UVC energy needed to kill the protozoa in laboratory conditions.

A wide range of pathogens, including bacteria, viruses, protozoa and helminthes are inactivated or killed by UVC radiation. In accordance with the present invention sufficient amounts of UVC radiation are produced which are intended to kill each of the pathogens on the following list. This list is representative of pathogens typically found in natural water sources worldwide. It is not exhaustive.

Protozoa:
More common protozoa as listed by the World Health Organization:
*Entamoeba histolytica*
*Giardia intestinalis*
*Cryptosporidium parvum*
Other protozoa:
Entamoebic Dysentery
*Giardia* Lamblia
Blastocysts
*Strongyloides stercoralis*
*Schistosoma stercoralis*
*Schistosoma mansoni*
*Schistosoma japonicum*
*Schistosoma mekongi*
*Schistosoma haemotobium*
*Wuchereria bancrofti*
*Brugia malay*
Loa Loaeye
*Onchocerca volvulus*
*Clonorchis sinesis*
Hyatid disease
*Trypanosoma cruzi*
Enterobiasis
Ascarisgiant roundworm
*Ancylostoma duodenale*
Richuriswhipworms
*Trypanasoma* parasites
Dracunculiasis Bacteria:
More common bacteria as listed by the World Health Organization:
*Campylobacter jejuni* or *C. coli*
Pathogenic *E. coli*
*Salmonella typhi*
*Vibrio cholera*
*Yersinia enterocolitica*
*Pseudomonas aeruginosa*
*Aeromonas* spp.
Other relevant bacteria:
*Bacillus anthracis*
Brewer's yeast
*Corynebacterium diptheriae*
Dysentery bacilli (Diarrhea)
*Escherichia coli* (Diarrhea)
Leptospiracanicola *Legionella pneumophilia*
*Mycobacterium tuberculosis*
*Salmonella enteritidis*
*Salmonella paratyphi*
*Shigella dysenteriae*
*Shigella flexneri*
*Staphylococcus epidermidis*
*Streptococcus faecalis*
Trachoma
Typhus
*Enterococcus faecium,*
Coliform bacteria
Faecal Streptococci
*Staphlococcus aureus*
Sulphite reducing anaerobes
*Pseudomonas aeruginosa*
*Vibrio parahaemolyticus*
Meningococcal meningitis Viruses
More common viruses as listed by the World Health Organization:
Adenovirus
Enterovirus (meningitis)
Hepatitis A
Norwalk virus
Rotavirus
Small round structured viruses including Norwalk virus, astro and rota viruses Other Viruses:
Bacteriophage—*E. Coli*
Hepatitis B
Hepatitus E
Norovirus
Influenza
Poliovirus—Poliomyelitis
Diphtheria
Measles
Bovine Spongiform Encephalopathy Helminthes
One of the more common helminthes identified by the World Health Organization is *dracunulus medinensis* (dracunculiasis guinea worm).

Other Helminthes:
*Diphyllobothrium*—Tapeworm
Trematodes
*Shistosoma* spp (schistosomiasis, bilharziasis)

Water Sources
Sources of water for purification system by embodiments of this invention can vary widely. Examples of water sources are lakes, rivers, streams, wells, artesian wells, and even domestic water supplies that may have poor quality water.

The system is designed to operate on low water pressure from sources such as an elevated tank, although it can also effectively operate with high water pressure such as a 60 psi (410 kPa) domestic water connection. It is preferentially gravity fed. The purifier has a low resistance to flow resulting in a low head pressure requirement for the input water supply. For gravity fed systems, this low head requirement will minimize the elevation of the water tank above the purification unit. For example, a tank with an elevation above the purifier of 12 feet (3.7 m) would provide a head pressure of 5.2 psi (36 kPa) at the purifier intake. Many other methods for providing water to the unit are possible such a manual powered or motor driven pump, domestic pressurized water, elevated natural source, and similar or equivalent structures or arrangements. Alternately, water is lifted manually to an elevated holding tank.

Research has shown that water turbidity inhibits ultraviolet disinfection when organisms are lodged within particles or when the particles themselves are UV-absorbers. Otherwise, turbidity is not a hindrance to disinfection. Many of these lodged organisms can be extricated from the water supply through the use of a pre-filter. One example of a prefilter is a sand pre-filter. The preferred embodiment of the system is designed for incoming water turbidity of less than 5 NTU (Nephelometric Turbidity Units). For more turbid water, a sand pre-filter or diatomaceous earth pre-filter or cartridge filter or other pre-filter must be used to remove particulate matter. Alternately, a settling tank may be used to allow the particulates to settle out of the water before it enters the filter. A pre-filter screen with 2 micron openings or other sub-3 micron filter may be used to pre-filter *cryptosporidium par-*

*vum* oocysts and other protozoa from the water if the system is not able to sufficiently purify it by UV disinfection.

The turbidity of the water affects the pathogen kill radius of the UVC energy. For water with turbidity below about 5 NTU, the UVC absorption coefficient typically varies between about 0.01/cm to about 0.021/cm. Therefore, at a radius of 15 cm from the lamp surface using the best case absorption coefficient, 85 percent of the UVC energy is absorbed. This information was used in designing the irradiation subchamber as described below.

Among the features which can be incorporated into one or more embodiments of a system with a fluid flow subchamber in accordance with this invention are the following:

1. A series of baffles oriented substantially along the direction of flow of a fluid such as water in the subchamber to create partial subchambers around one or more UVC light sources through which the fluid being purified passes.
2. The system with feature #1 above with multiple subchambers in parallel or in series.
3. Baffles for use in the system to preferentially create fluid or water current in subchambers to increase pathogen exposure to UVC light.
4. Baffles for use in the system having small passages at or near their tops to allow air to be bled from the system.
5. At least one UVC lamp in a quartz tube in the subchamber with baffles located essentially perpendicular or at selected angles to the quartz tube.
6. The system of feature #1 above with at least one UVC lamp in a quartz tube coated with FEP to reduce the deposit of foreign materials on the quartz tube.
7. The system of feature #1 above having at least one UVC emitting lamp coated with FEP, in which the FEP coating is in contact with the water, but ends of the lamp are not submerged.
8. The system of feature #1 above with at least one pulsed UV source.
9. The system of feature #1 above with one or more medium or low pressure UVC lamps.
10. The system of feature #1 above with a microwave UVC source.
11. The system of feature #1 above with at least one UVC emitting LED.
12. The system of feature #1 above with at least one UVC emitting LED in a purifier for a fluid such as water with closed loop feedback from a photodiode or a current transformer which senses the strength of the signal from the LED or the current provided to the LED, respectively.
13. A UVC water purification system employing closed loop feedback by direct measurement of bacteria in water exiting the system thru laser spectroscopy.
14. A UVC emitting lamp suspended over a series of baffles and subchambers to purify water.
15. The use of an ultrasonic generator and one or more transducers to clean the UVC emitting lamps and/or tube.
16. A thermally conductive UV tube to sink to the water the heat generated by the system electronics.
17. Foil cylinders surrounding the ends of a UVC lamp used in the system.
18. Closed loop feedback monitoring current either at the ballast input or at the lamp input to ensure adequate current to drive the UVC lamp and thus eradicate the pathogens in the fluid being purified.
19. Closed loop feedback by monitoring voltage either at the ballast input or at the lamp input to ensure adequate power to the UVC source to eradicate the pathogens in the fluid being purified.
20. A valve in combination with a feedback system to stop the water flow automatically if the current or voltage or UVC output is below a pre-established threshold value.
21. A time delay upon start or restart of the system which keeps the output valve closed until the residual volume of fluid in the purifier is treated for pathogens.
22. An automatic bleed valve employing a floating ball to continuously remove air from the system.
23. The use of a UVC water purification system in combination with a wireless communications system to transmit parameters from the system such as flow, hours of operation, need for maintenance, and other information relating to the operation and/or condition of the fluid purification system to a computer or communications network to notify observers of the need for maintenance of the system or of the need for some specific action.
24. The use of a photodiode which senses UVC light transmitted through a quartz tube surrounding a UVC emitting lamp to provide feedback of the lamp output thereby to allow monitoring of the effectiveness of the system in purifying a fluid such as water.
25. A UVC water purification system having a flow sensor which measures flow by computing the flow rate from the pressure differential across the baffles.
26. A method of manufacture of a fluid flow subchamber for a water or fluid purification system employing heating a plastic tube, inserting baffles, and radially compressing the tube to embed the baffles partially in the inner wall of the tube.
27. The system of feature #1 above with a DC inverter.
28. Use of a UVC water purifier in combination with a sand filter
29. The system of feature #1 above using a power source such as a human powered generator or solar power.

This invention will be more fully understood in conjunction with the following drawings relating to this invention taken together with the detailed description.

DETAILED DESCRIPTION

Although the word "invention" is used herein from time-to-time in the Background, Summary, Description of the Drawings, and Written Description, only the claims are intended to define the invention and the remainder of this document is intended to describe the background to the invention and exemplary embodiments in accordance with the invention and thus the descriptions of these embodiments are illustrative only and not limiting.

The preferred embodiment of the present invention comprises a portable unit, having a dry weight of about 50 pounds (23 kg) without pre- or post-filters. In the preferred embodiment, the system purifies between about 50 gallons (1900 liters) to about 5000 gallons (3800 liters) per hour. Of course, this invention can also be implemented in non-portable embodiments.

For a system producing 500 gallons (1900 liters) per hour, the entire 2000 gallon daily need of an average 1000 person village can be purified in 4 hours of daily operation. The preferred embodiment of the invention produces water at 500 gallons (1900 liters) per hour which is intended to meet the EPA Guide Standard for water quality as discussed below.

The present invention saves significant energy over the prior art in killing pathogens because it incorporates an array of baffles to increase the flow rate of purified water output per total UVC power output from the system as compared to existing UVC water purification systems. Thus, the baffles multiply the pathogen killing power of the UVC light to increase the system efficiency.

System Configuration and Operation

Figure 1:
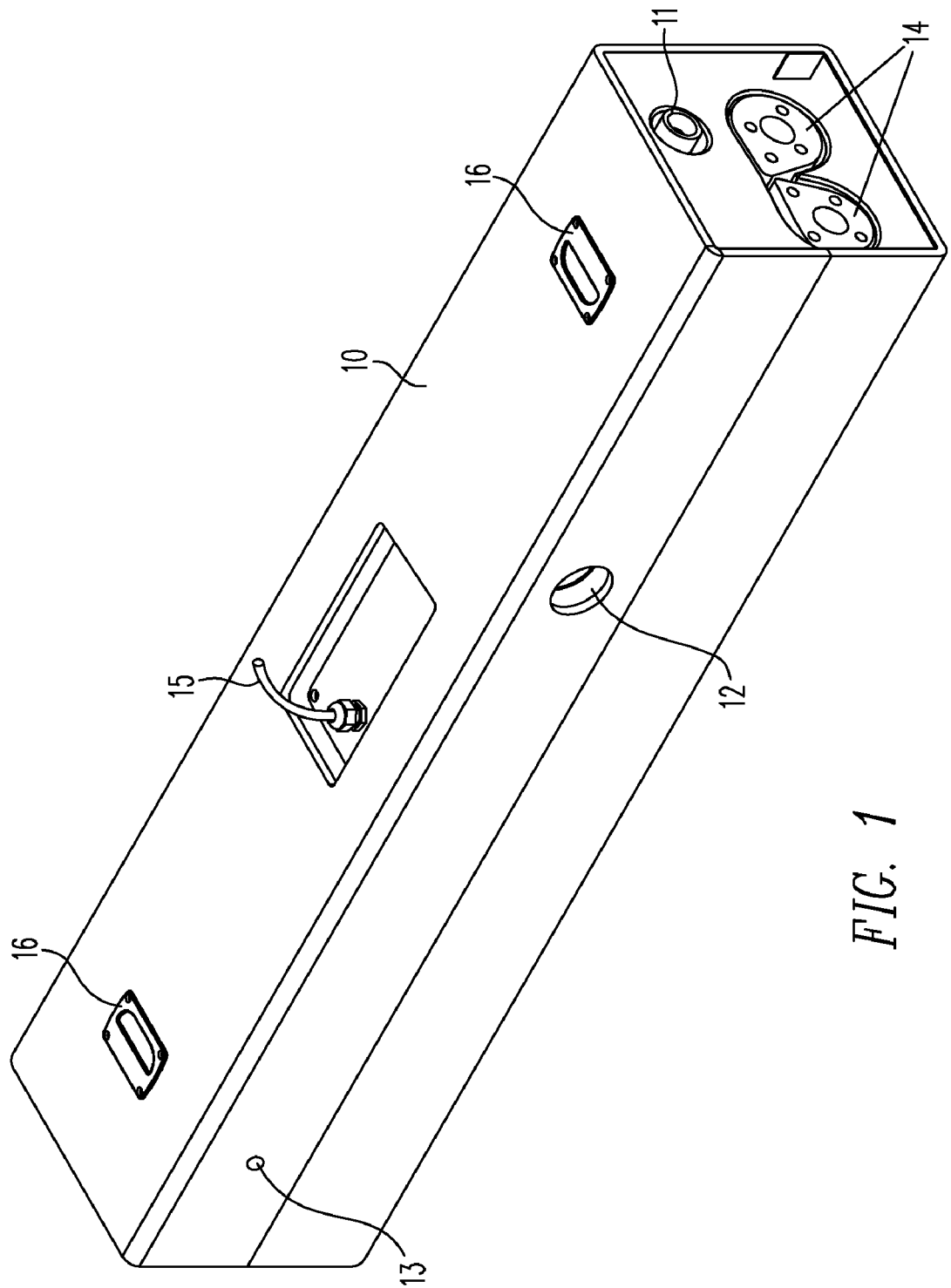
FIG. 1 shows an isometric view of one embodiment of the purifier system with housing in accordance with this invention.
Figure 2:
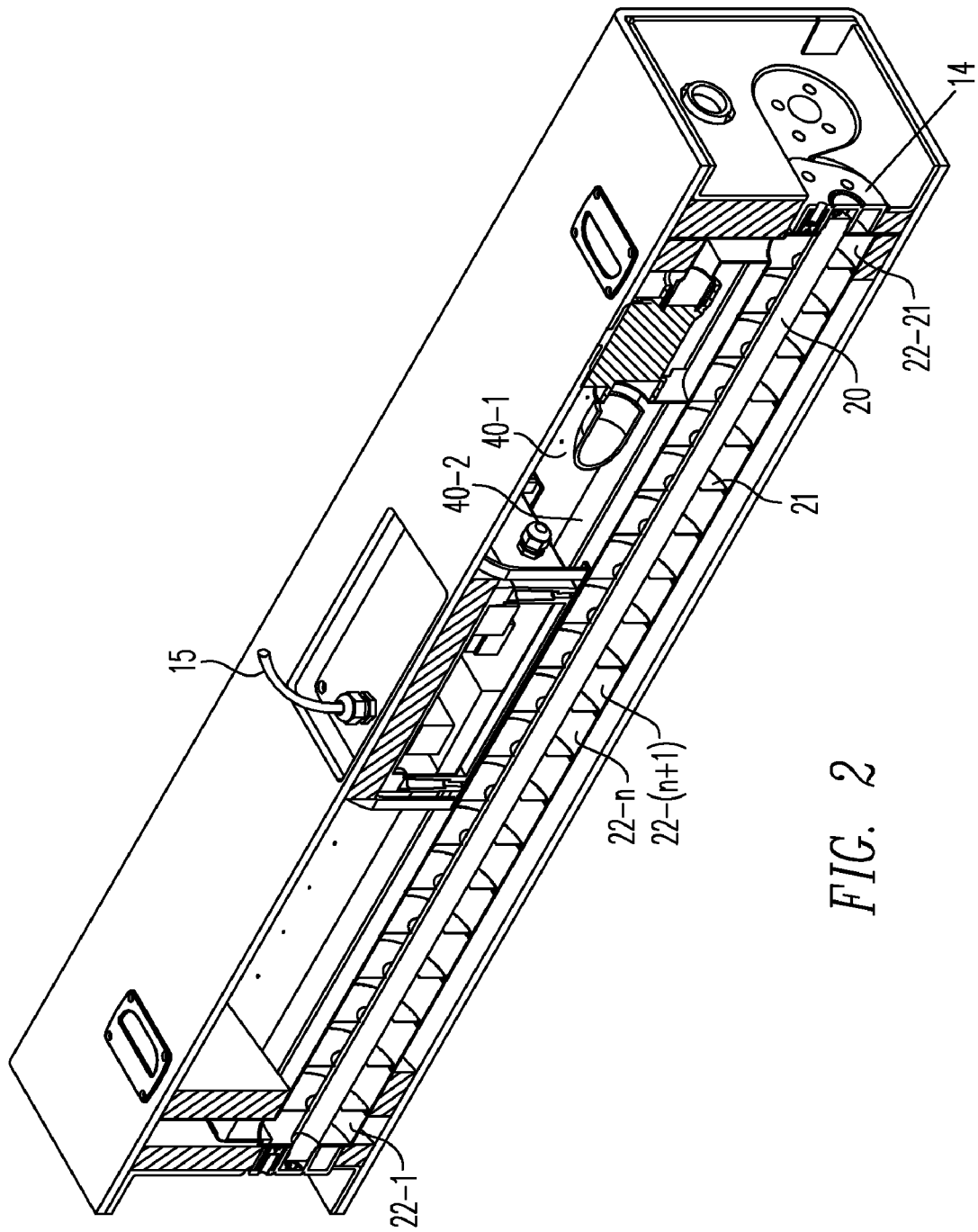
FIG. 2 shows an isometric section view of the purifier system and housing in FIG. 1 showing a cross-section of one of the two stainless steel purification tubes 40 with TIG welded baffles 21 and a plastic lamp cap 14 on each end of the tubes 40.

The preferred embodiment for the system is shown in FIG. 1. The system may be housed in a protective outer shell 10 with inlet 11 and outlet 12, handholds 16 and power cord 15. The system has lamp caps 14 on both ends of each lamp to seal and protect and allow electrical contact to the UVC lamps 20 (FIG. 2). The system also has a bleed valve drain hole 13 described below.

FIG. 2 is an isometric section view of one embodiment of the system in FIG. 1 showing a cross-section of one of the two purification tubes 40-2 and 40-1 (preferably stainless steel) with baffles 21 (TIG welded to the tubes in one embodiment but capable of being joined to the tubes in any other suitable way) and a lamp cap 14 (preferably plastic) on each end of the tubes 40. A UVC emitting germicidal lamp 20 is positioned in the center of each tube 40 running the length of each tube 40-2 and 40-1. Alternately, a microwave UVC source may be used. The baffles 21 are in one embodiment welded to the purification tubes 40. The baffles 21 divide the chamber formed by each tube 40 into subchambers 22-1 through 22-N where N is an integer one greater than the number of baffles 21. In one embodiment, tubes 40 are about forty eight inches (48") long and thirty eight (38) subchambers are created using thirty seven (37) baffles 21. The spacing of the baffles along the length of the chamber does not have to be equal.

Figure 3:
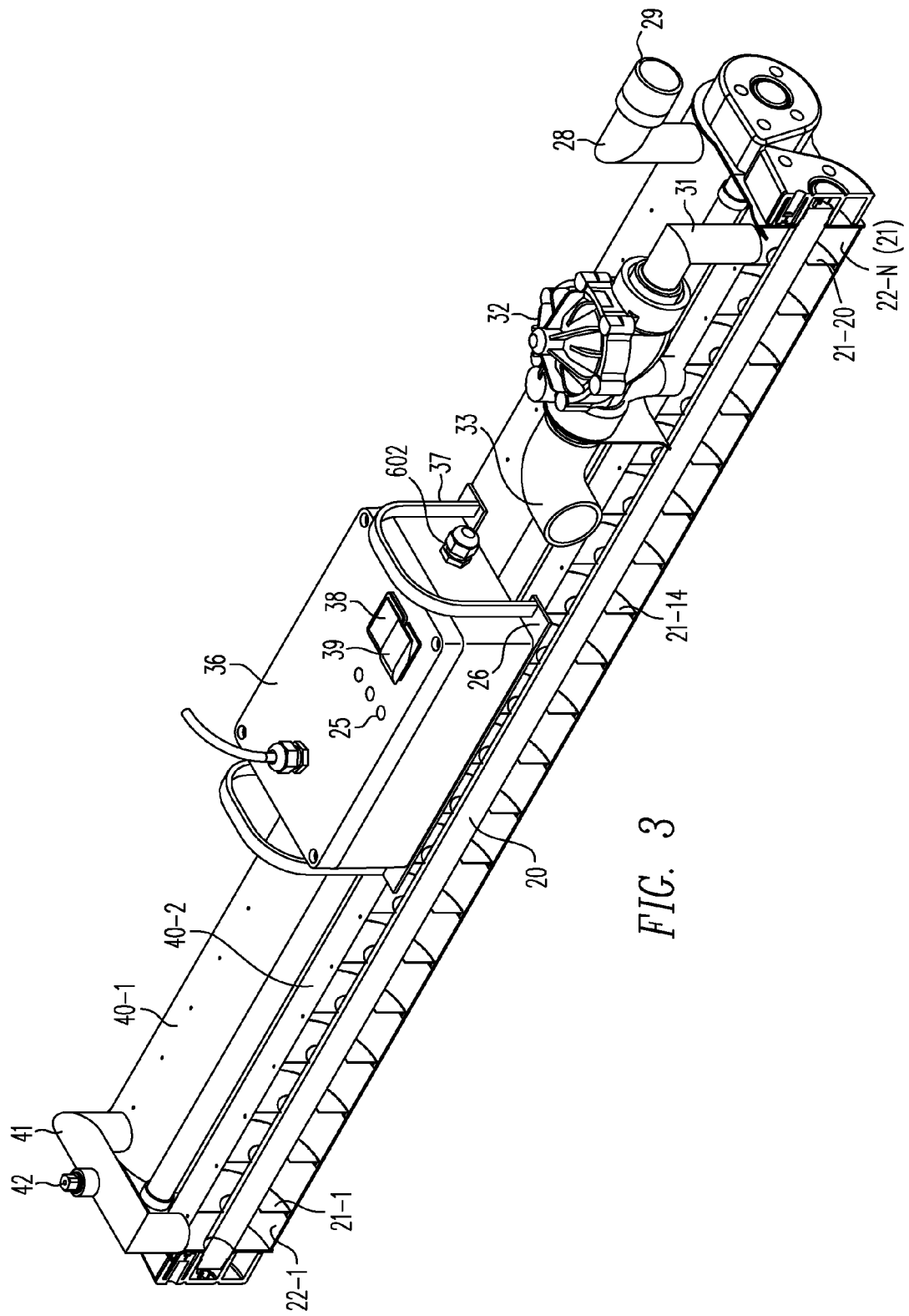
FIG. 3 shows a section view of the purifier without housing.

FIG. 3 shows an embodiment of the system with the outer housing and impact protecting foams removed, more fully revealing the waterproof electronics enclosure 36 with a switch 39, hour meter 38 (which informs a user of the cumulative time that the system has been operated to purify a fluid), LED status indicators 25 and protective hoops 37. The electronics are enclosed in the sealed waterproof housing 36 with watertight feed-throughs. The electronics enclosure may be mounted on heat transferring strips 26 (typically stainless steel although other heat-conductive materials can also be used) that are welded to the purification tubes 40. Heat transfer compound or heat transfer tape may be used to increase the heat transfer rate to the enclosure mounts 26. Waste heat generated by the system electronics may be transferred to the water passing through the subchambers for cooling. The electronics (to be described below) powers the UVC lamps 20 in the tubes 40 and includes a ballast and an inverter. Heat may be transferred from the ballast and the inverter to the thermally-conductive electronics housing, then to the thermally-conductive electronics enclosure mounting plates 26 and then to the thermally-conductive stainless steel tubes 40 to sink the heat to the water passing through the system. Thus the water being purified may also be used to cool the system.

Aluminum or stainless steel bolts are preferentially used to connect the enclosure mounts 26 to the electronics housing 36. These bolts will transfer heat from the housing to the water-cooled heat sink. The electronics enclosure 36 can be permanently sealed or openable for serviceability. Alternatively, or in combination, a conventional free or forced air convection heat sink of well-known design may be used.

Water enters the purifier system from an optional sand filter (not shown) and/or other pre-filter (not shown) through the inlet elbow 28 and filter screen 29. The inlet of the system preferentially contains one or more screens, such as a woven stainless steel screen, to keep particulate matter from entering the system. This screen may be coupled with a second removable screen upstream from it.

FIG. 3 shows the control valve 32 which is a normally closed exit valve which closes if the system power fails. A time delay in the circuit in electronics enclosure 36 keeps valve 32 closed during system start-up until enough time has elapsed to purify the residual water initially in the system. The outlet elbow 31, the inlet elbow 28 and protective inlet screen 29 are shown as well as the crossover tube 41 (which passes water being purified from the first tube 40-1 to the second tube 40-2 through which the water flows while the purification treatment continues) with an optional automatic bleed valve 42. Stainless steel inlet and outlet elbows and a crossover tube are preferentially used. These inlet, outlet and crossover tubes preferentially have no radiused bends to minimize the amount of UV energy reflected from the subchamber. All of the tubes 40 in the system are preferentially laser cut for precision and to lower manufacturing costs. An automated bleed valve 42 may be located on the crossover tube 41 as described below.

Figure 4:
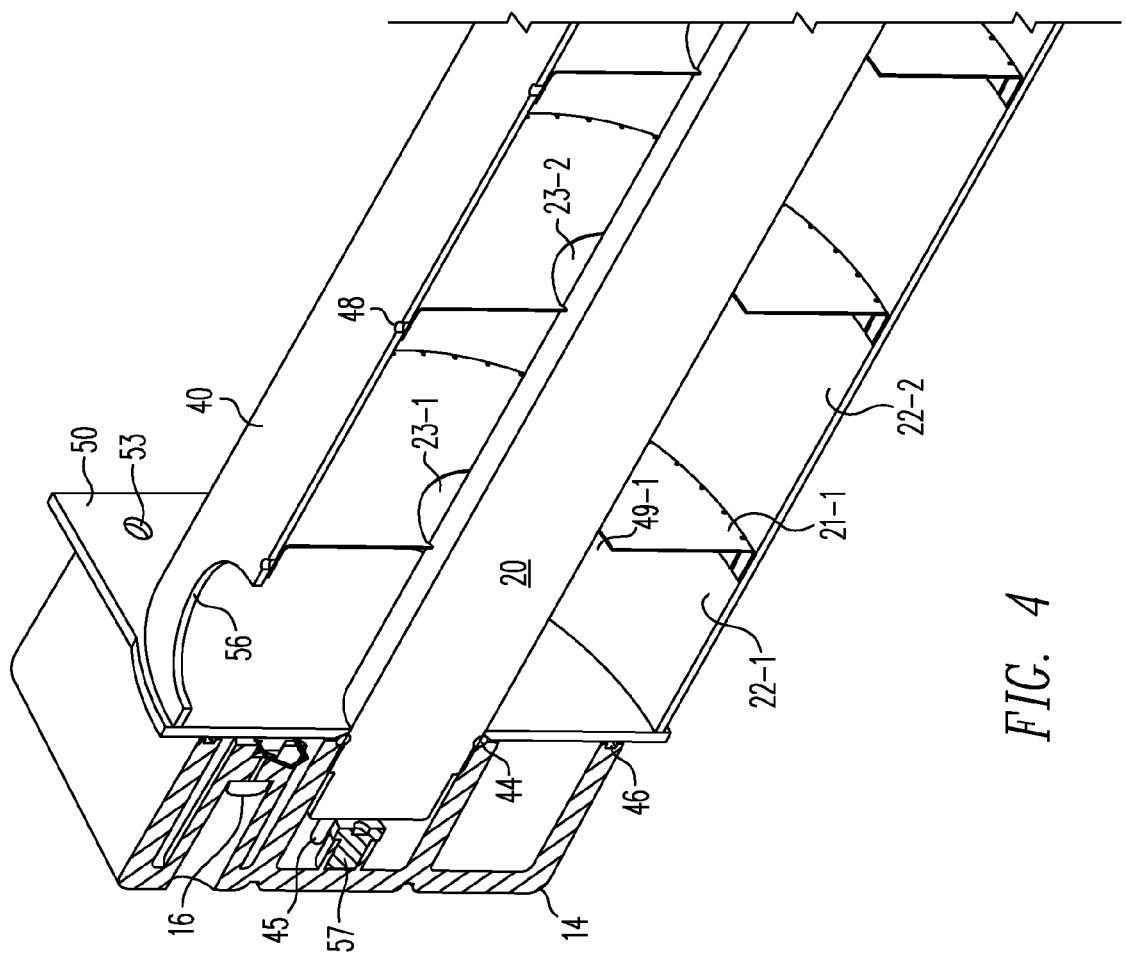
FIG. 4 shows a section view of the purifier tube end.

FIG. 4 shows an enlarged view of the cross section near the end of one of the purification tubes 40. After the water enters the system through opening 56, it flows into a first subchamber 22-1, where it is exposed to the UVC light source 20. The water then flows through the central annular-shaped opening 23-1 between the first baffle 21-1 and the FEP coated UVC lamp 20, into the second subchamber 22-2, and so on until it reaches the end of the first tube 40 in the system (shown in FIG. 3 as tube 40-1). The water then preferably flows out of the top of the tube to ensure maximum UVC exposure. As shown in FIG. 3, the water flows from the top of tube 40-1 through the crossover tube 41 to the other tube 40-2 where the water is exposed to more UVC light. Cross-over tube 41 can alternately include a section of heat transfer tubing with high thermal conductivity used to remove heat from the electronics enclosure 36. The water leaves tube 40-2 and the system through exit 33 (FIG. 3).

Lamp Sealing and Electrical Connections

Figure 5:
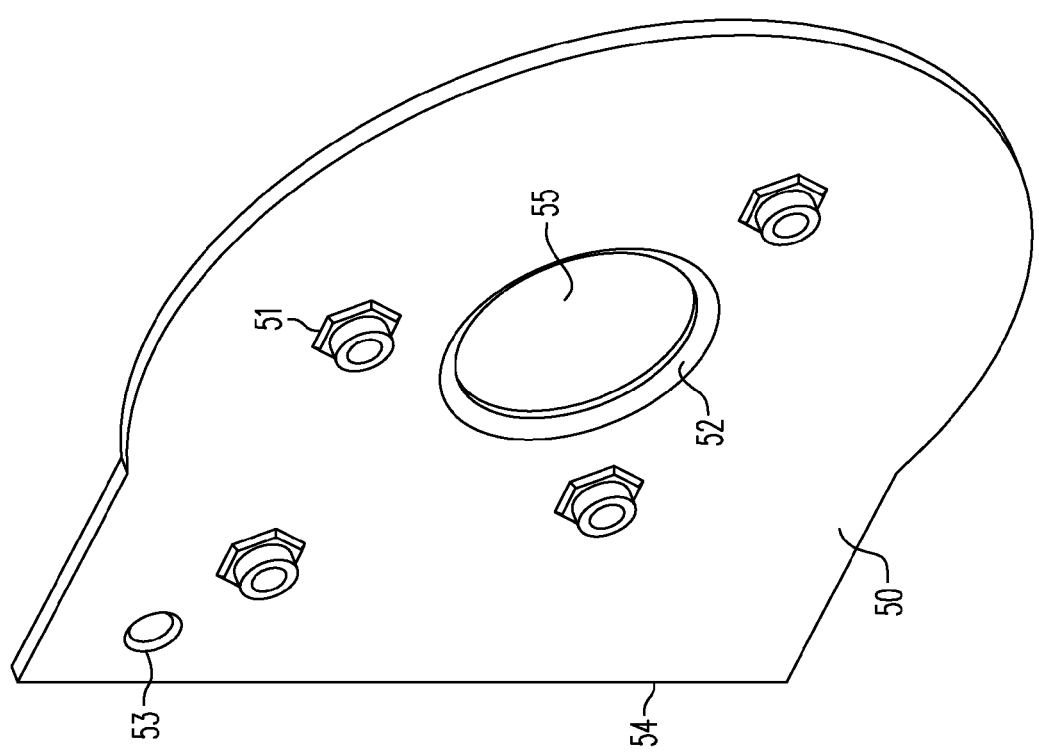
FIG. 5 shows a purifier tube end cap.
Figure 6:
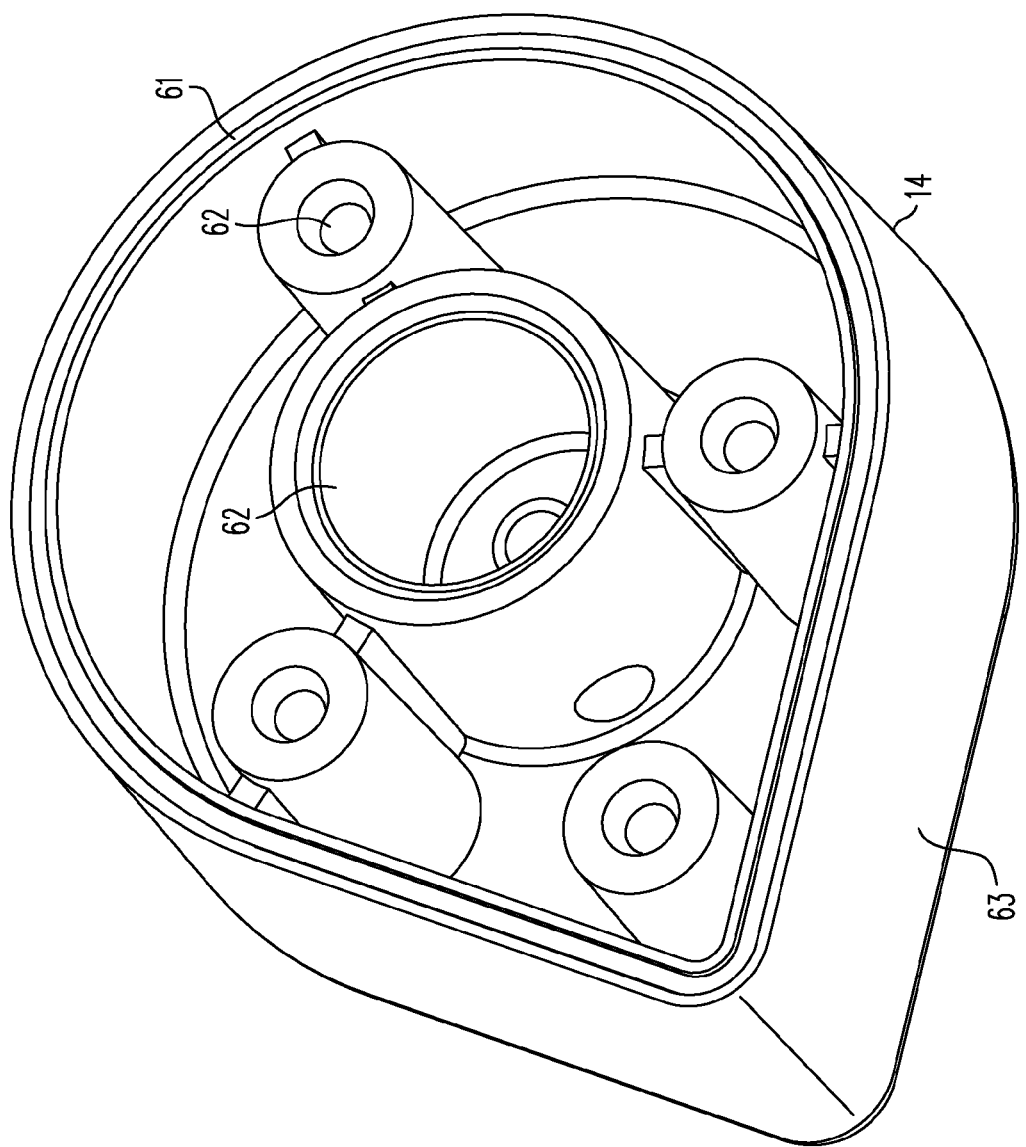
FIG. 6 shows a lamp cap.

The stainless steel system preferentially has for each subchamber stainless steel end caps 50 as shown in FIG. 5. Each end cap 50 has a central lamp hole 55 with a tapered seat 52 for receiving an o-ring which seals to the lamp and to the end cap. There may be a second hole 53 in the end cap for the passage of the lamp wiring to the ballast. The outer surface of the end cap 50 may be flat to seal against the o-rings 44 and 46 on the outer perimeter of the lamp cap as shown in FIGS. 4 and 6. The end cap has threaded nuts 51 welded to it for securing the lamp cap and providing sealing force for the o-rings. Alternately, any other suitable method for attaching the end caps to the lamp caps may be used.

Each end cap 50 is preferentially gas tungsten arc welded (GTAW) separately to the end of one purification tube 40. Each end cap 50 may be separate to facilitate ease of welding to the purification tube. After welding to the purification tube, each end cap 50 may be welded or joined to the neighboring end cap 50 by welding their straight edges 54 together. Alternately, other joining techniques such as adhesives or screwing on of compression bushings or o-rings surrounding the tubes 40 slipped into the end cap 50 may be used. Alternately, the end caps are not made of stainless steel, but are diecast alloy or molded plastic as described below.

FIG. 4 shows the lamp cap 14 sealing to the end cap 50 with two o-rings 44 and 46. The first PTFE o-ring 44 is located in an inner groove on the lamp cap 14. Here, the lamp cap 14 seals the germicidal lamp 20 to the end cap 50 using a PTFE o-ring 44 of well-known design. The center o-ring 44 seals the flow subchamber 22-1 from the electrical housing and electrical contacts 45 of the lamp 20 due to the compressive force exerted on o-ring 44 by lamp cap 14 being bolted to end cap 50. The compressive force has a radially inward component bearing on the outer FEP coating 80 (see FIG. 7 discussed below) on the lamp 20 due to the tapered o-ring seat 52. A stainless steel end cap 50 is preferentially used because of the increased sealing force on the PTFE o-ring 44.

The lamp cap 14 has an optional center elastomeric bumper 57 to align the lamp 20 during assembly and prevent impact from the lamp cap 14 to the lamp end during shipment and operation. The outer portion of the lamp cap 14 may seal to the end cap 50 on its smooth outer surface with a second sealing o-ring 46 to create a separate waterproof wiring compartment for the lamp electrical connections and wiring. The lamp wiring may pass through hole 53 in the end cap 50 into a waterproof sealed conduit system.

The outer groove 61 in the lamp cap 14 is shown in more detail in FIG. 6. The optional outer o-ring 46, which fits in groove 61, enables the sealing of the lamp electrical wiring between the lamp cap 14 and the end cap 50. The outer o-ring 46 (FIG. 4) is preferentially made of a material more compliant than the center o-ring, such as Viton, silicone, Buna-N, or FEP, to enable the outer o-ring 46 to deform and seal even though the lamp cap 14 continues to exert force against the center o-ring 44 to seal the lamp 20 to the end cap 50 at the center tapered seat 52.

FEP Lamp Coating

Figure 7:
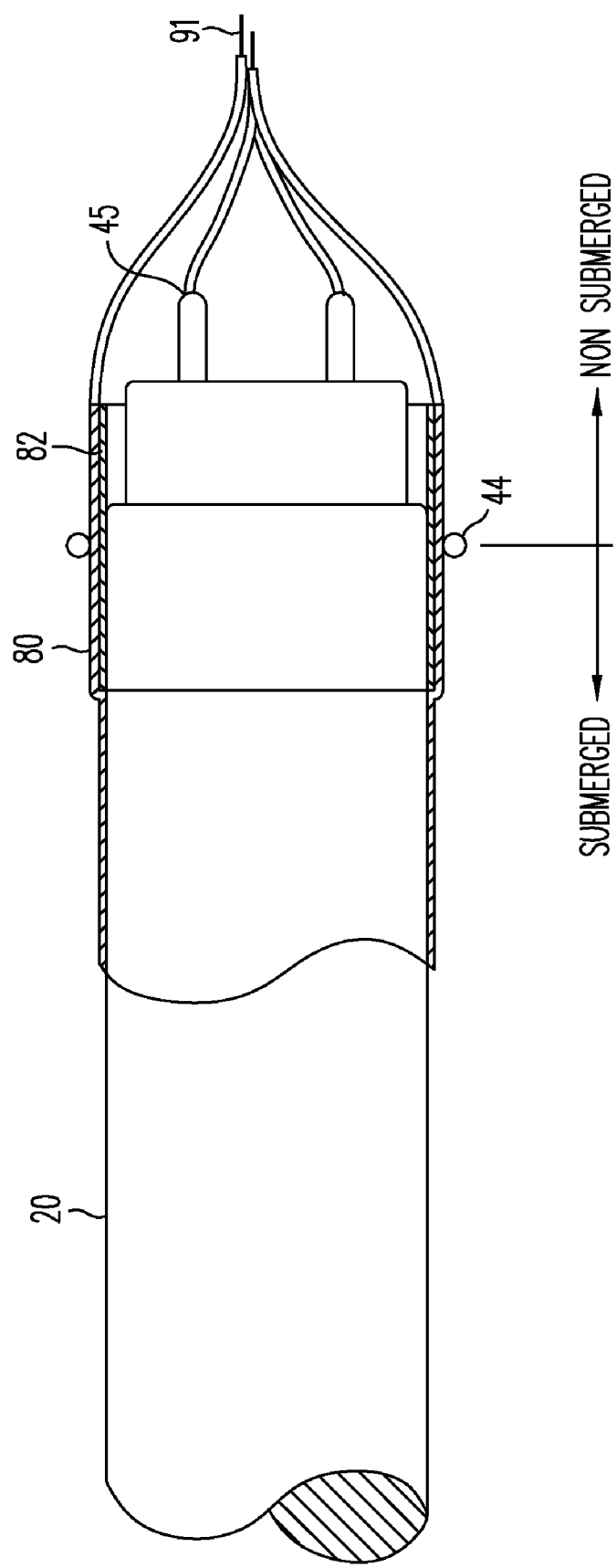
FIG. 7 shows a fully FEP enclosed lamp with optional foil shields

The lamp may be preferentially covered with a circumferential layer of FEP (fluoroethylene propylene) 80 over its entire length as shown in FIG. 7. The FEP coating is preferentially applied in the form of a thin tube which may be heat shrunk over the lamp 20. Preferably, a fully circumferential radiative or forced convection heating element is moved along the length of the lamp with controlled velocity and temperature to shrink the FEP tubing 80 in place over the lamp.

Thin foil shields 82 located under the FEP coating 80 near the ends of the lamp 20 are preferentially made of aluminum foil with an acrylic adhesive backing. Alternatively, they may be made of stainless steel foil, or thin films of PVDF, PTFE filled with carbon black, PEI, or other thin material. These foil shields 82 are wrapped around the ends of each lamp 20 to protect the o-ring 44 and polymeric lamp cap 14 from possible damage by the UVC radiation from each lamp 20.

The FEP coating 80 surrounding the lamp 20 may completely encase the lamp 20 and the electrical contacts as shown in FIG. 7. If the lamp 20 and the contacts 45 are completely encased in FEP 80, the wires 91 are sealed by the FEP 80 as the wires 91 exit the FEP covering 80. The length of the lamp 20 inside o-ring 44 (i.e. to the left of o-ring 44 in FIG. 7) is submerged in the water being purified such that the FEP coating 80 is in contact with water, but the portion of the FEP covered lamp 20 protruding to the right in FIG. 7 beyond o-ring 44 is not submerged. Alternatively, as described above, the contacts 45 may be open and not covered by FEP 80 inside the lamp cap 14. The lamp cap 14 may be metallized or plated or coated with UVC inhibiting paint to protect it from damage from UVC radiation. Alternatively, as described above, a metal coating 82 may be applied to the end of the lamp 20 under the FEP coating 80 to prevent irradiation of the o-ring 44 and the lamp cap 14. The o-ring 44 can still seal to the lamp 20 with this thin layer of foil 82 present.

The end caps 14 may be molded from a common thermoplastic material such as PVC, ABS, polycarbonate, or other material, or a thermoset material or metal die cast from an aluminum, zinc, magnesium, or other alloy. The inner surface of the end caps 14 can be made from PVDF or PEEK or PEI or other UV-resistant material.

With a molded end cap 14 and a stainless steel or aluminum chamber 40 (also called tube 40), a wider shield tape layer 82 (FIG. 7) may be needed at the end of each lamp 20 to reduce or prevent UVC damage to the end cap 14 by blocking the UVC radiation from the portion of the lamp 20 extending beyond the last subchamber such as 22-1 (FIG. 4). In addition, a stainless steel or aluminum or other UV shield 82 can be placed inside the end of the end cap 14 to protect it. The shield inside the end cap 14 may be planar in shape or have another shape such as a cup shape to protect the end cap plastic that may be irradiated by the UVC radiation on the circumference of the subchamber wall. The foil shield 82 or coating at the ends of the lamps 20 has the disadvantage of reducing the purification effectiveness of the subchambers 22 located at the ends of the lamps 20.

If the system uses a molded plastic end cap 50, the PVC elbows mounted on the end cap 50 may be protected from UVC radiation by stainless steel or aluminum shields (not shown) mounted to shield the direct irradiation of the plastic by the UVC.

Impact Protection

The preferred embodiment of the system is designed to withstand rugged field conditions. The preferred embodiment of the system has a protective housing 10 (FIG. 1) made of expanded PVC foam or corrugated plastic or other material in which the assembly of tubes 40 is suspended from or separated from the housing 10 by foam or other shock absorbing material or devices.

Bleed Valve

Figure 8:
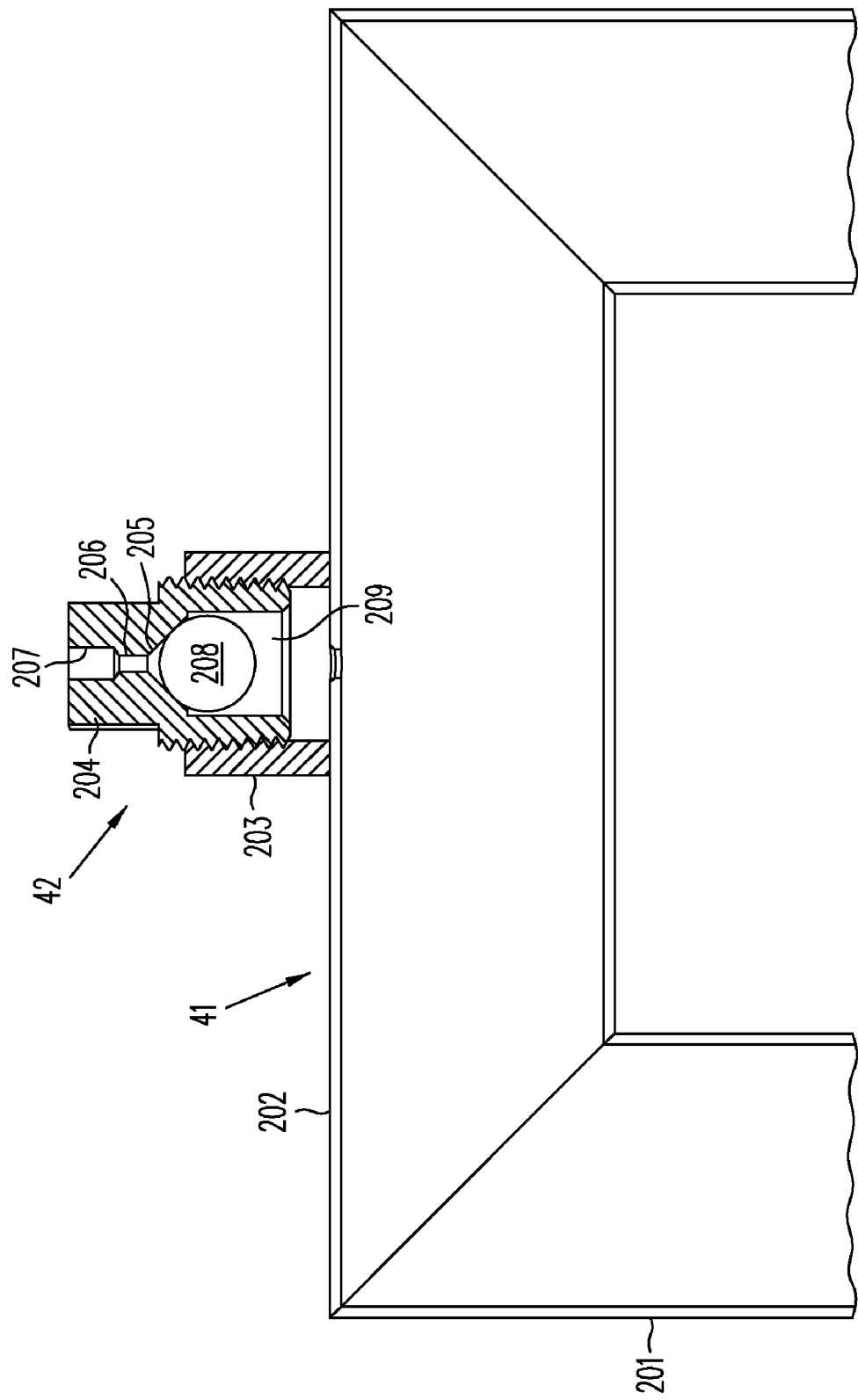
FIG. 8 shows a section view of crossover tube and bleed valve.

The crossover tube 41 (FIG. 3) which transfers the water from the first purification tube 40-1 to the second purification tube 40-2 has an optional bleed valve 42 to allow air to escape from the tubes 40 as shown in a section view in FIG. 8. The crossover tube 41 is preferredly located higher than the purification tube 40 as shown in FIG. 3 so the bled air rises to a high point in the system where it can be purged and so that the combination of the water flow in the tubes 40-1 and 40-2 and the UVC light optimizes the destruction of the pathogens in the water. The elimination of air pockets maximizes the volume of each subchamber 22-$i$ available for water flow, thus maximizing the irradiation time of the pathogens to the UVC light. Each baffle 21-$i$ in the system (i is an integer given by $1 \leq i \leq (N-1)$, where N is the number of subchambers 22 in tube 40), has one or more small openings such as opening 261 in baffle 21 (FIG. 9) through which air can pass to escape from the system. Air is bled from the system upon start-up and periodically during operation.

Preferentially, the optional air bleed valve 42 (FIG. 3) is automatic as shown in FIG. 8. In this structure, the bleed valve 42 has a closely toleranced spherical polypropylene ball 208. Ball 208 sinks when air (even bubbles of air) is present below it, because the density of ball 208 is greater than air. Ball 208 is located in a bore 209 of diameter greater than ball 208 to allow the air to pass between the ball 208 and the bore. When water without air is present below the ball 208, ball 208 rises with the water and the force of the water presses ball 208 against the tapered seat 205 to prevent substantial water loss through the bleed valve 42. Ball 208 is of a uniform diameter and has a smooth surface to seal against seat 205. Alternatively, ball 208 is made of another material with specific gravity less than water. Alternatively, a hollow ball 208 with density less than water is used. Ball 208 can be made of an elastomeric material or covered with an elastomeric material to improve its sealing properties. The seat 205 also has a smooth surface to optimize sealing. Bore 209 is also smooth—but could be corrugated to allow air to pass by ball 208 without significantly displacing ball 208 from the center of the bore. Alternately, the bleed valve 42 can be manual, requiring the operator to open it to release entrapped air in the system and then close it again each time air enters the system. Alternately, bleed valve 42 may be operated by an electrical solenoid.

Flow Control Valve

After traveling through the crossover tube 41, the water then enters the second tube 40-2 (FIG. 3) where it continues to receive UVC exposure and flows through a series of baffles 21-1 through 21-(N−1) and subchambers 22-N, where N represents the number of subchambers 22 in each tube 40 and is shown as twenty one (21) in the second tube 40-2 in FIG. 3. The number of subchambers N can be varied to be whatever number is required to achieve the desired purification. The water exits the second tube 40-2 by flowing upward through the exit to the valve 32 where it flows out the purifier exit 33, possibly to a post-filter. It is preferred that the flow resistance of the valve 32 be low enough to allow a low pressure supply system such as gravity feed to be employed.

The valve 32 is preferentially made of injection molded plastic and threaded onto a stainless steel exit tube 31. Alternately the valve 32 can be molded in a more conformal shape and mounted directly above the exit tube 31 from the last subchamber 22-N. The valve 32 may be integrated into an injection molded end cap with integrated inlet and outlet ports (not shown). The system can use a single tube 40 for a lower flow rate or more than two tubes 40 for higher flow rate. The system may use smaller diameter subchambers 22-*n* (where n is an integer given by $1 \leq n \leq N$) for lower flow rates or lower lamp power levels. The system can also use larger diameter subchambers 22-*n* if turbidity is low enough. The system can also use more than two tubes 40 in series if needed. Alternatively, two or more sets of tubes 40 can be used in parallel to increase the flow rate for higher volume applications.

System Materials

The tubes 40 in the system are preferentially constructed of 304, 304L, 316, 316L or other stainless steel or anodized aluminum. Alternatively, the purification tubes 40 may be fabricated of a co-extruded polymer food grade plastic such as PVC, polyethylene, or polypropylene, high density polyethylene, or low density polyethylene with a co-extruded inner lining of a UVC resistant polymer such as polyimide, polytetrafluoroethylene (PTFE), fluorinated ethylene propylene (FEP), polyvinylidene fluoride (PVDF), polyetheretherketone (PEEK), or polyetherimide (PEI). Alternately, the purification tubes 40 may be constructed of PVC or polycarbonate or acrylic or other non-UVC resistant polymer material if carbon black or other UV inhibitor is added to the polymer to prevent UVC damage.

Alternately, a tube 40 can have a blow molded inner layer of a UV resistant polymer such as FEP or PVDF. The co-extruded tube 40 can be heated and compressed to seal and register the locations of the baffles 21 along the tube 40 as described below.

Alternately, the polymeric tubing 40 can be lined with aluminum or stainless steel. These linings can be perforated, slotted, or grooved to hold the baffles 21 in position. The liners may be slid into the tubes 40. A tube 40 can be softened and compressed around the liner, or alternately, the PVC tube 40 may be molded over an aluminum or stainless steel or other liner.

Alternately, a PVC tube 40 with stainless steel or aluminum baffles 21 can be metallized or plated with copper, aluminum or other metals to reduce UVC damage to the subchamber walls.

A material such as PVC which has finite life during long term exposure to concentrated UVC may be acceptable for use in the tube 40 if it is protected with UV stabilizers such as titanium dioxide or carbon black and if it has a large enough radius to keep it a sufficient distance from the lamp 20 to provide adequate life. In field tests, water with turbidity of 5 NTU absorbed approximately 1/e of the UVC energy over a 200 mm distance.

The reflection of UVC from the inner surface of the PVC tube 40 is approximately 12% of the incident energy, though the energy loss is still small since the tube radius reduces the amount of UVC light reaching the PVC tube 40. Although the PVC does not have the approximately 66% UVC reflectivity of aluminum or the approximately 30% UVC reflectivity of stainless steel, the use of lower reflection PVC for tubes 40 may be justified by the lower cost, durability, and lower weight of the PVC. The reflectivity of the tubing is important because higher reflectivity tubing increases the amount of UVC energy applied to the water being purified.

The hardness of the water affects the solubility of the water that can absorb UV light. Hard water can precipitate carbonates on the tubes 40 or the FEP surfaces or if the lamps 20 are encased in quartz, on the exposed surface of the quartz. An inspection window may be added to the system to observe the cleanliness of one or more selected subchambers 22-*n* and to observe deposits on each lamp 20. The use of FEP coatings may reduce the formation of these deposits and the formation of organic deposits.

The tubes 40 can have a cleaning port (not shown) on one or both end caps 50. The cleaning port allows a thin cleaning tool to be inserted through an opening in the end of each tube 40 and in the annular opening 23 (FIG. 4) between the inner circumference 265 (FIG. 9) of the central opening 263 in each baffle 21 and the outside diameter of each lamp 20. The cleaning tool may be moved along the length of lamp 20 to remove deposits or particulates. Alternately, the cleaning tool may use a rod permanently left in the subchamber, which is operated through a watertight seal on the end of the subchamber.

The volume of water retained in the preferred system when full is between about 0.25 gallons and 10 gallons (1 L to 38 L), depending on the size of the system. However, the system can be any appropriate size and these volumes are illustrative only and not limiting.

The Baffle Array

Figure 9:
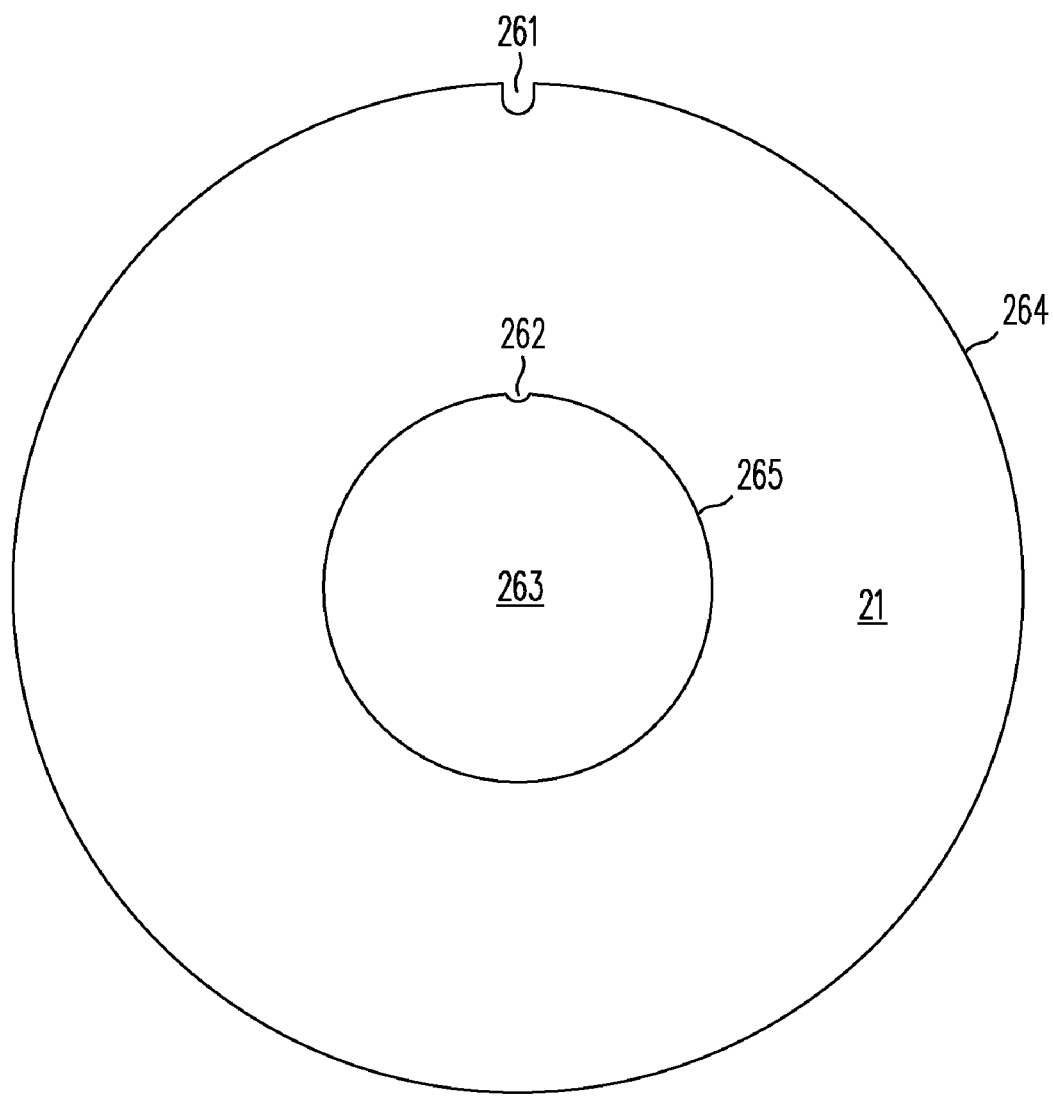
FIG. 9 shows a simple baffle.

As described above, each UVC irradiation tube 40 is comprised of a set of cylindrical subchambers 22-*n* in series separated by baffles 21-*i* where i is a integer given by $1 \leq i \leq (N-1)$ as described above. The baffles 21 increase the kill rate of the pathogens along the length of the purifier by restricting the flow of the pathogens in the water in a staged manner. The water and its water-borne pathogens are not free to flow the length of the irradiation field as in other UV-based purification systems, but instead are restricted to be constrained in a series of subchambers 22-*n* separated by a set of baffles such as baffles 21-*i* (FIGS. 3 and 9, for example). This system significantly increases the percentage of pathogens inactivated by the UVC radiation for a given flow rate.

Many systems currently exist and are commercially available in which a simple tube contains a centrally positioned germicidal lamp which illuminates the flow of water past the lamp along the length of the tubing. In conventional UVC systems without the baffles 21 and subchambers 22, currents in the water may cause some of the water to reach the outlet on average faster and with less average UVC radiation than for this invention employing the baffles 21. Laboratory experiments have proven the effectiveness of the baffles 21 in enabling a system employing an array of baffles 21 to kill significantly more pathogens than an otherwise identical system without the baffles 21.

Microbiological Testing

Tests of the system described above are reported below in Tables I and II. These tests were conducted at the University of Arizona according to the United States Environmental Protection Agency Guide Standard And Protocol for testing microbiological water purifiers[2]. This standard sets the levels of pathogen removal from drinking water at 99.9999% (6 logs) for bacteria, 99.99% (4 logs) for viruses, and 99.9% (3 logs) for *giardia* and cryptosporidium during a standardized test procedure.

[2]Reference US EPA Guide Standard

A system with 38 subchambers 22 produced 1,000 gallons of purified water per hour (3,800 liters per hour) at 7.0 psi (48 kPa) incoming head pressure (measured at filter entrance)—equivalent to 16 feet (4.88 m) of water pressure. This system had two 75 W UVC lamps 20 producing a combined total of approximately 50 W of UVC power (30% UVC power output). The system was constructed of PVC subchambers 22-*n* each having a 4.0 inch (100 mm) inside diameter and a 2.5 inch (64 mm) axial length. The baffles 21-*i* were constructed of 24 gauge (0.4 mm thick) stainless steel plate with center hole 263 (FIG. 9) diameters of 1.5 inches (38 mm) and FEP coated lamp 20 diameters of 1.0 inch (25.4 mm). Each baffle had a 0.063 inch (1.6 mm) radiused air bleed hole 261 at the top of the baffle 21.

MS-2 bacteriophage testing on this system at a flow rate of 500 gallons per hour (1900 liters per hour) yielded greater than 99.9997% reduction in plaque forming units per liter. The same test unit reduced *E. coli* contamination by greater than 99.99998% at a flow rate of 500 gallons per hour (1900 liters per hour).

As shown in Tables I and II below, water purification systems with baffles 21 in accordance with this invention provide a significant improvement in the elimination of pathogens from water. The data in Tables I and II was obtained in tests run using MS-2 (a standard bacteriophage used to determine the effectiveness of systems intended to eliminate pathogens) and *E. coli* (a well-known bacteria). Table I shows the results of tests run with two systems, denoted RemotePure version 3.0 and RemotePure version 4.0. RemotePure version 3.0 had two tubes 40 with fourteen (14) baffles 21 per tube 40 so as to form fifteen (15) subchambers per tube 40 for a total of thirty (30) subchambers 22 in the system. RemotePure version 4.0 had two tubes 40 with eighteen (18) baffles 21 per tube 40 so as to form nineteen (19) subchambers 22 per tube 40 for a total of thirty eight (38) subchambers 22 in the system. The volume of each of the three units tested was the same. As Table I shows, and as will be discussed in the next paragraph, the two systems yielded comparable results.

Two flow rates of water were run through each system. The first flow rate was five hundred (500) gallons per hour (GPH) and the second flow rate was three hundred (300) gallons per hour. The water flowing through the system was infused with MS-2 and *E. coli* in accordance with the US EPA Guide Standard and Protocol for Testing Microbiological Water Purifiers, available from the United States Envioronmental Protection Agency, Registration Division, Office of Pesticide Programs and Criteria and Standards Division, Office of Drinking Water, Washington, D.C. (1987), p. 39.

The results shown in Tables I and II were based on tests which were intended to provide valid measurements similar to those which would have been achieved by following the above-cited guide standard, but, for reasons of cost and time, did not conform completely to the Guide Standards. Thus Tables I and II show the results of these tests which were similar to but not in exact conformance with the Guide Standard. In each test a reservoir of purified water had a carefully measured quantity of MS-2 and *E. coli* pathogens added and mixed all in accordance with the Guide Standard. Once the water and pathogens were mixed, the mixture was run through each system until the appropriate number of system volumes (sometimes called "unit volumes") had been passed through the system. Each run involved the generation of about twenty five (25) watts of UVC light per lamp. The concentration of surviving pathogens in the water output from the system was measured by pipetting a metered quantity of output water from the system into a container containing constituents as described in the Guide Standard and incubating the resulting contents in accordance with the Guide Standard. The resulting pathogen conservation was measured in accordance with the Guide Standard. Tables I and II show these results.

Thus Table I shows with one exception that for both three hundred (300) and five hundred (500) gallons per hour flow rates, the percent reductions in pathogens exceed five nines (i.e. was in excess of ninety nine point nine nine nine five percent (99.9995%) in both the thirty (30) baffle system and the thirty eight (38) baffle system. The one exception shows only a ninety nine point six two percent (99.62%) reduction. This data is believed to be an unexplained anomaly.

TABLE I

| System With Baffles | | | | |
|---|---|---|---|---|
| Flow Rate (GPH) | Influent PFU/L | Effluent PFU/L | Log Reduction | Percent Reduction |
| MS-2 Reduction by RemotePure version 3.0 - Thirty (30) baffle system Results are given as plaque forming unit per liter (PFU/L) | | | | |
| 500 (1A) | 3.42e7 | <1.67e2 | >5.31 | >99.9995 |
| 300 (1B) | 3.42e7 | <1.67e2 | >5.31 | >99.9995 |
| *E. coli* Reduction by RemotePure version 3.0 - Thirty (30) baffle system Results are given as colony forming unit per liter (PFU/L) | | | | |
| 500 (1A) | 6.07e7 | 1.10e2 | 5.74 | 99.99984 |
| 300 (1B) | 6.07e7 | 2.00e1 | 6.48 | 99.999971 |
| MS-2 Reduction by RemotePure version 4.0 - Thirty eight (38) baffle system Results are given as plaque forming unit per liter (PFU/L) | | | | |
| 500 (2A) | 6.45e7 | <1.67e2 | >5.59 | >99.9997 |
| 300 (2B) | 6.45e7 | <1.67e2 | >5.59 | >99.9997 |
| *E. coli* Reduction by RemotePure version 4.0 - Thirty eight (38) baffle system Results are given as colony forming unit per liter (PFU/L) | | | | |
| 500 (2A) | 5.30e7 | <1.10e3 | >6.78 | >99.99998 |
| 300 (2B) | 5.30e7 | 1.00E5* | 2.78 | 99.62 |

Table II shows the results for a system identical in all respects with the two systems used to obtain the results shown in Table I except no baffles were used with the tubes in the systems. Table II shows that the percent reduction in pathogens declines as the flow rate increases. Note that the highest percent reduction in pathogens is ninety nine point eight two percent (99.82%) in the system with no baffles at 300 gph. A comparison of the results achieved using the systems with baffles to the results achieved using the system without baffles shows that the overall percent reduction in pathogens is at least two orders of magnitude higher for the systems used in the tests with baffles compared to the identical system used in the tests without baffles. This increase in water purity caused by the baffles in the system may significantly prevent the transmission of water-borne diseases in the water produced by the system. The increase in water purity for the same flow rate and the same UVC energy represents a significant energy savings over the prior art, which is achieved by using the baffles in the system.

TABLE II

| System With No Baffles | | | | |
|---|---|---|---|---|
| Flow Rate (GPH) | Influent PFU/L | Effluent PFU/L | Log Reduction | Percent Reduction |
| MS-2 Reduction by RemotePure version 2.0 Results are given as plaque forming unit per liter (PFU/L) | | | | |
| 300 | 4.80e7 | 8.80e4 | 2.74 | 99.82 |
| 500 | 4.80e7 | 3.52e5 | 2.13 | 99.27 |
| 700 | 4.80e7 | 2.50e6 | 1.28 | 94.76 |
| *E. coli* Reduction by RemotePure version 2.0 Results are given as colony forming unit per liter (PFU/L) | | | | |
| 300 | 1.03e8 | 1.70e3 | 4.77 | 99.9983 |
| 500 | 1.03e8 | 2.10e4 | 3.68 | 99.987 |
| 700 | 1.03e8 | 6.10e5 | 2.22 | 99.38 |

The embodiments of the invention as tested achieved significant improvements in the purification of water flowing through a purification chamber with subchambers as compared to the same volumetric flow rate of water through a purification chamber without subchambers. Although the reasons behind this are not clearly understood, it is believed that the subchambers cause each particle of water to be exposed to UVC radiation in a manner such that each particle of water receives approximately the same UVC radiation as opposed to prior art systems where water flows directly through a tube. In the prior art systems it is believed that some particles of water flow rapidly along the tube and therefore receive less UVC exposure while other particles of water receive more UVC exposure. However, the purification at the end reflects the average of the impurities in all the particles of water and therefore the total purification is less than has been achieved with the structure of this invention. It is believed that the subchambers cause each particle of water to receive a substantially uniform UVC radiation thereby insuring that all particles of water have any impurities destroyed at a fairly uniform rate. As shown by the test results in Table I, approximately two to three (3) orders of magnitude improvement in purification of water is achieved using the structure of this invention compared to the prior art structures.

Another way of looking at the basis for the results achieved by this invention is that the baffles 21 and subchambers 22 ensure that the statistical distribution of the dwell times for each particle of water in tube 40 is very tight with a small standard deviation. On the other hand, prior water purification systems allowed the particles of water to flow through the system over a wide range of dwell times thus allowing some particles to leave the system with relatively low exposure to UVC radiation. Thus for the same flow rates of water through a system in accordance with this invention and through prior systems, the killing of pathogens is much more effective with the system of this invention due to the more tightly controlled (i.e. more uniform) dwell times.

Figure 25:
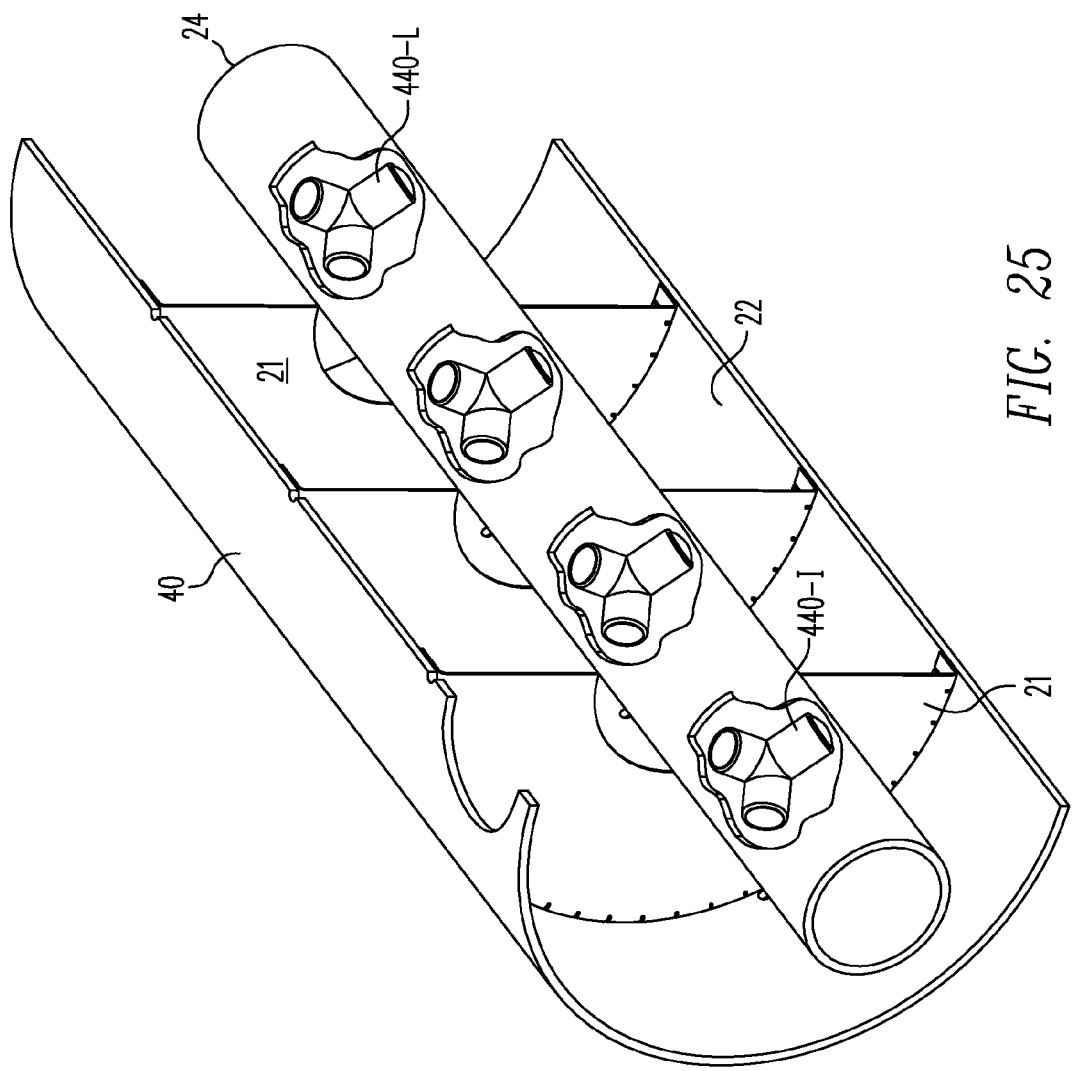
FIG. 25 shows central UVC emitting LED sources arranged in a central transparent tube extending through openings in baffles.

In one embodiment, central openings 263 in the baffles 21 (FIG. 9) form an annulus 23 (FIG. 4) adjacent to the lamp 20 which forces water through a narrow channel to increase the exposure of the water to the UV light as the water moves from subchamber 22-$n$ to subchamber 22-($n$+1) as shown in FIGS. 3 and 4. Because the UVC lamp 20 is a tube light source, the water receives maximum radiation exposure if the lamp 20 is located along the center axis of a cylindrical flow tube 40 or subchamber 22-$n$. The UVC emitting lamp 20, or a quartz or FEP coated quartz tube 24 surrounding lamp 20 (see FIG. 12, for example), is preferentially located along the central axis of the tube 40. Alternately, two or more UVC emitting lamps 20 or a set of UVC emitting LEDs are located inside a quartz tube along the center of each subchamber 22-$n$ to illuminate each subchamber 22-$n$ in the same fashion as the germicidal lamp does while using baffles 21 to define the subchambers 22 as in the present design. Alternately, a microwave UVC source could be used instead of the UVC emitting LEDs. The configuration of a tube or subchamber 40 with LEDs is shown in FIG. 25. Alternately, the tube 40 can be elliptical or another shape and the baffles 21 do not need to be circular.

In each subchamber 22-$n$ along the length of the tube 40, the water flows into the subchamber 22-$n$, remains for a certain amount of time, and then flows to the next subchamber 22-($n$+1). The amount of UVC energy each pathogen receives in each subchamber 22-$n$ is a function of the flow rate, the volume of the subchamber 22-$n$ and the cross-sectional area available for water to flow to the next subchamber 22-($n$+1). For a given flow rate (or pressure difference between subchambers), experiments have demonstrated an optimal ratio of subchamber volume to cross sectional flow area for an optimal kill rate of pathogens in the water for a given total lamp length. As each subchamber 22-$n$ becomes longer, the water spends more time in the subchamber 22-$n$ and receives more UVC radiation. However, not until the water passes to the next subchamber 22-($n$+1) is the water now at a certain confidence level of average purity because the water in subchamber 22-$n$ has on average received a certain amount of UVC energy up to the point where it crosses into the next subchamber 22-($n$+1). Therefore, the greater the number of subchambers 22-$n$, the greater the likelihood that each subchamber 22-$n$ contains water of a certain minimum purity, up to the point where the volume of a subchamber 22-$n$ is small enough relative to the flow area that much of the water flows through to the next subchamber 22-($n$+1) without spending enough average time in each subchamber 22-$n$ before release to the next subchamber 22-($n$+1). In addition, there may be an effect due to water currents in each subchamber 22-$n$ that acts to contain the water in each subchamber 22-$n$ for a certain amount of time.

For example, if the UV energy in each subchamber 22-$n$ kills twenty five percent (25%) of the waterborne pathogens present in that subchamber, then each subchamber passes seventy five percent (75%) of its incoming live pathogens on to the next subchamber 22-($n$+1). Therefore, a system with forty (40) subchambers 22 would have $(0.75)^{40}$ of the total incoming pathogens still alive in the water at the exit from the system. Since $(0.75)^{40}$ equals approximately 0.00001, this example system would remove all but 0.001% of the incoming pathogens, corresponding to a 99.999% pathogen removal.

FIG. 9 shows a simple baffle 21 with an opening 263 in the center to allow water to flow around the germicidal lamp 20 which extends through this opening 263. At the top of this baffle 21 is a small opening 261 to allow air to escape to prevent air from displacing the water in the subchambers 22, which would adversely affect the efficiency of the unit by reducing the effective volume in each subchamber 22-$n$. The air bleed slot 261 in each baffle 21 allows the excess air to escape from the system upon startup and during operation to prevent the formation of air pockets in the upper portions of each subchamber 22. The bled air travels down the length of tube 40 through the bleed slots 261 on each baffle 21 to the end of the tube 40, where this air is eliminated.

Preferentially, each baffle 21 has a slot or protrusion 262 (FIG. 9) or other locating feature 262 on its inner circumference 265 surrounding opening 263 as shown in FIG. 9 to align the baffle 21 during manufacturing to keep the air bleed hole 261 at the top of the baffle. This baffle 21 can be used with polymeric outer tubes 40 which are softened to embed and surround the outer circumference or edge 264 of the baffle 21 to hold it in place as described below.

There is a slight leakage of water from subchamber 22-$n$ to subchamber 22-($n$+1) through the bleed slots 261 which slightly decreases the efficiency of the system. Alternately, to prevent the slight leakage from subchamber to subchamber, the air bleed slots 261 are not used and small holes (not shown) are placed along the top of each subchamber 22-$n$ to allow the air to escape from the subchamber 22-$n$. These small holes bleed the air to a plenum separate from the main flow subchambers 22-1 to 22-N where the air is released.

The baffles 21 are preferentially constructed of stainless steel or anodized aluminum because of the excellent UVC reflectivity and UVC durability of these materials. The baffles 21 should be thin to minimize volume and weight. Alternately, the baffles 21 can be fabricated from corrosion resistant or plated steel, or UVC resistant polymers such as polyimide, polytetrafluoroethylene (PTFE), fluorinated ethylene propylene (FEP), polyvinylidene fluoride (PVDF), polyetheretherketone (PEEK), or polyetherimide (PEI). Alternately, the baffles 21 may be constructed of PVC or polycarbonate or acrylic or other non-UVC resistant polymer material if carbon black or other UV inhibitor is added to the polymer to prevent UVC damage.

Figure 10:
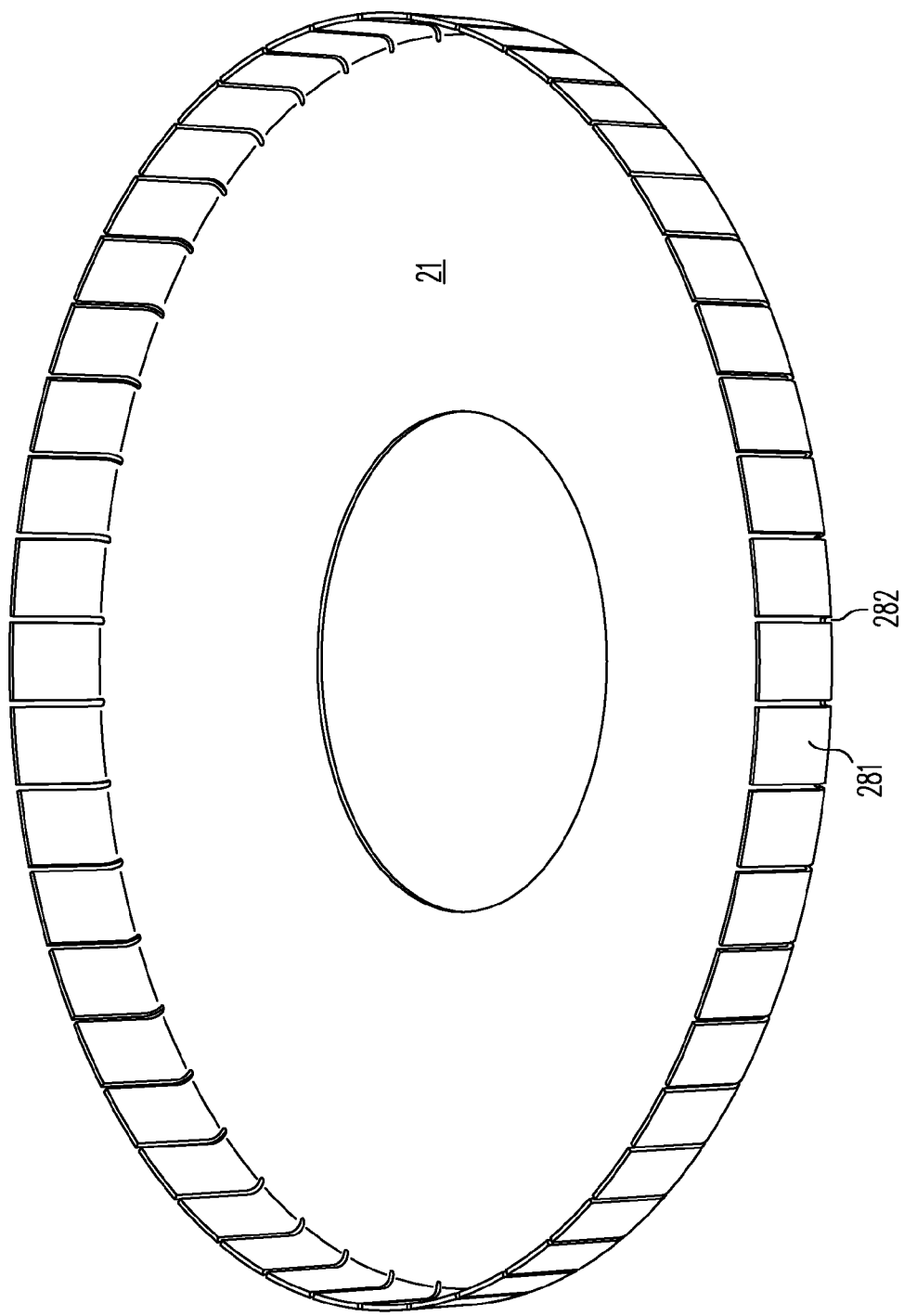
FIG. 10 shows a baffle with peripheral tabs.
Figure 26:
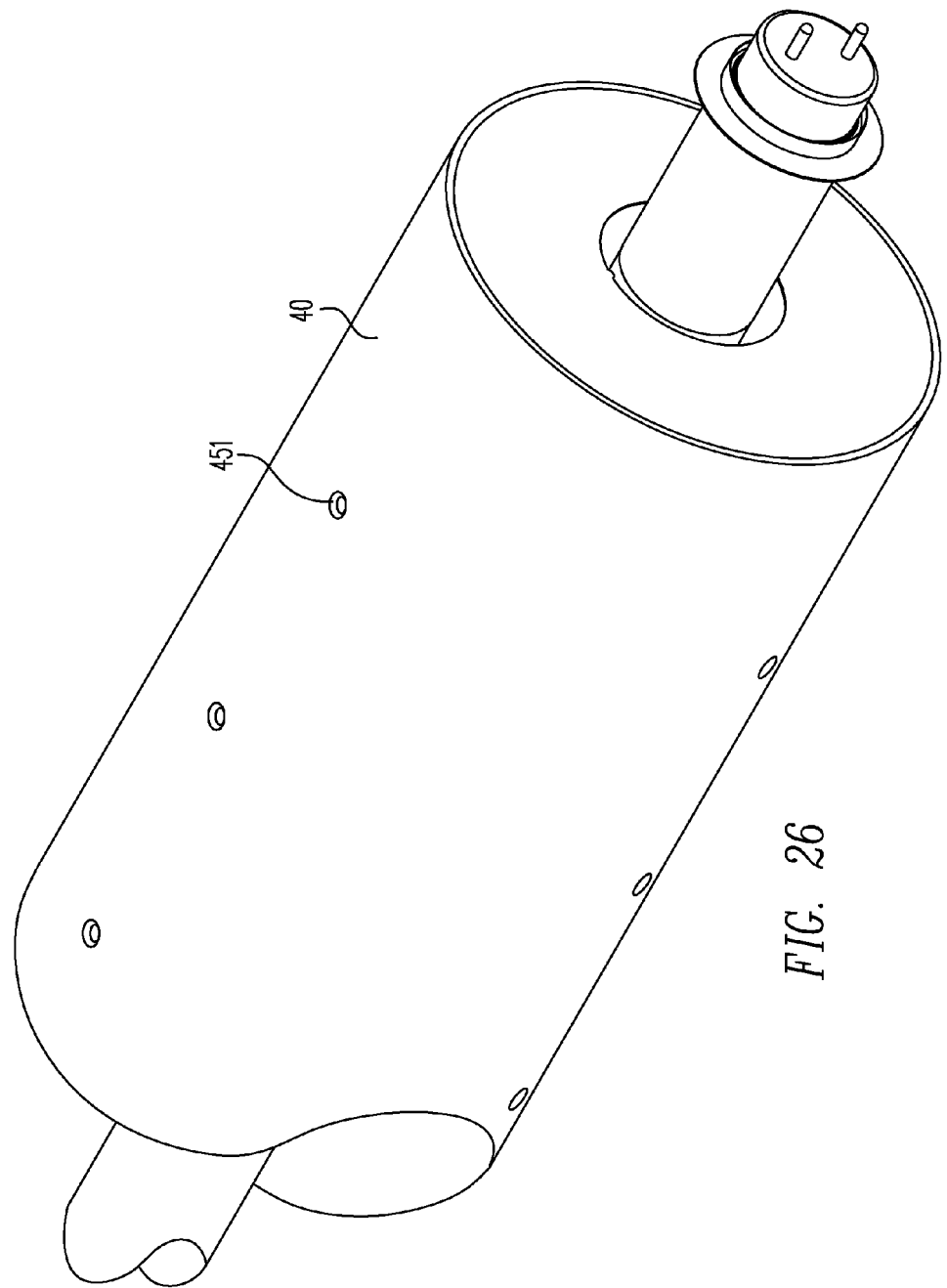
FIG. 26 shows a purification tube with weld holes.

FIG. 10 shows another simple baffle 21 with tabs 281 around the outer periphery. Tabs 281 serve several purposes. When baffle 21 is inserted into a metallic tube 40, the tabs 281 are deflected by the inner surface of tube 40 and can deform to compensate for variations in diameter and circularity which may occur in the tube 40 manufacturing process. This deformation prevents water flow around the outer edge 264 (FIG. 9) of the baffle 21. One or more of the tabs 281 may be welded by TIG or by laser or other processes to the tube wall to affix the baffle 21 to the tube 40. Several holes 451 (FIG. 26) in the wall of the tube 40 may be used for welding each baffle 21 in place.

A small amount of water will escape through the slots 282 between the tabs 281. These openings allow trapped air to escape to the last subchamber 22-N where the air is vented to the inlet, outlet, or bleed valve 42 (FIG. 3).

Each baffle 21 may have ridges or patterns stamped into it to increase its stiffness. These ridges or patterns may be shaped to increase the beneficial currents inside adjacent subchambers 22-$n$ and 22-($n$+1) to increase the effectiveness of pathogen removal.

By creating a swirling or rotation of the water in each subchamber 22-$n$, the pathogens can be constrained to narrow the distribution of living pathogens over the length of the chamber. Each volume element of water and thus each pathogen spends a more uniform time in each subchamber 22-$n$ and therefore absorbs more UV energy per subchamber 22-$n$ to kill more pathogens. Fins can be added to the baffles 21 or to the interior walls of each subchamber 22-$n$ to enhance this swirling effect as described below. In one embodiment, the system can alternate the water swirling direction from subchamber 22-$n$ to subchamber 22-($n$+1) by alternating right hand and left hand oriented baffles.

Creating a current in each subchamber 22-$n$ with a velocity component normal to the longitudinal axis of the tube 40 may improve the likelihood of the average pathogen cell receiving an increased amount of UVC irradiation before it advances to the next subchamber 22-($n$+1) and mixes with the other water and surviving pathogens in the next subchamber 22-($n$+1) as compared to a design in which the flow is purely along the axis of each subchamber 22-$n$. This effect is offset by the effect of less radiation from lamp 20 at a further distance from lamp 20.

Figure 11:
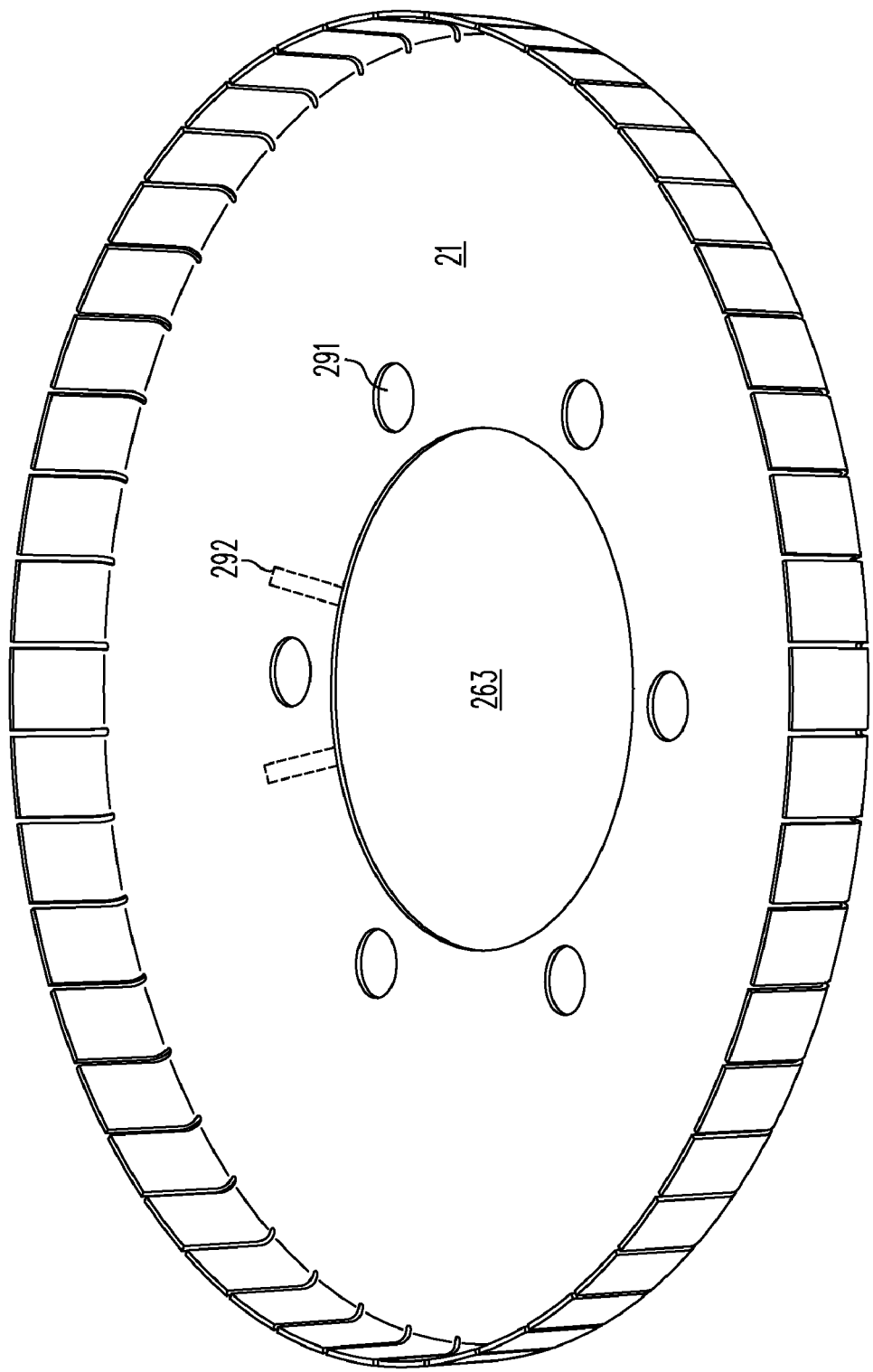
FIG. 11 shows a baffle with peripheral tabs and array of circumferential holes.

In order to reduce the dependency of the flow area into and out of each subchamber 22-$n$ on the tolerance of the lamp 20 diameter, each baffle 21 can be perforated with holes 291 or slots 292 near the opening 263 through which lamp 20 passes. FIG. 11 shows a baffle 21 with holes 291 around the center opening 263. Holes 291 can compensate for tolerance variations in lamp diameter or lamp coating thickness. By reducing the diameter of center hole 263 to be closer to the outside diameter of the lamp 20, the holes 291 together with the clearance between the lamp and the center opening control the rate of water flow through the baffle 21. Because the hole diameters can be carefully manufactured, they can more precisely control the water flow than the opening around the lamp by itself. Optional slots 292, which serve the same purpose, are shown in FIG. 11.

Figure 12:
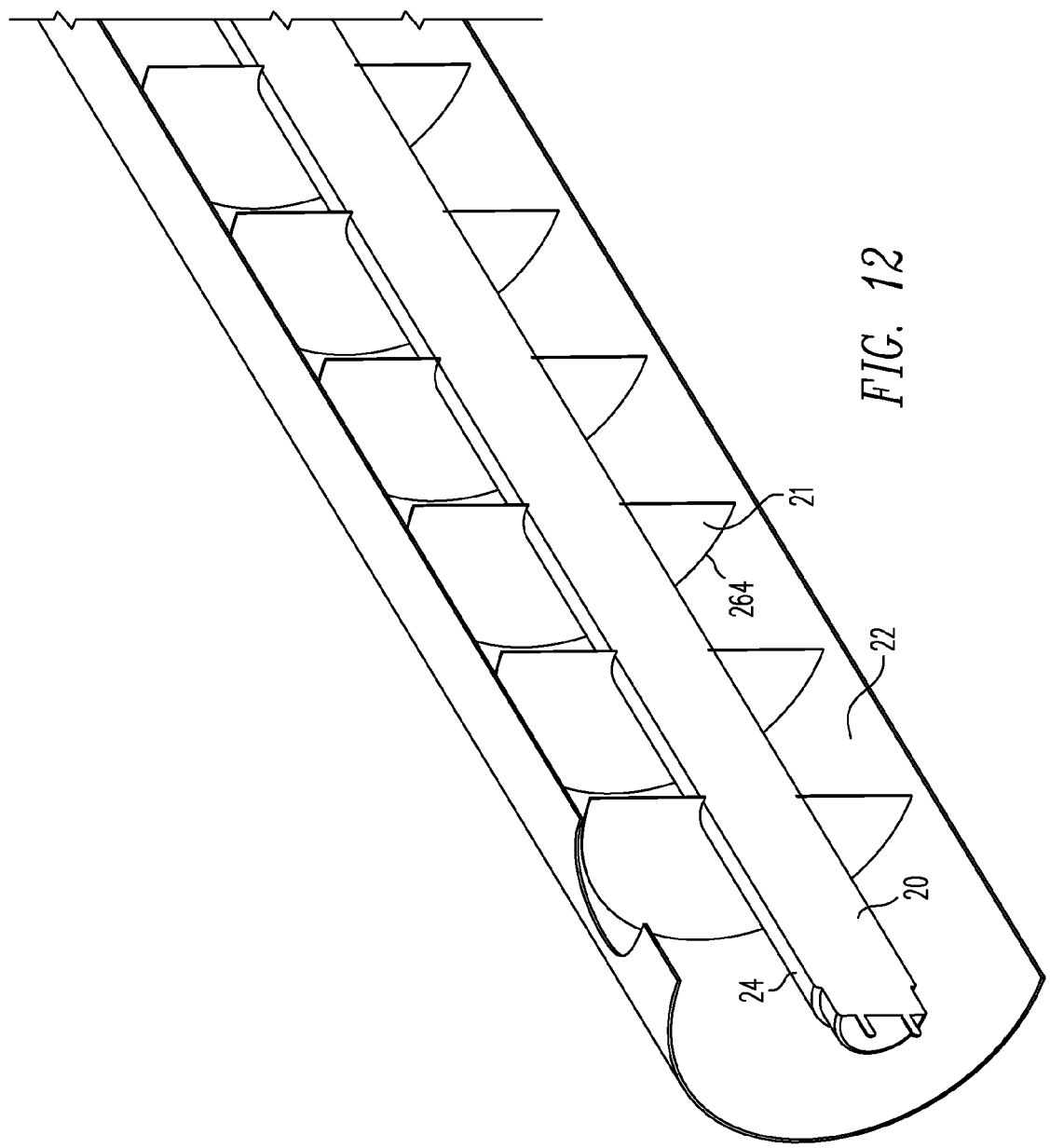
FIG. 12 shows baffles mounted in a subchamber with a lamp through an opening in each baffle with fluid flow occurring in the outer periphery around each baffle.

Alternately, the baffles 21 may be mounted directly in contact with the lamp 20 or the center quartz tube 24 which surrounds the UVC source as shown in FIG. 12. In this design, the water flows around the outside edge 264 (FIG. 9) of the baffle 21, between the baffle outer circumference 264 and the inner wall of the purification tube 40. This embodiment requires that the outer diameters of baffle 21 be somewhat less than the inner diameter of tube 40 to leave an annular-shaped opening through which water can flow. In one embodiment tabs extend from the baffle 21 to the inner wall of tube 40 to allow baffle 21 to be attached to tube 40. In another embodiment, baffles 21 are mounted on the quartz tube 24.

Alternate Baffle Designs

The various baffle configurations described below are intended to increase the UVC energy absorption of the pathogens from the UVC radiation. In the preferred embodiment, the flow occurs in the turbulent flow regime. A slight pressure reduction from one subchamber 22-$n$ to the next subchamber 22-($n$+1) along the length of the system moves the water from subchamber to subchamber.

Figure 13:
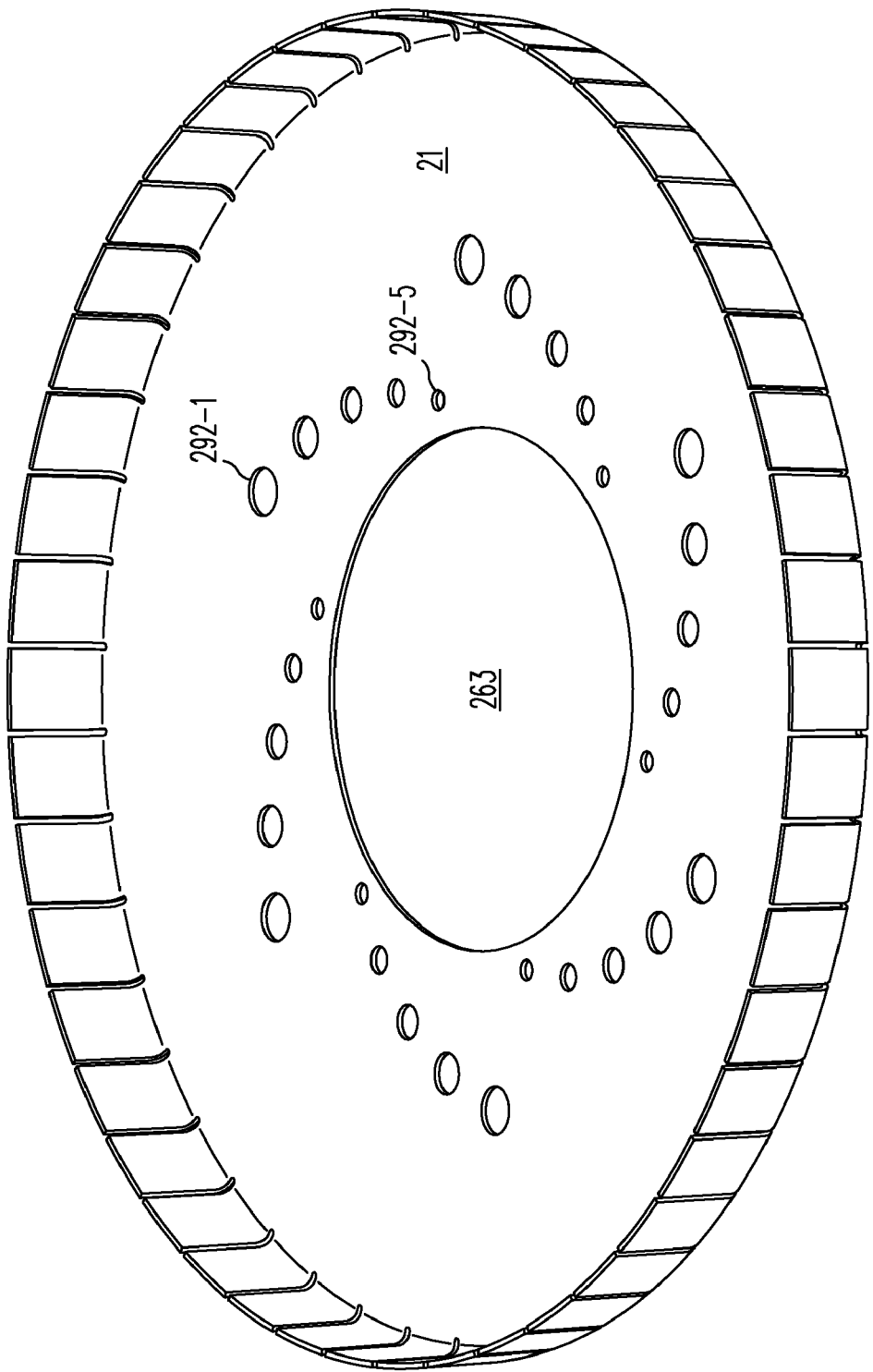
FIG. 13 shows a baffle with spiral array of increasing diameter holes.
Figure 14:
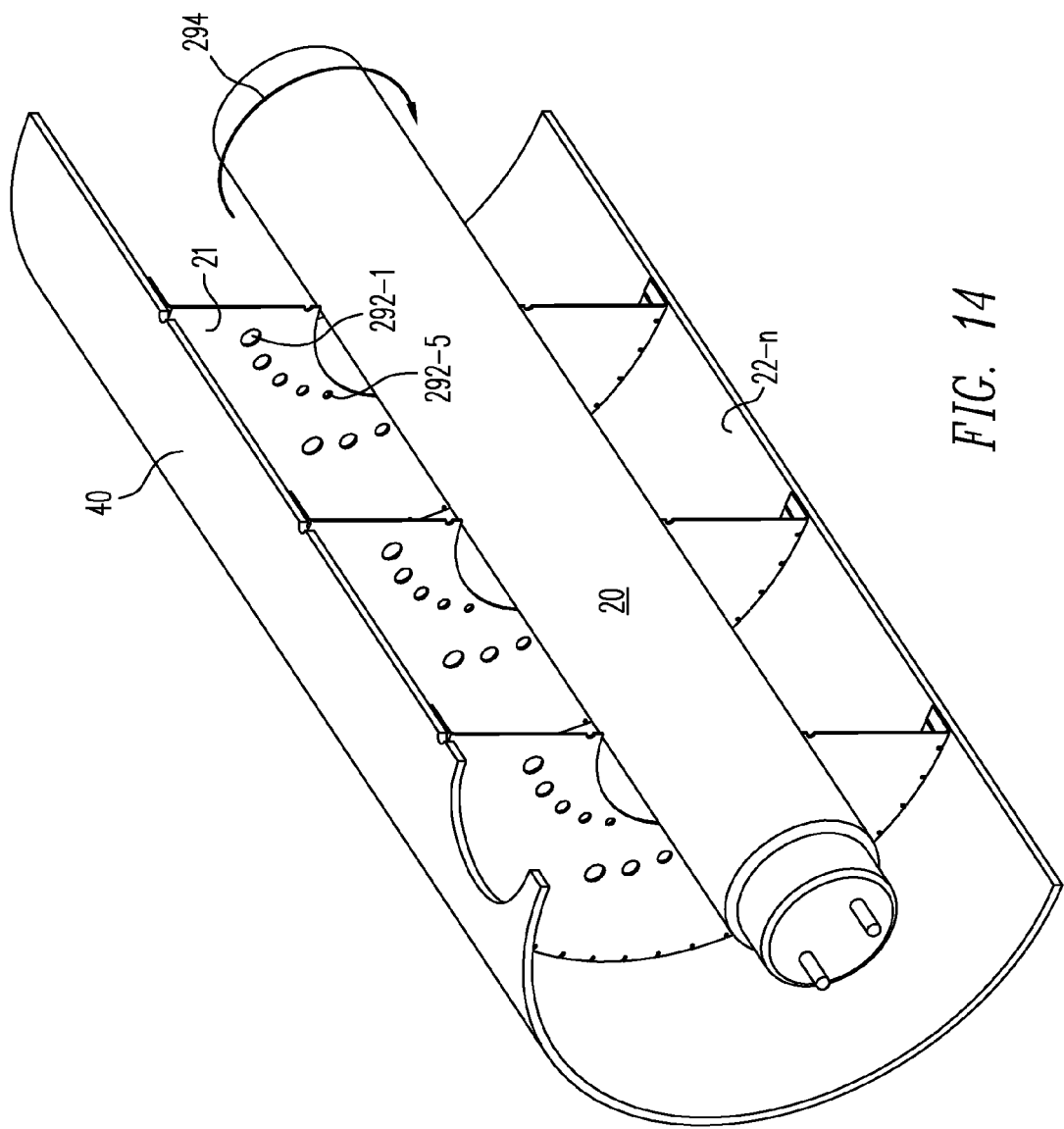
FIG. 14 shows the water current pattern from baffles with spiral holes.

To improve the circulation of flow in the subchambers 22-$n$ so as to increase the average energy exposure a pathogen cell or cyst receives in each subchamber 22-$n$, an array of holes, such as holes 292-1 to 292-5 or slots (not shown but of the same comparable relative size as the holes 292-1 to 292-5) can be placed in the baffle 21 as shown in FIG. 13 with the holes or slots reducing in diameter or size as they get nearer the lamp 20. This baffle design is intended to create a spiral flow pattern in each subchamber 22-$n$ of tube 40 due to the resulting pressure variation in the subchambers as shown by spiral arrow 294 in FIG. 14. Due to the slight increase in the velocity of water for the larger holes 292-1 relative to the smaller holes 292-5 due to the boundary layer effect, a slight spiral current may result in each subchamber 22-$n$ keeping the average pathogen in the subchamber 22-$n$ longer. This can reduce the optimal number N of subchambers 22 along the length of each lamp 20 and possibly even further improve the pathogen kill rate.

Figure 15:
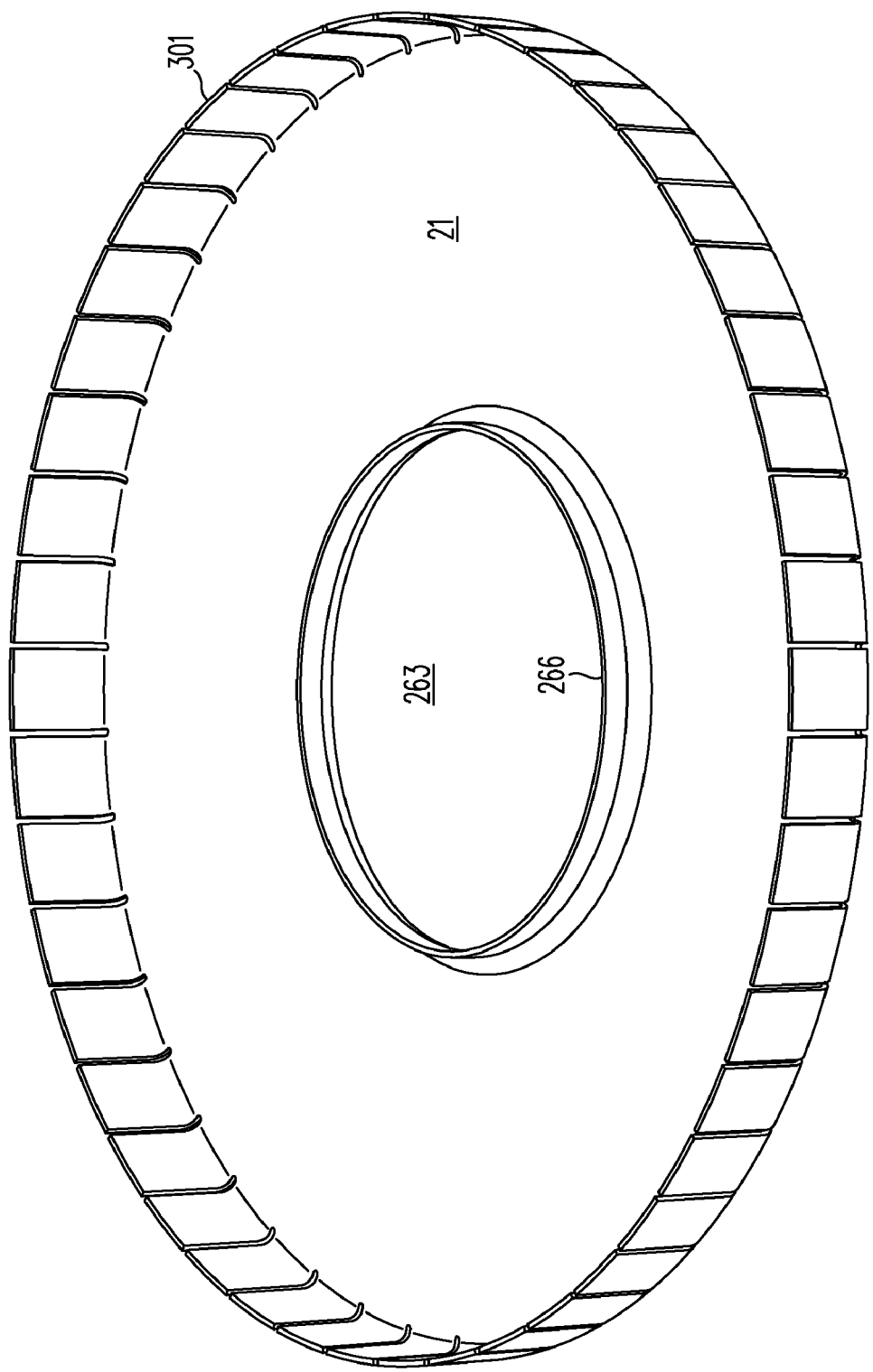
FIG. 15 shows a baffle with a lip on the circumference of the opening in the baffle for a lamp.
Figure 16:
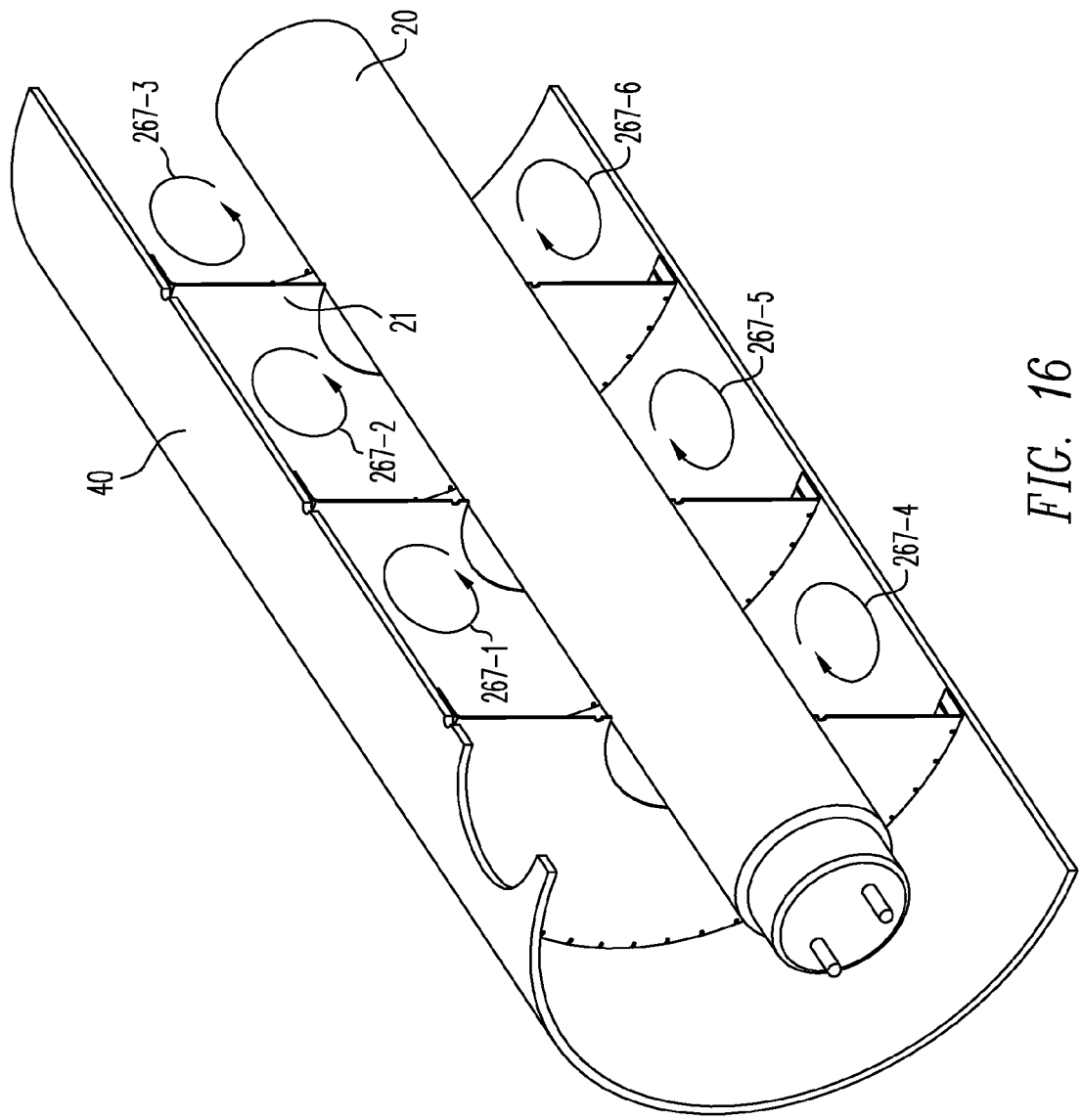
FIG. 16 shows water current pattern from baffles with a lip.

FIG. 15 shows another baffle 21 with an inner circumferential lip 266 on the circumference of inner opening 263. This lip 266 can be used to create toroidal eddy currents in the water flowing past lip 266 as shown by arrows 267-1 to 267-6 in FIG. 16. The eddy currents are created because the water velocity at the inner edge of the lip 266 is greater than the water velocity just outside the lip, creating a toroidal water current in the subchamber. The advantage of the eddy currents is that they may cause the pathogens to be exposed to more UVC energy, increasing the kill rate of the pathogens in the water.

Figure 17:
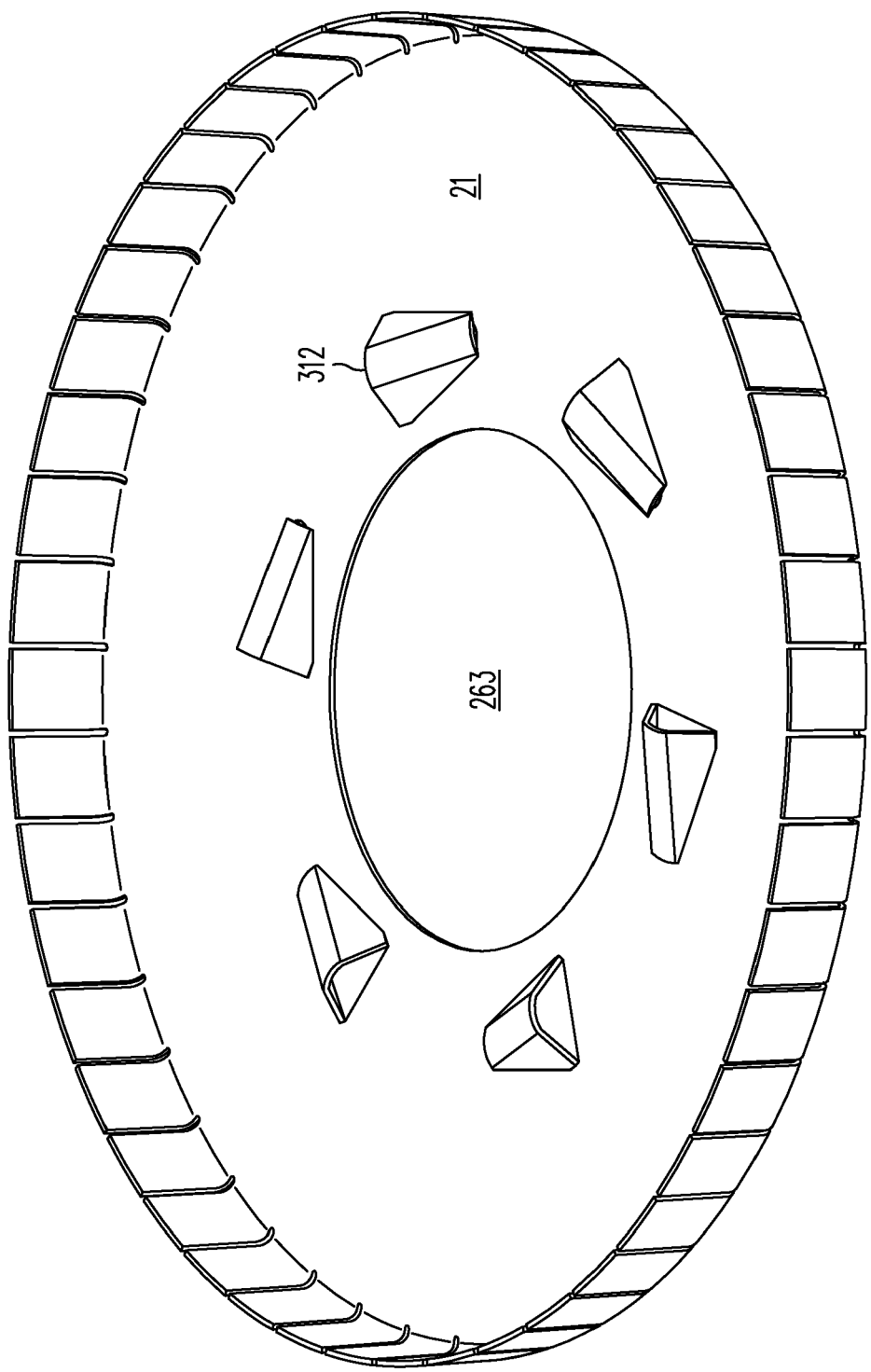
FIG. 17 shows a baffle with ports.
Figure 18:
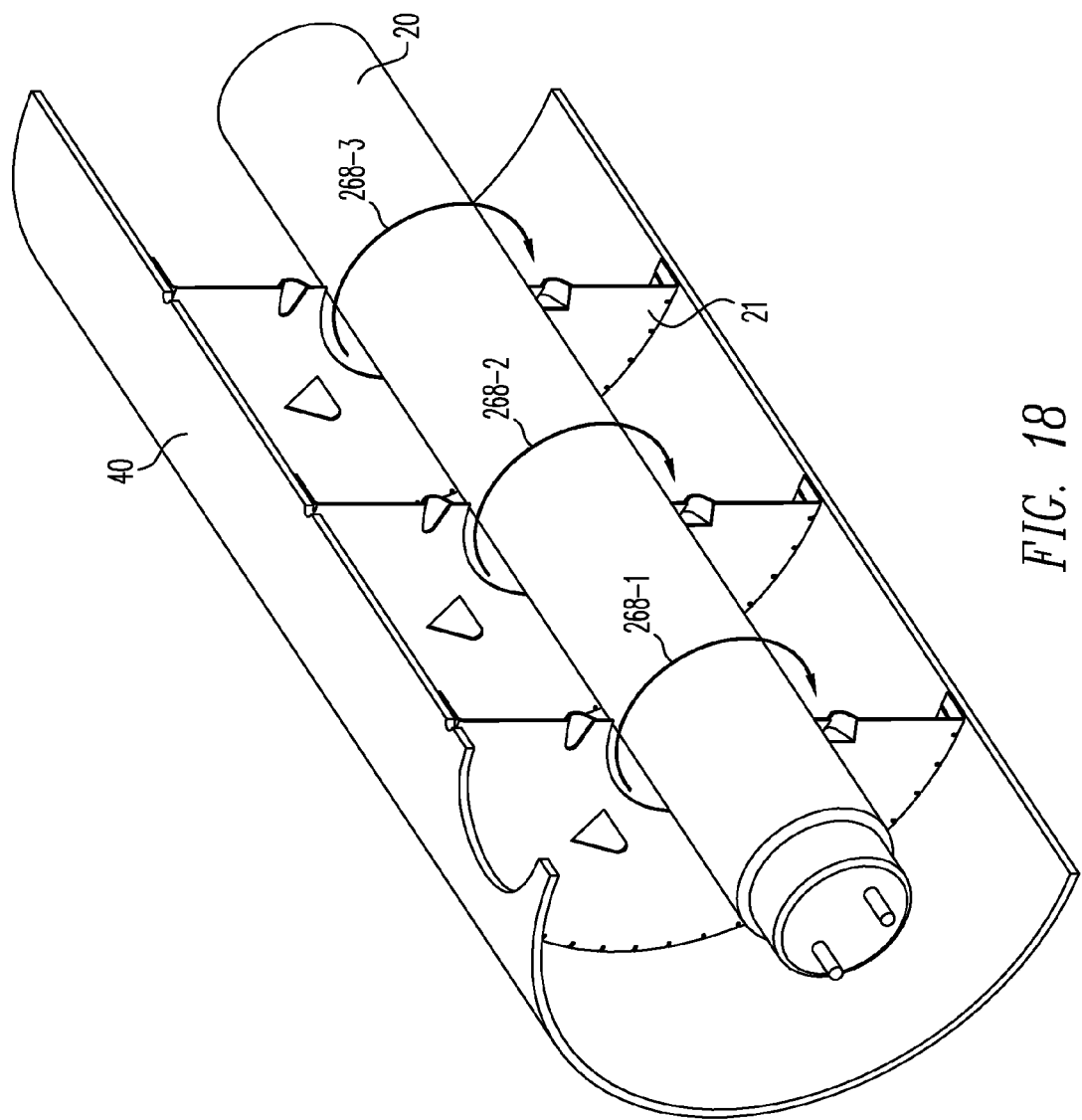
FIG. 18 shows the water current pattern from baffles with ports

FIG. 17 shows a baffle 21 which is also intended to create a circumferential current of water in the next adjacent subchamber 22 by directing the water tangentially as it emerges from the tangentially-directed ports 312 in the baffle 21. An exemplary spiral flow pattern is shown by arrow 268-1 to 268-3 in FIG. 18.

Figure 19:
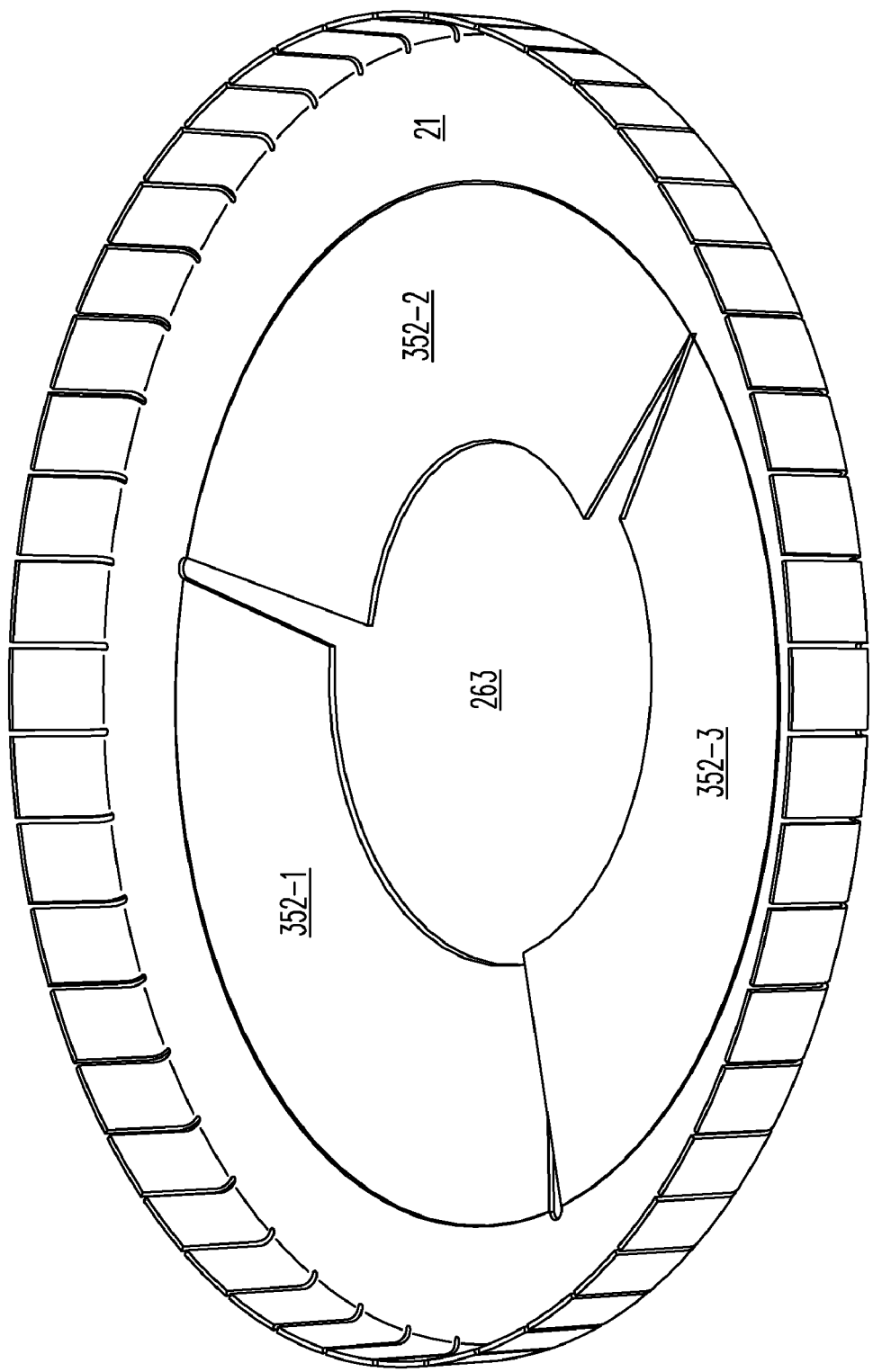
FIG. 19 shows a baffle with a helical inner lip.
Figure 20:
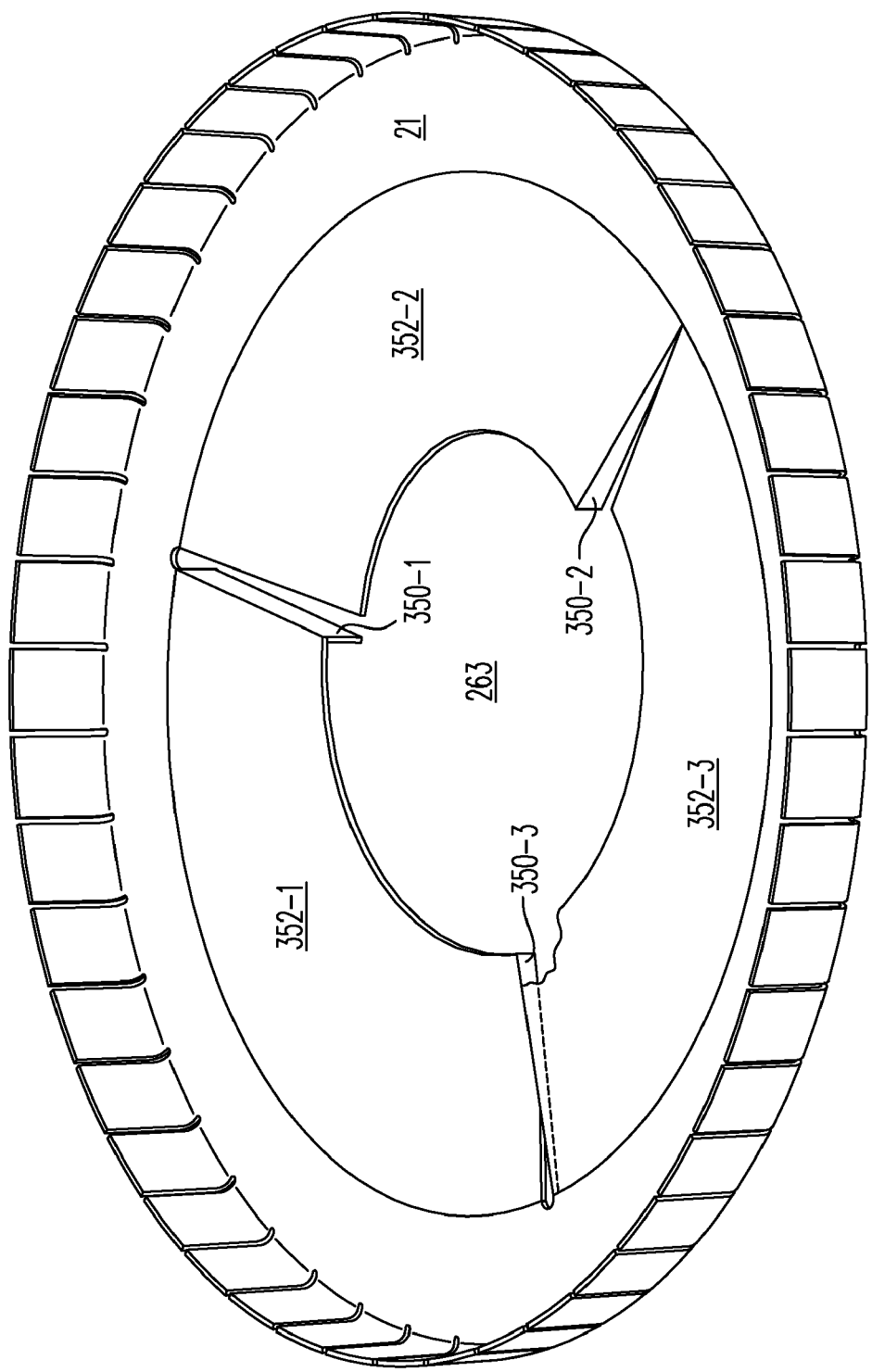
FIG. 20 shows a baffle with a large helical inner lip and leading edge lip.
Figure 21:
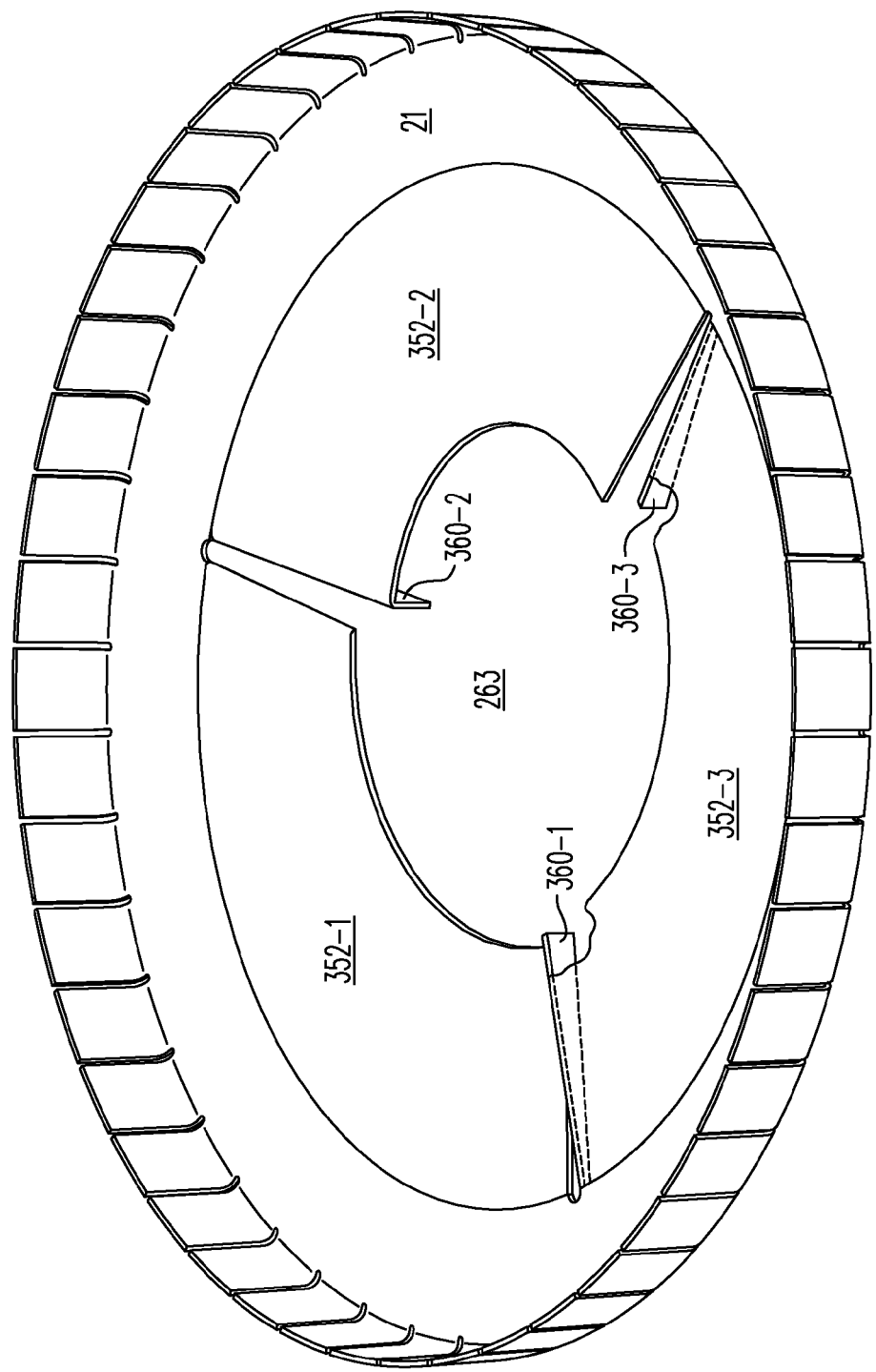
FIG. 21 shows a baffle with a large helical inner lip and trailing edge lip.

FIGS. 19, 20, and 21 show helical faces 352-1, 352-2 and 352-3 adjacent to the center opening 263 in the baffle 21. These helical faces together with opening 263 will also create a circumferential flow in the next subchamber 22-$n$. FIG. 20 includes lips 350-1 to 350-3 on the leading edges of each helical face 352-1 to 352-3, respectively which may cause an eddy current in the water departing from the trailing edge of the previous baffle as the water moves to the next subchamber 22-$n$. FIG. 21 includes lips 360-1 to 360-3 on the trailing edges of helical faces 352-1 to 352-3, respectively which may create a beneficial current effect as well.

Figure 22:
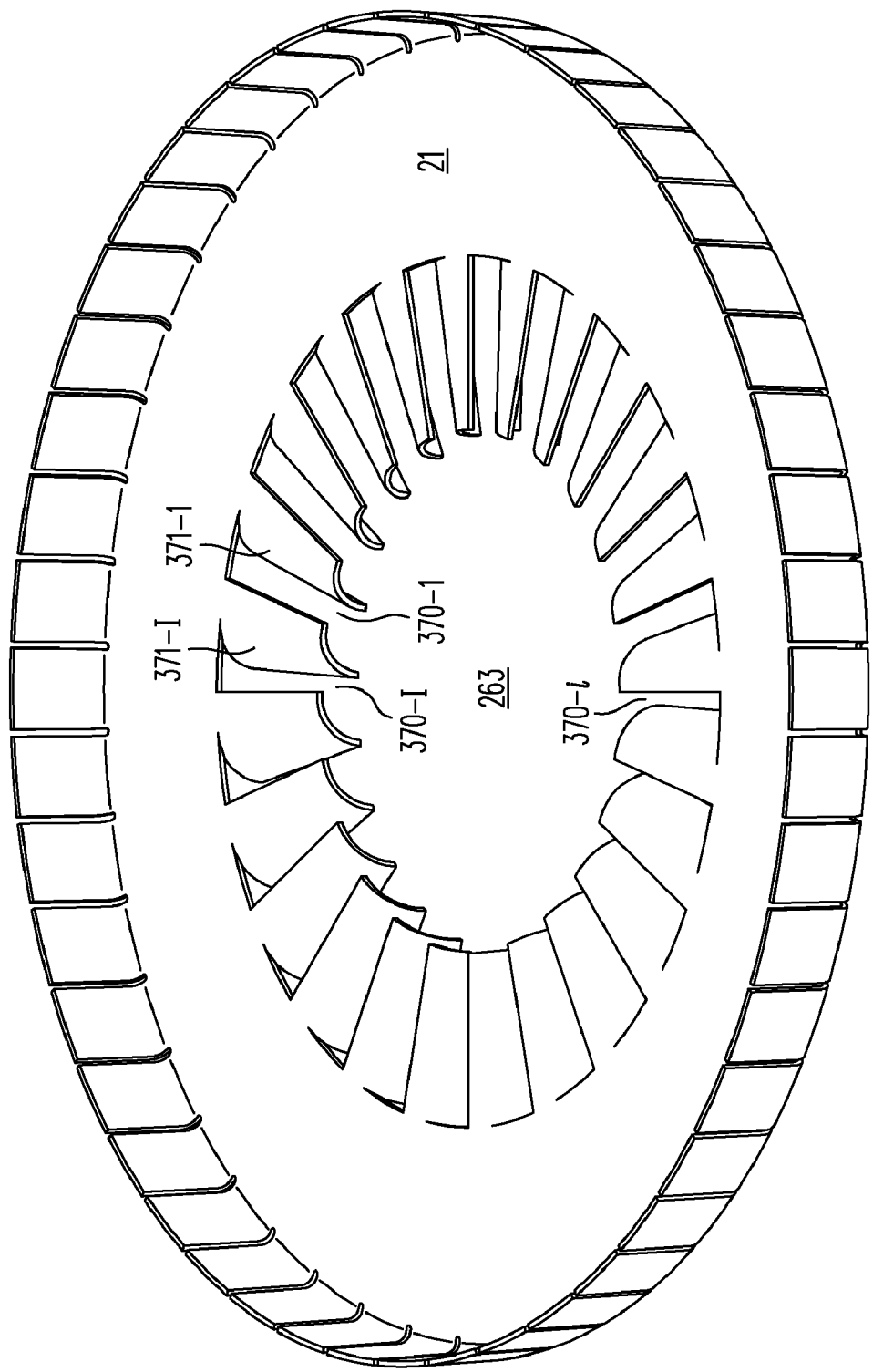
FIG. 22 shows a baffle with curved blades.
Figure 23:
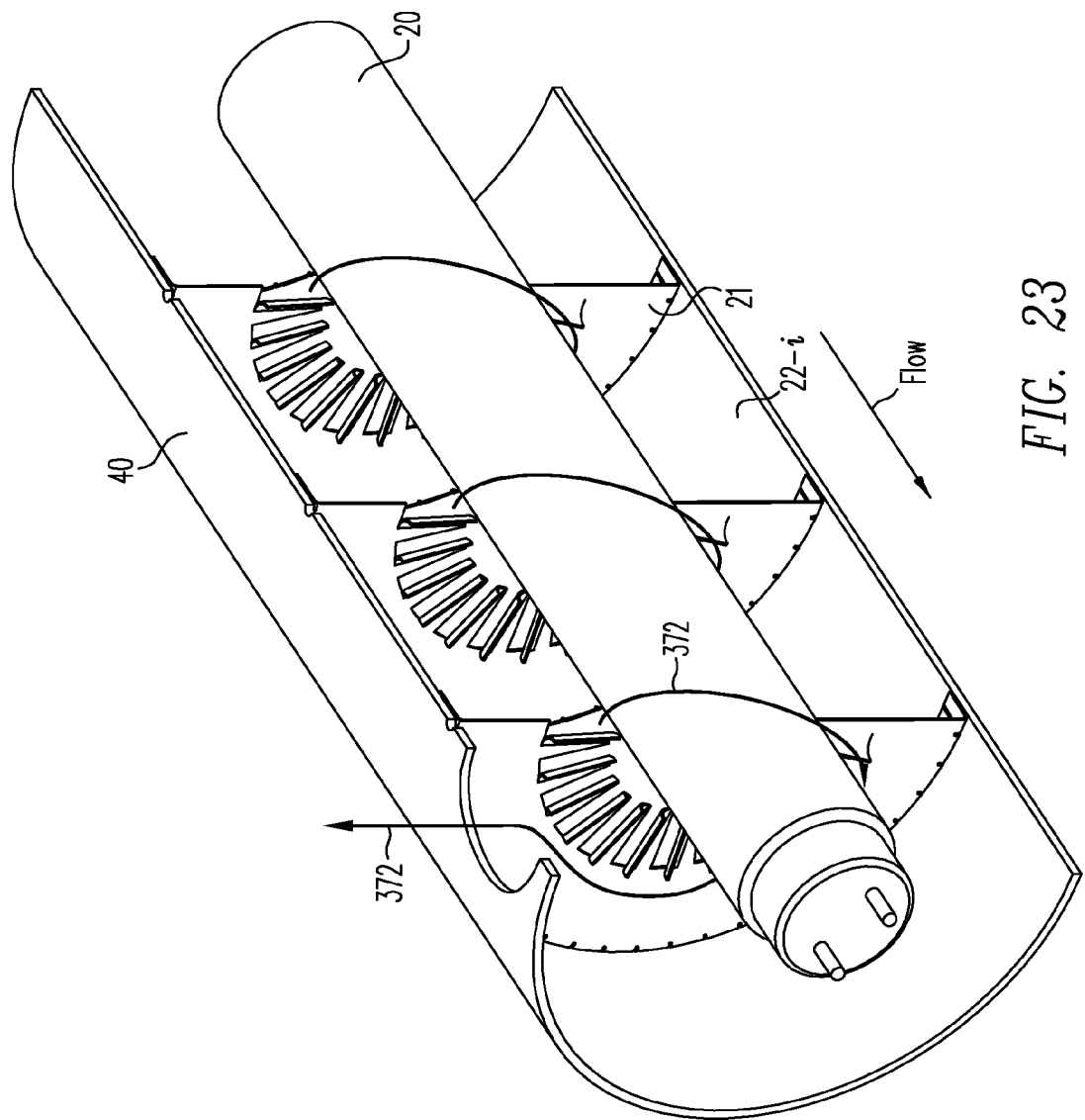
FIG. 23 shows the water current pattern for baffles with curved blades.

FIG. 22 shows a set of radial slots 370-1 to 370-I around the opening 263 in the baffle 21 with curved blades 371-1 to 371-I designed to create a current in the next subchamber 22. The current created as shown by arrow 372 in FIG. 23 is intended to have a circumferential component as well as spiral flow in planes tangent to the lamp 20.

Figure 24:
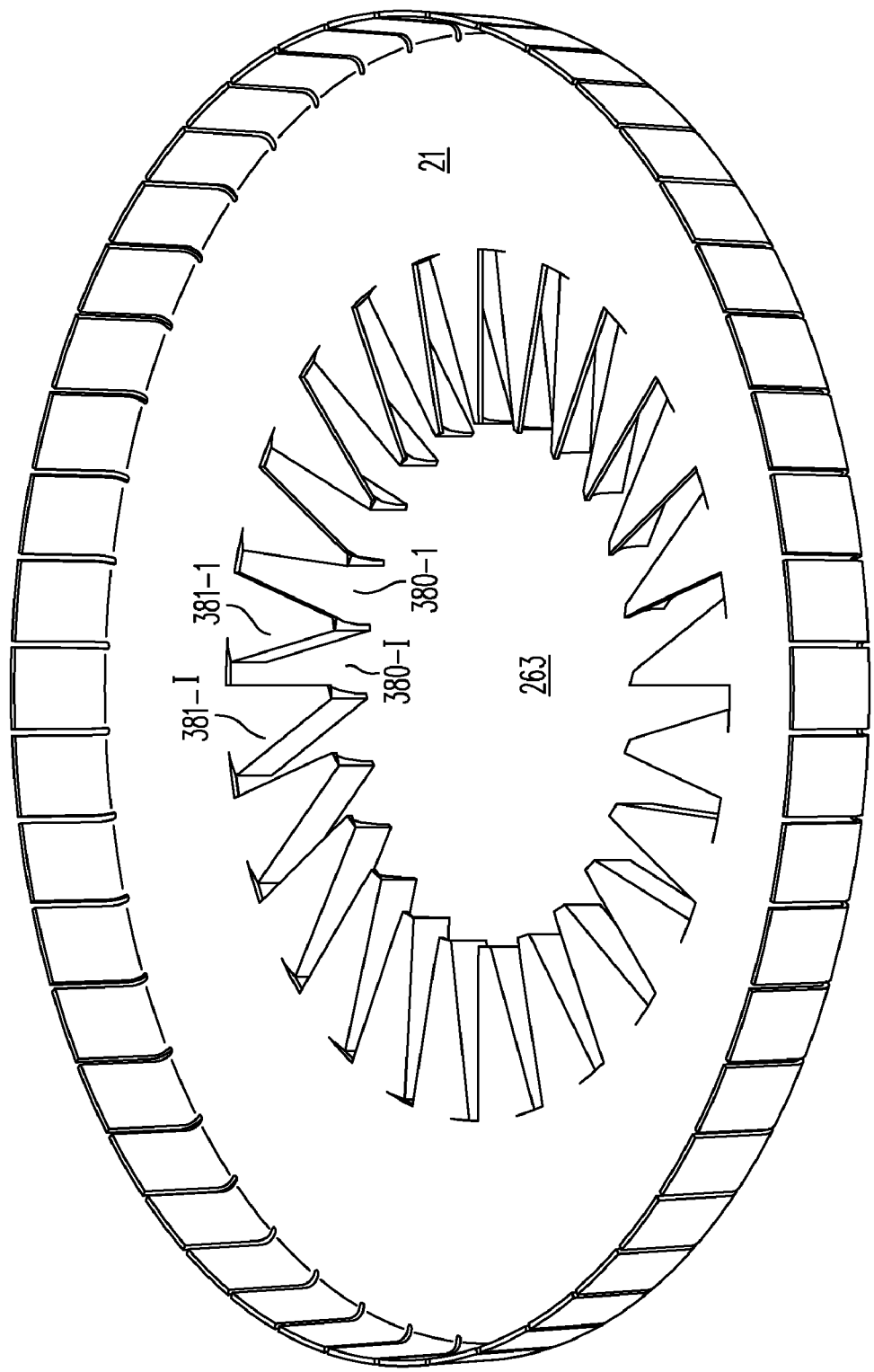
FIG. 24 shows baffles with skewed radial blades.

FIG. 24 shows a baffle structure similar to the baffle structure 21 shown in FIG. 22 with the blades 381-1 to 381-I skewed with respect to the radial lines in the plane of baffle 21 from the center of the lamp 20 and with tighter corner radii.

The above-described baffles 21 may be used in combination in a tube 40 or a tube 40 may use variations of one or more baffle types at various locations in the system.

Flow Testing

Flow testing has been performed on prototype systems to study the effect of subchamber 22-n volume on the pathogen kill rate per unit of energy input for a given flow rate. This testing has demonstrated that there is an optimal ratio of subchamber 22-n volume to baffle flow area which maximizes the kill rate of the pathogens for a given flow rate. As the number of baffles 21 along a given length of tube 40 increases, the pathogen kill rate increases until the ratio of the subchamber 22-n volume to baffle 21 area reaches about 20 cm. Below this optimal value, the addition of more baffles 21 has been found to decrease the pathogen kill rate. Therefore, there exists an optimum number of baffles 21 to maximize the UVC pathogen killing power for a given subchamber 22-n diameter and baffle 21 flow area. The optimum number of baffles 21 will vary depending on the baffle and subchamber design, the flow area, and the flow rate and will be determinable by experimentation.

UVC Lamps

The preferred embodiment uses a 253.7 nm low pressure mercury lamp 20 such as the Philips TUV 75 W HO lamp, which emits over 95% of its energy at a frequency of 253.7 nm. The preferred lamp is manufactured with quartz tubing. Quartz has excellent UVC transmission characteristics and high thermal shock resistance to minimize breakage upon sudden temperature changes such as when cold water comes in contact with a warm lamp.

In the preferred embodiment, the quartz lamp 20 is directly coated with fluorinated ethylene propylene (FEP) which is in direct contact with the water to be purified. The FEP is not degraded by long term exposure to UVC and UVC transmission loss is minimal. If a lamp 20 breaks during operation, the FEP coating will contain the broken quartz and the small amount of mercury vapor in the lamp and prevent them from contaminating the drinking water. Further, the FEP coating reduces the thermal shock to the quartz lamp 20. The coating also acts to reduce the heat transfer coefficient of the lamp 20 to the surrounding water, thus increasing the effective UVC output of lamp 20 in cold water.

The FEP coating 80 (FIG. 7) is beneficial because biomass from the water accumulates at a slower rate on FEP than on the quartz tubes of lamps 20 not coated with FEP or similar material. The FEP has a smoother surface than quartz, which may contribute to this reduced rate of build-up.

In the preferred embodiment, the UVC lamps 20 are sealed directly to the chamber end cap 50 (FIG. 5) using a polymeric seal to allow expansion of the quartz with temperature and to absorb shock if the system is impacted or to allow the tube 40 structure to deflect if overloaded without breaking the lamp 20. This configuration is shown in FIG. 3. The lamp seal is preferentially constructed of PTFE. Alternately, the seal is constructed of FEP, PVDF, PEI, PEEK or other UVC-resistant or UVC stabilized polymer or other material. Alternately the elastomeric seal contains 2% or greater carbon black or other UV inhibitor to prevent UVC damage and cracking of the seal. Power for the lamps 20 is supplied by electrical cables which may be located in a conduit run from the electronics enclosure.

Alternately, the lamp 20 is surrounded by a separate quartz tube 24 (see FIGS. 12 and 36, for example) in contact with the water. Alternately, instead of a single lamp, multiple lamps may be used in a single quartz tube. Alternately, a high pressure mercury lamp may be used instead of a low pressure mercury lamp. Alternately, UVC emitting LEDs can be used in a central FEP coated tube 40, such as LEDs 440-1 to 440-L with frequencies of 260 nm or 280 nm, as shown in FIG. 25. Alternately, a pulsed UVC source can be used instead of the low pressure lamp 20. Alternatively, a microwave UVC source may by used.

Figure 42:
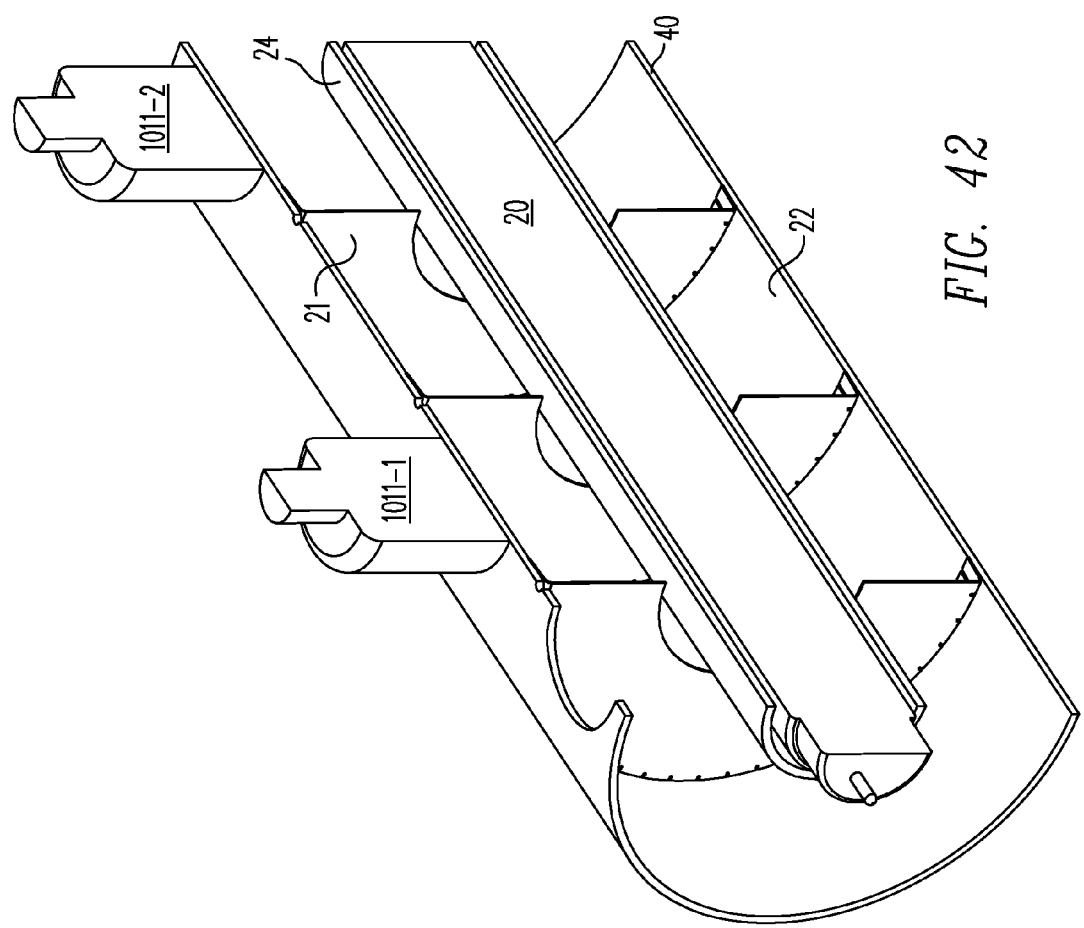
FIG. 42 shows a section view of a system with integrated ultrasonic cleaning of a purification tube.
Figure 43:
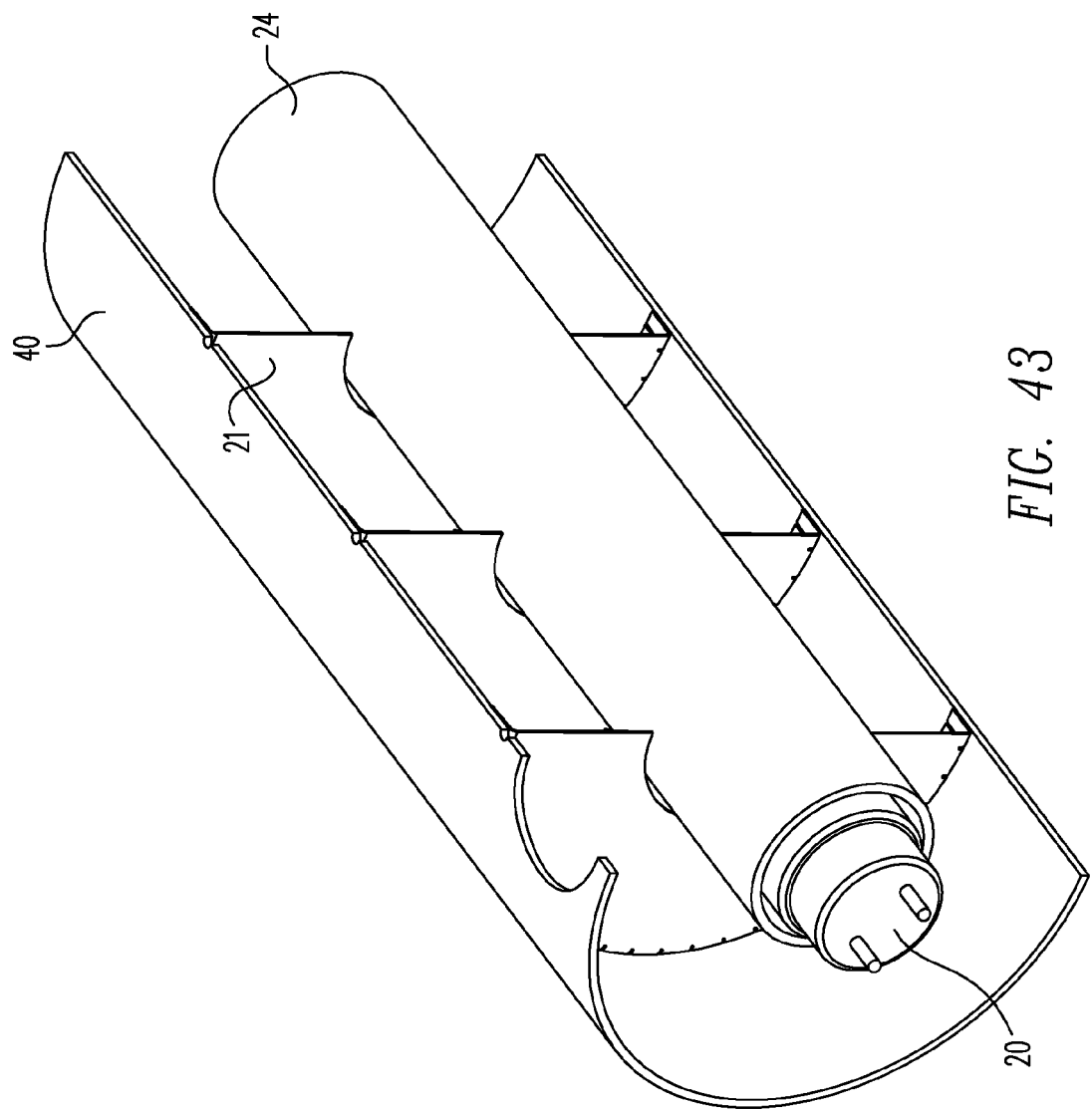
FIG. 43 shows an embodiment of the purification system of this invention with the quartz tube 24 surrounding lamp 20.
Figure 44:
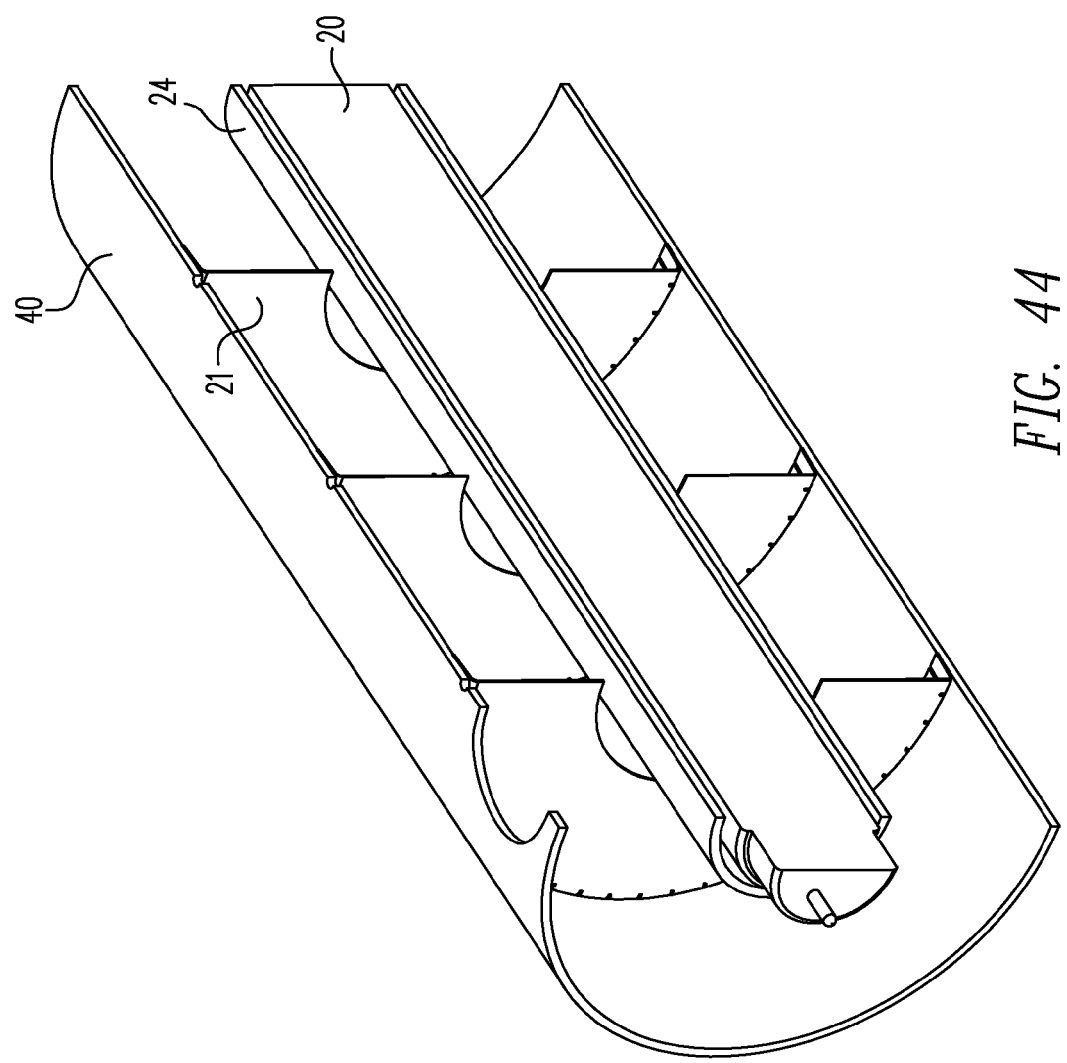
FIG. 44 shows a cross-sectional view of a portion of the system of this invention with quartz tube 24 surrounding UVC lamp 20 and baffles 21 around quartz tube 24 so as to leave an annular space between the diameter of the inner opening of baffles 21 and the outer surface of quartz tube 24.

The central ultraviolet lamp 20 can be surrounded by a quartz tube 24 inside the tube 40 as shown in FIGS. 42, 43 and 44. The system would continue to use the baffle configurations described above. Air or possibly an inert gas can occupy the radial space between the lamp 20 and the inside of the quartz tube 24. The quartz tube 24 can be FEP coated to prevent or reduce buildup of biofilms and calcium and magnesium deposits.

Figure 45:
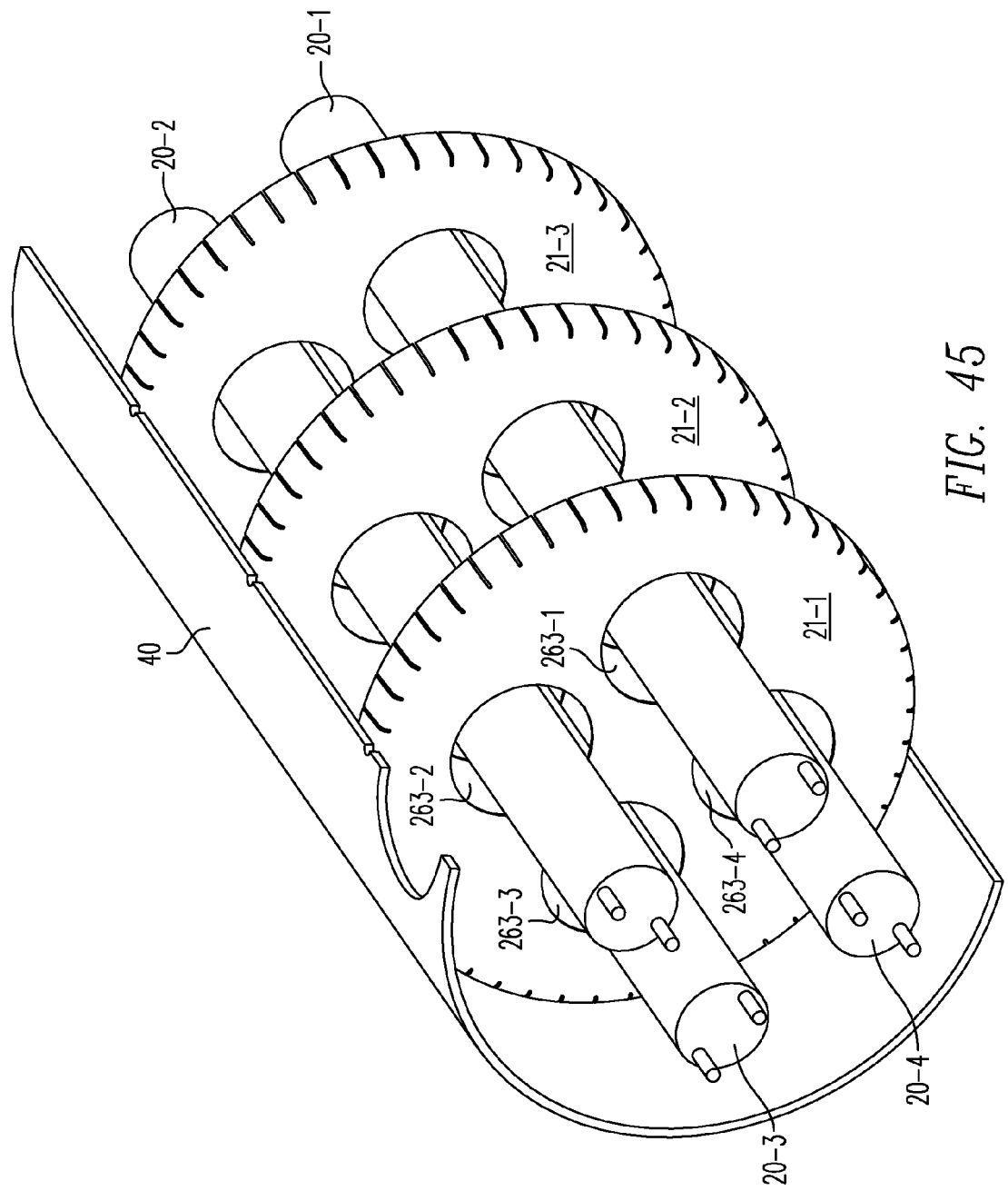
FIG. 45 shows the structure of this invention with four (4) quartz tubes 20-1 through 20-4 mounted in tube 40 with each lamp 20 extending through a corresponding opening 263 in each of the baffles 21-1 through 21-3 as shown.

Alternately, multiple ultraviolet lamps such as 20-1 and 20-4 can be placed in a single tube 40 as shown in FIG. 45. The individual lamps 20-1 to 20-4 can each be placed inside a quartz tube 24-1 to 24-4 respectively, as shown in FIG. 46 or multiple ultraviolet lamps 20 can be placed in a single quartz tube 24 (not shown).

Figure 46:
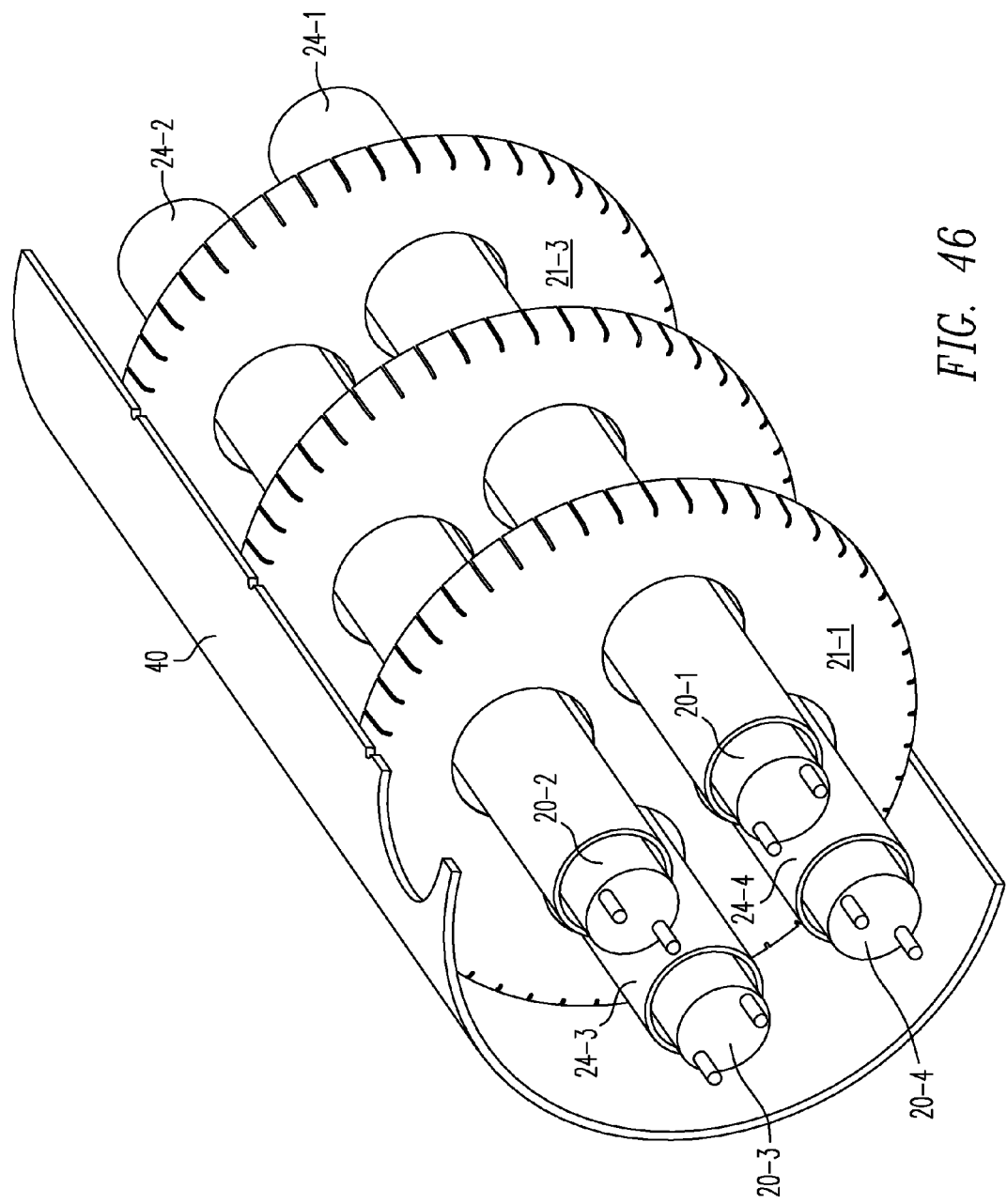
FIG. 46 shows the structure of FIG. 45 wherein each lamp 20-1 to 20-4 is mounted in a quartz tube 24-1 through 24-4.
Figure 47:
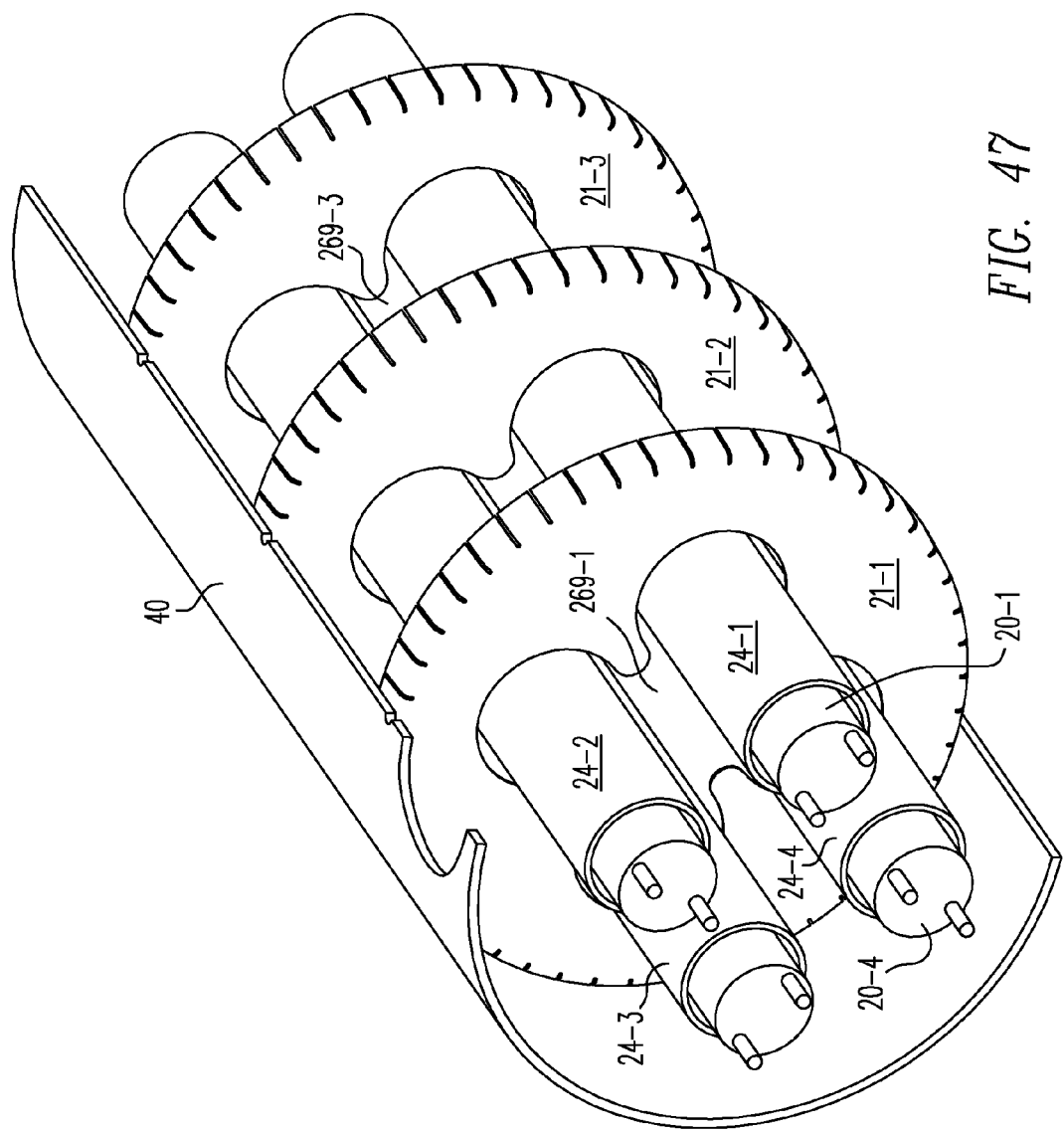
FIG. 47 shows the structure of FIGS. 45 and 46 with a single non-circular opening in each of the baffles 21-1 through 21-3 to receive and allow passage of the quartz tubes 20 with the quartz shields 24.

Baffles with multiple openings, such as openings 263-1 to 263-4 in baffle 21-1 shown in FIG. 45, may be employed to accommodate a plurality of ultraviolet lamps 20 as shown in FIGS. 45 and 46. FIG. 46 shows lamps 20-1 to 20-4 encased in quartz tubes 24-1 to 24-4, respectively. Alternately, baffles 21 with single openings such as openings 269-1 to 269-3 as shown in FIG. 47 can be used in conjunction with two or more lamps 20 (shown as four (4) lamps 20-1 to 20-4 in quartz tubes 24-1 to 24-4 respectively).

Manufacturing Process

The preferred system is comprised of stainless steel purifier tubing 40 and baffles 21. As shown FIG. 26, the tubing 40 is perforated by laser cutting or otherwise drilling or punching holes 451 along its length to TIG weld the baffles 21 into place in tube 40. Alternately, the tubing may not be perforated and the baffles may be joined using another method such as resistance welding. Each baffle 21 preferentially has three or more welds to tabs located around the outer circumference of the baffle 21. The baffle 21 may alternately be laser welded into place.

Figure 27:
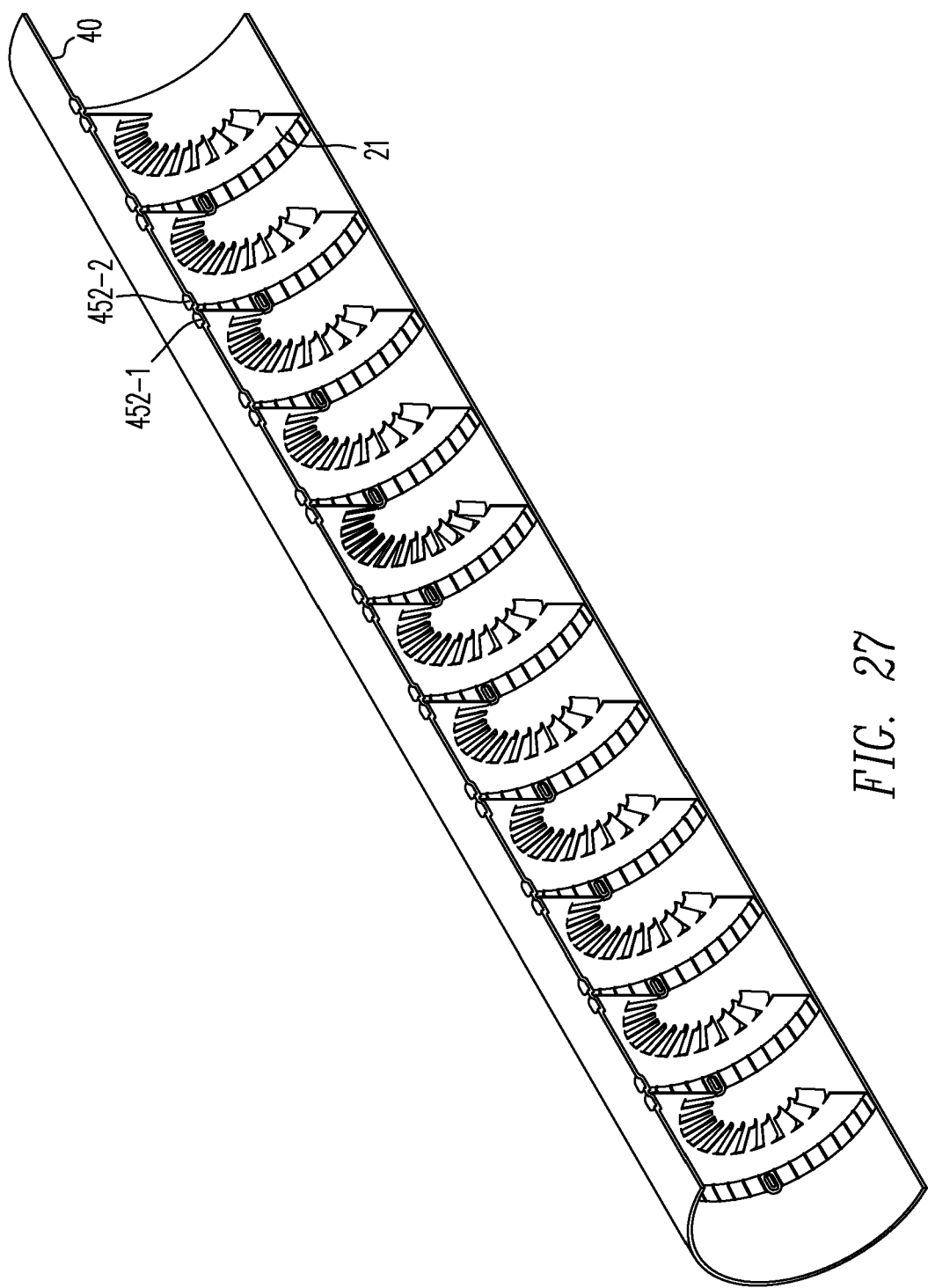
FIG. 27 shows a section view of a dimpled purification tube.
Figure 28:
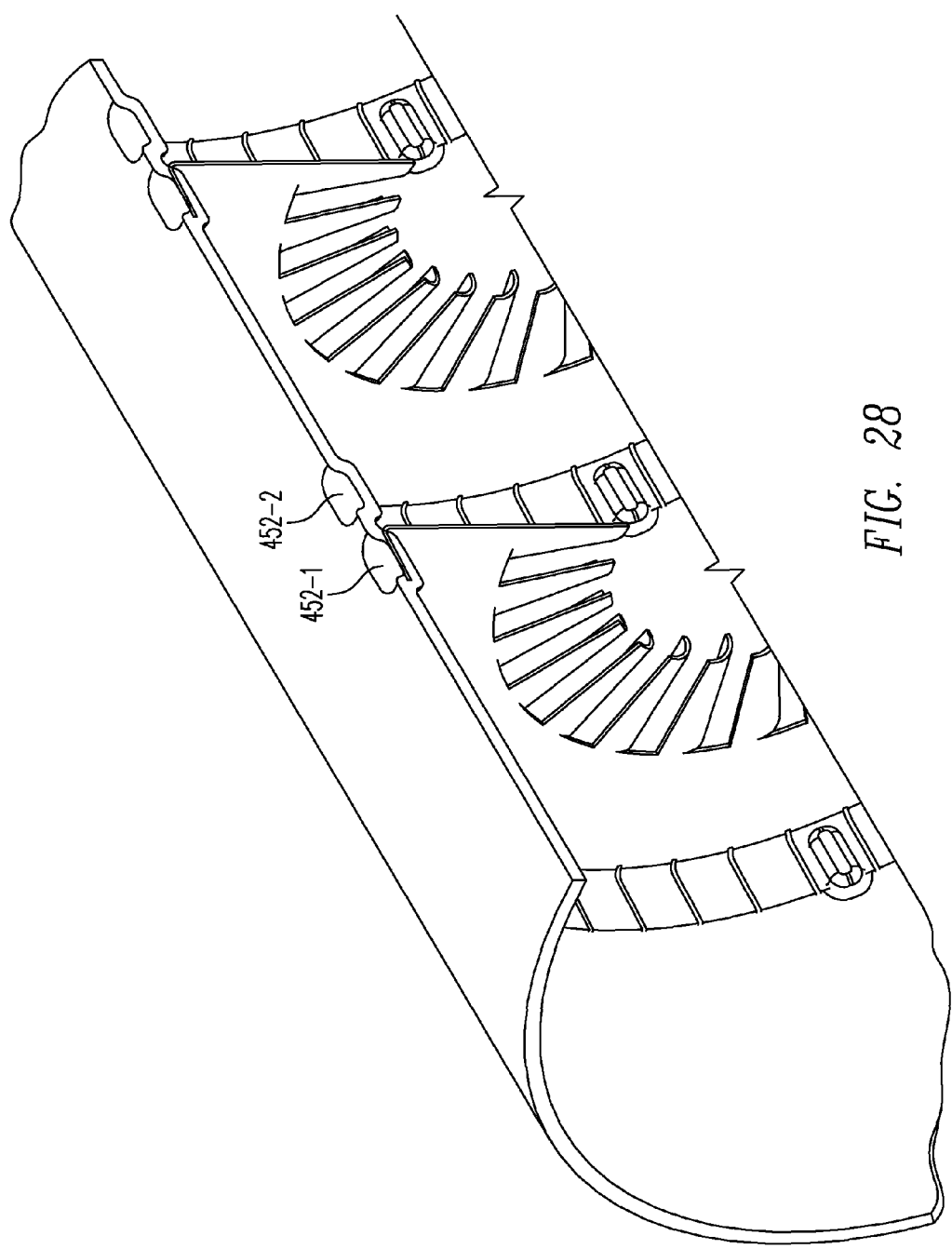
FIG. 28 shows a close up section view of purification tube dimples.

Each baffle 21 may also be held by dimples 452-1 and 452-2 pressed or impacted into the purification tube 40 before or after the baffle 21 has been placed in the proper location as shown in FIGS. 27 and 28. Preferably, each baffle 21 is held by multiple indentations such as 452-1 and 452-2 in the wall of tube 40 on either side of the baffle and at least at three positions around the outer circumference of the baffle 21 as shown. The tube 40 may be stamped or indented on the periphery to create patterns to generate beneficial currents in the subchambers 22.

Alternately the tubes 40 may be formed from flat sheet material rolled into a tube shape with grooves or welded together to register the baffles 21 in their proper locations.

Alternately, the baffles 21 and tubes 40 may be constructed of anodized aluminum.

Figure 29:
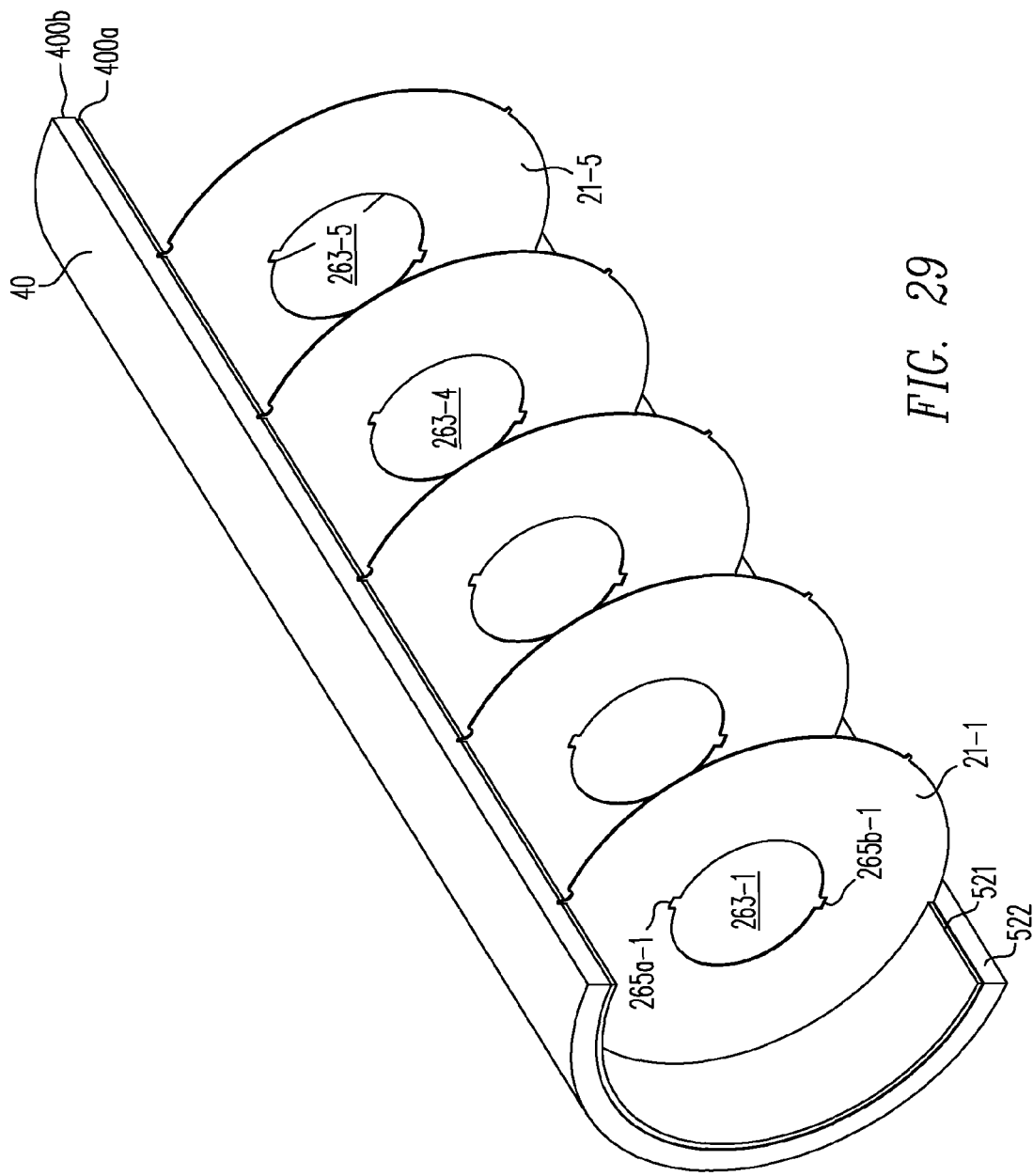
FIG. 29 shows a section view of a molded purification tube.

As discussed above, PVC can be used for tube 40. Heating the PVC tubing to about 320F causes it to expand in diameter and become compliant. It can be heated by rotating it in a standard PVC pipe heater. It is then placed in an open compression fixture made up of two half cylinders hinged together. The compression fixture is then closed applying radial compression force to the polymeric tube 40. The tube 40 is radially compressed in the compression fixture, embedding the edges of the baffles 21 into the inner wall of the PVC tubing, locking them in place, as shown by isometric cross-section in FIG. 29. FIG. 29 shows an inner layer of UVC resistant polymer such as PVDF, PEI, FEP, PTFE or other material 400*a* inside an outer polymeric layer 400*b* such as PVC.

Then tubes 40 are aligned, the end caps 50 are assembled and sealed to tubes 40, then the lamps 20 are inserted, and the electronics enclosure 36 is assembled to the system (see FIG. 3).

Alternately, the housing and baffle assembly may be blow molded from materials such as polyethylene terephalate (PET) using precut baffles placed in the mold. Alternately, the housing may be rotationally molded using precut baffles placed in the mold.

Figure 30:
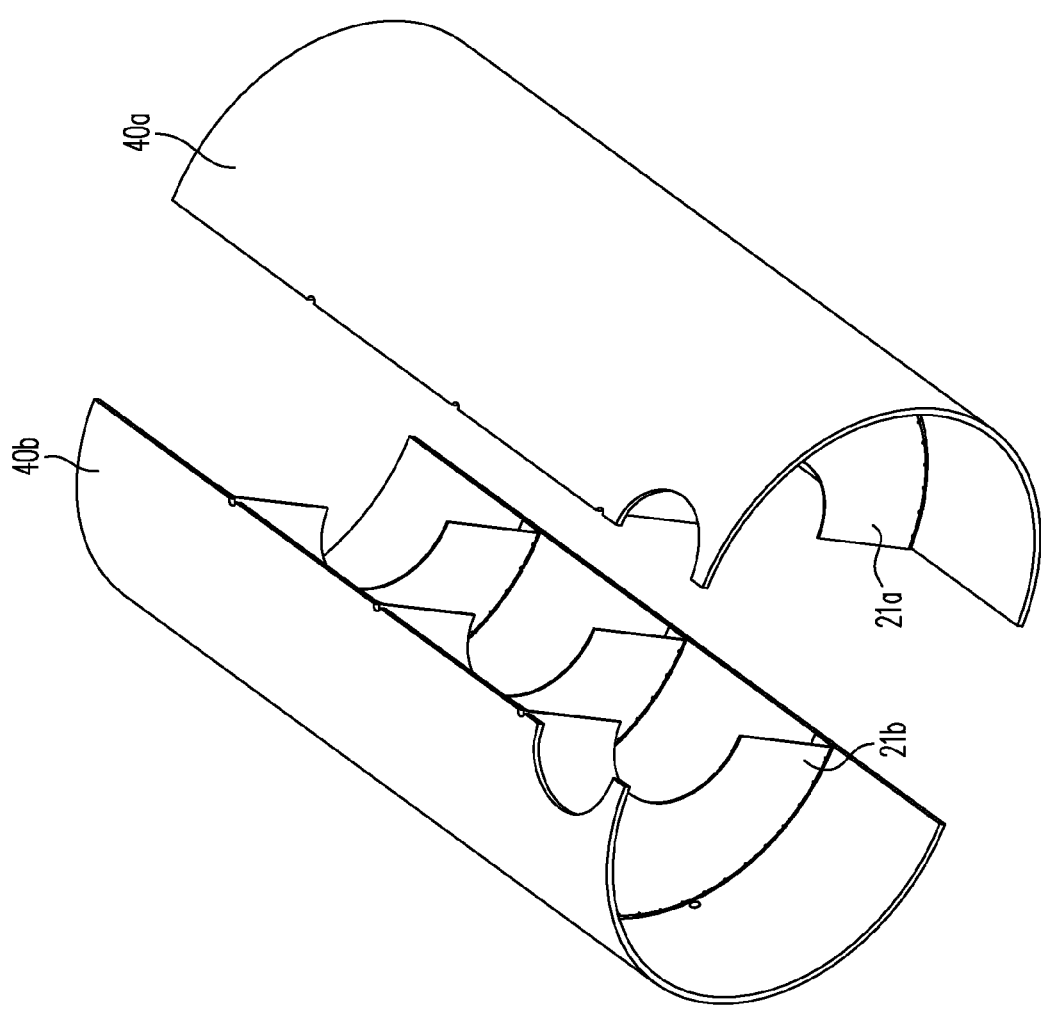
FIG. 30 shows a two piece molded purification tube.

Alternately, as shown in FIG. 30, each tube 40 is injection molded in two or more longitudinal sections 40*a* and 40*b* with the baffles 21 divided into two or more sections 21*a* and 21*b*. The sections 40*a* and 40*b* thus manufactured may then be glued or heat bonded or plastic welded together.

Figure 31:
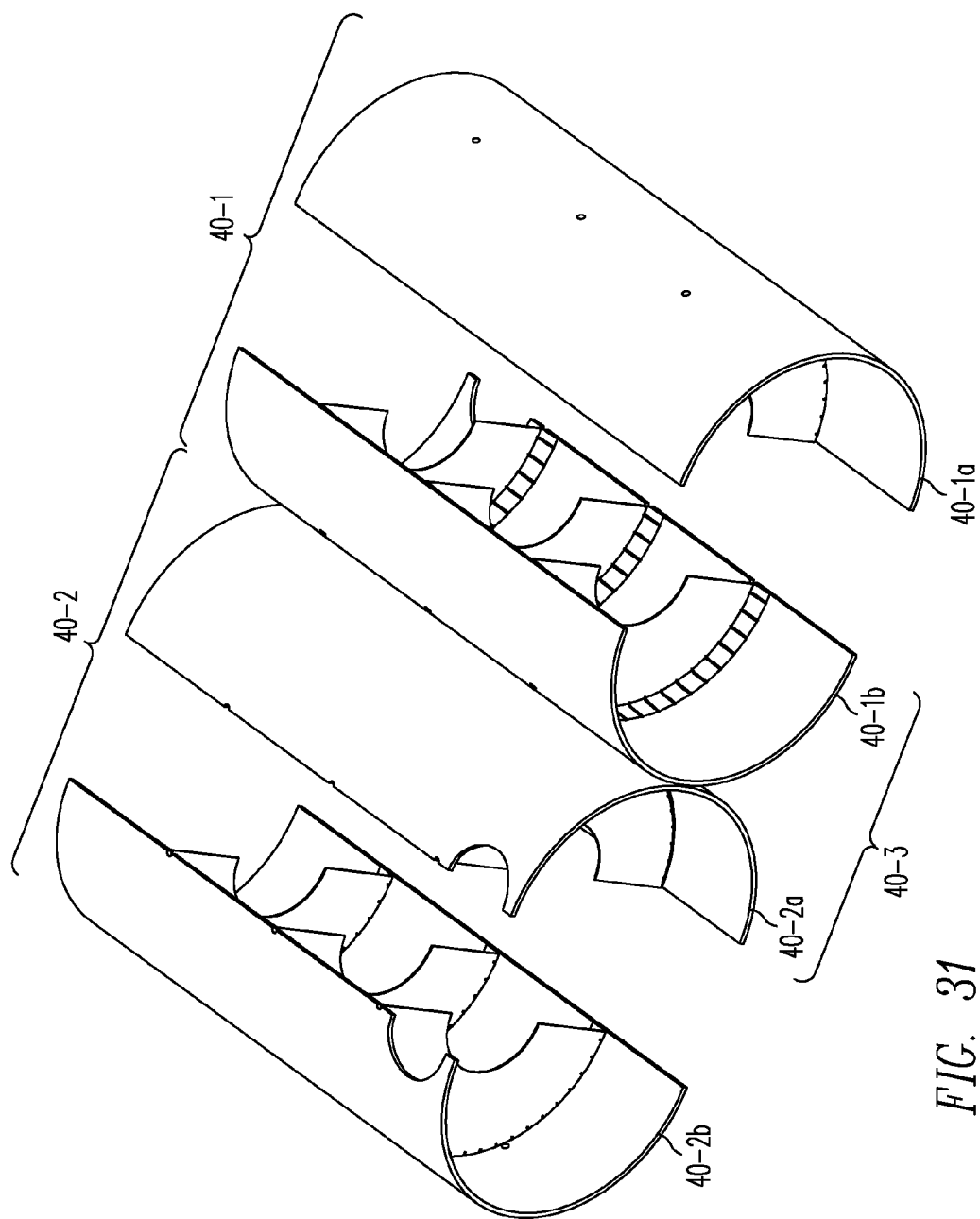
FIG. 31 shows a three piece molded dual purification tube, the center being a single piece.

Alternately, both tubes 40-1 and 40-2 are injection molded in three longitudinal sections 40-1*a*, 40-3 and 40-2*b*. In this case, the center section 40-3 is made up of half tube 40-1*b* forming a unitary structure with half tube 40-2*a*. Center section 40-3 has baffles on both sides as shown in FIG. 31. The side sections 40-1*a* and 40-2*b* of each tube 40 are glued or heat bonded or plastic welded to the center section 40-3 to complete the structure. The baffles in this design can either be insert molded stainless steel or anodized aluminum, or they can be injection molded in place.

Power Sources

In one embodiment, the system is powered by one or more deep cycle batteries charged from the power grid or by solar photovoltaic cells or other solar electrical generation techniques. It may be connected directly to the AC power grid in areas with reliable electric power.

Alternately, the system is may be powered directly by a solar photovoltaic panel or may be powered by batteries charged from a solar photovoltaic panel. The advantage of charging one or more batteries from a photovoltaic panel is that the solar panel can have less power output and be used for more hours each day while the water purifier consumes a similar amount of energy over a shorter time each day.

For areas where grid electricity is not reliable or continuous, battery power will enable the system to operate reliably, using the intermittent grid electricity to charge the batteries. A low voltage shutoff feature may be designed into the inverter to keep the battery from being discharged below about 70 percent of its capacity (about 10.6 volts) to protect the battery and preserve its life. The inverter and the ballast to operate the lamps may be integrated together in the system.

A deep cycle battery allows up to about 80 percent of the energy stored in the battery to be used before recharging. Alternately, the power source can be a lead acid starting battery which is typically lower in cost than a deep cycle lead acid battery. For a reasonable battery life, a lead acid starting battery can typically discharge only 20 to 30 percent of its stored energy. A 30 percent discharge of three 76 amp-hour truck starting batteries in parallel yields a usable capacity of 68.4 amp hours, assuming the batteries are fully charged prior to use. If the purifier consumes 165 watts at 12 volts nominal battery voltage, it will draw a current of 13.8 amps. The available 68.4 amp hours from the batteries will provide approximately 5 hours of purification at a continuous 13.8 amps.

Alternately, the system may be powered by alkaline, lithium ion, nickel cadmium, nickel metal hydride, zinc air, sodium sulfur, lithium polymer batteries or any battery or combination of batteries with proper voltage and sufficient capacity.

Figure 32:
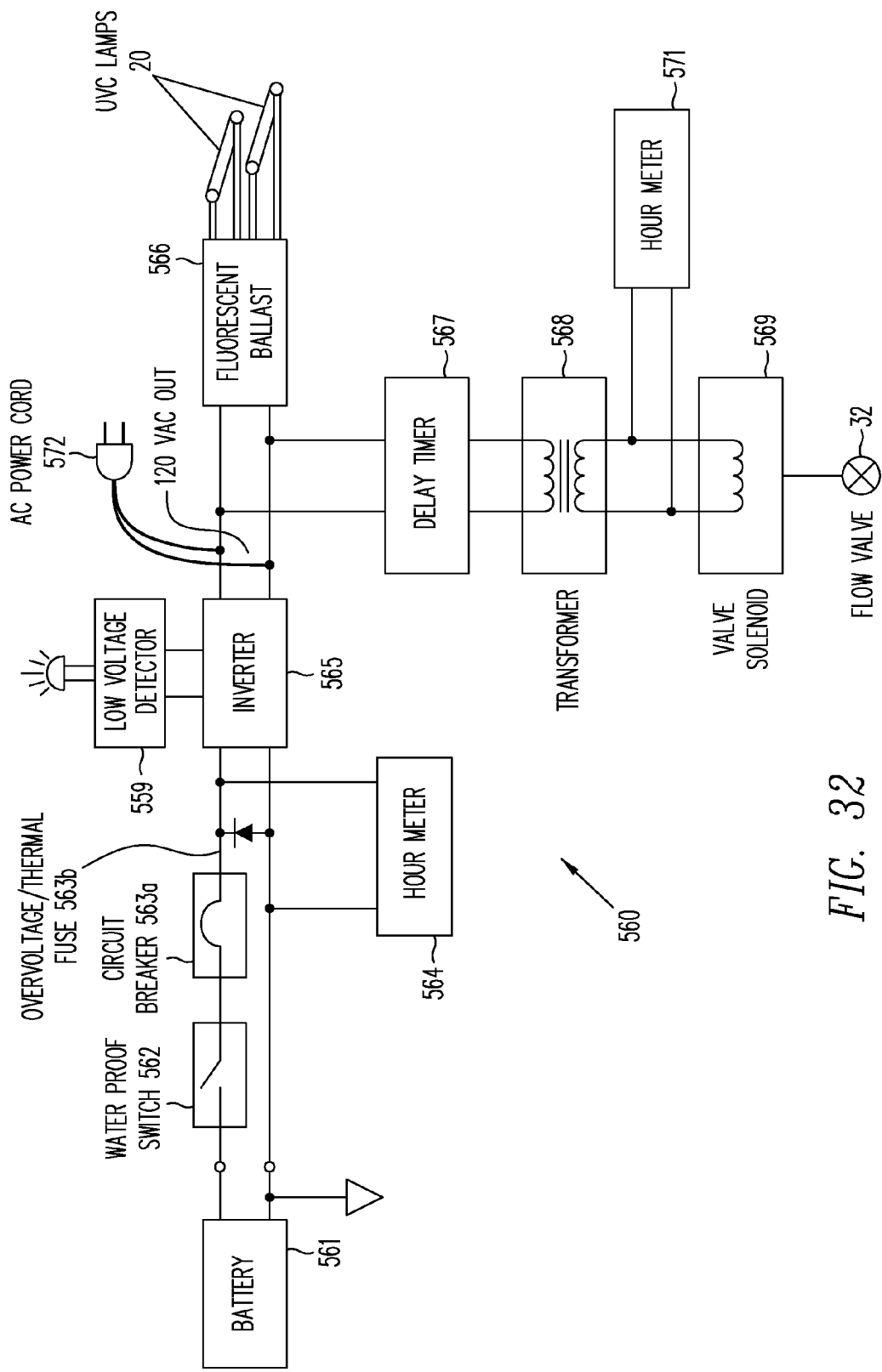
FIG. 32 shows a non-sensing circuit block diagram.

FIG. 32 shows a circuit block diagram of the battery powered system for the purifier, without the sensing circuitry. FIG. 32 shows a circuit breaker 563*a* to protect against overvoltage, a low voltage detector 559 to protect the battery 561 from over discharge, and an AC inverter 565, all of well-known design. The system is preferentially designed to withstand high AC power applied to input terminals and to withstand reverse DC polarity applied to the input terminals. The thermal fuse 563*b* shown in the circuit in FIG. 32 protects the system against excessive temperatures with minimal energy loss.

Alternately, the system can be powered directly from the electrical grid by providing an AC power cord and plug 572 which bypasses the AC inverter 565 as shown in FIG. 32. The circuit 560 may also have integrated automatic current or voltage sensing to sense the active power source (either the battery 561 or external power through plug 572) or a manual switch for selecting the power source.

Figure 33:
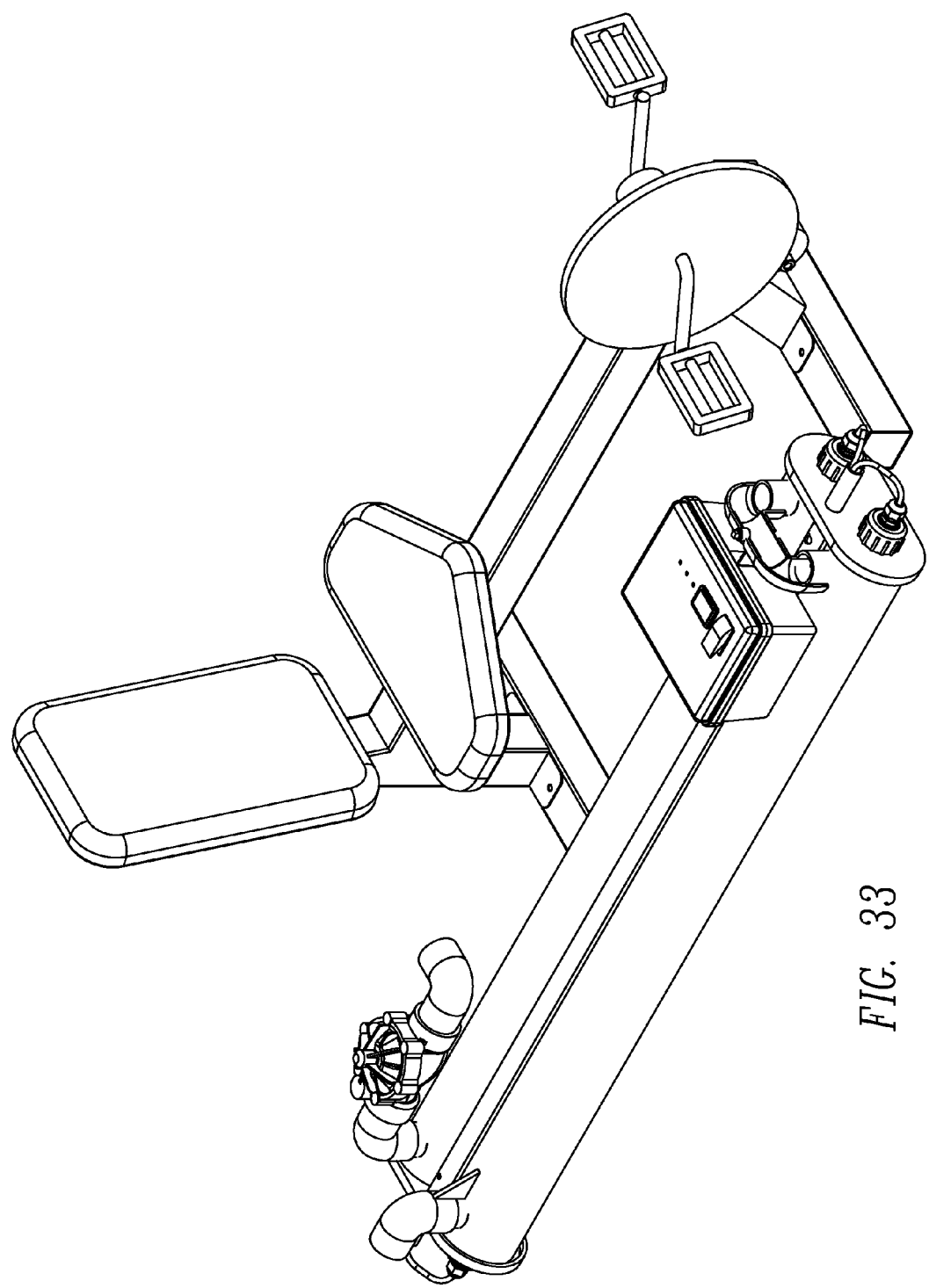
FIG. 33 shows a human powered system.

Instead of battery or grid power, the purifier can be pedal powered either through an integrated unit as shown in FIG. 33 or by use of a separate pedal powered generation system. The average healthy human is capable of producing 165 W (0.22 horsepower) for 2.2 hours, which is sufficient to power the preferred embodiment system to purify about 1100 gallons (4200 liters) at a power consumption of 165 watts. The pedals may drive either an AC or a DC generator directly or through a drive train to provide the desired rotational speed for the generator. If a DC generator is used, the system may be equipped with a DC ballast for the lamps 20 to eliminate the need for an AC inverter.

Alternatively, the system is powered by a generator such as an electric, diesel, gasoline, propane, or natural gas powered generator or water wheel generator or other motive power source.

Electronics

The electronics and electrical components for the system may be housed in a waterproof or water resistant enclosure 36 as shown in FIG. 3. The watertight housing contains the control circuitry, an AC inverter having an integral low voltage detection circuit, a UVC germicidal lamp ballast 566 (FIG. 35), on/off switch 39 (FIG. 3), hour meter 38 and an optional transformer to produce 24 VAC for the optional valve solenoid. It has LEDs 25 and/or an optional LCD screen (not shown) to indicate the status of the system. Preferentially, the housing has watertight fittings 602 for the power input cable to the battery and an optional AC power cable as well as output cables from the lamps and the valve solenoid. The on/off switch 39 and the hour meter 38 are preferably waterproof. The LEDs 25 and the optional LCD screen are preferably waterproof as well.

The ballast 566 (FIG. 35) is preferably a programmed start or programmed rapid start type to maximize lamp life. Alternately, a conventional magnetic ballast is used. Alternately, the AC powered ballast is replaced with a DC powered ballast to eliminate the need for the AC inverter.

Control System

The purifier system is preferentially controlled either by an analog control system or by an integrated digital microprocessor or microcontroller. The digital control system employs an analog to digital (A/D) converter to sample the analog inputs as described below.

Figure 34A:
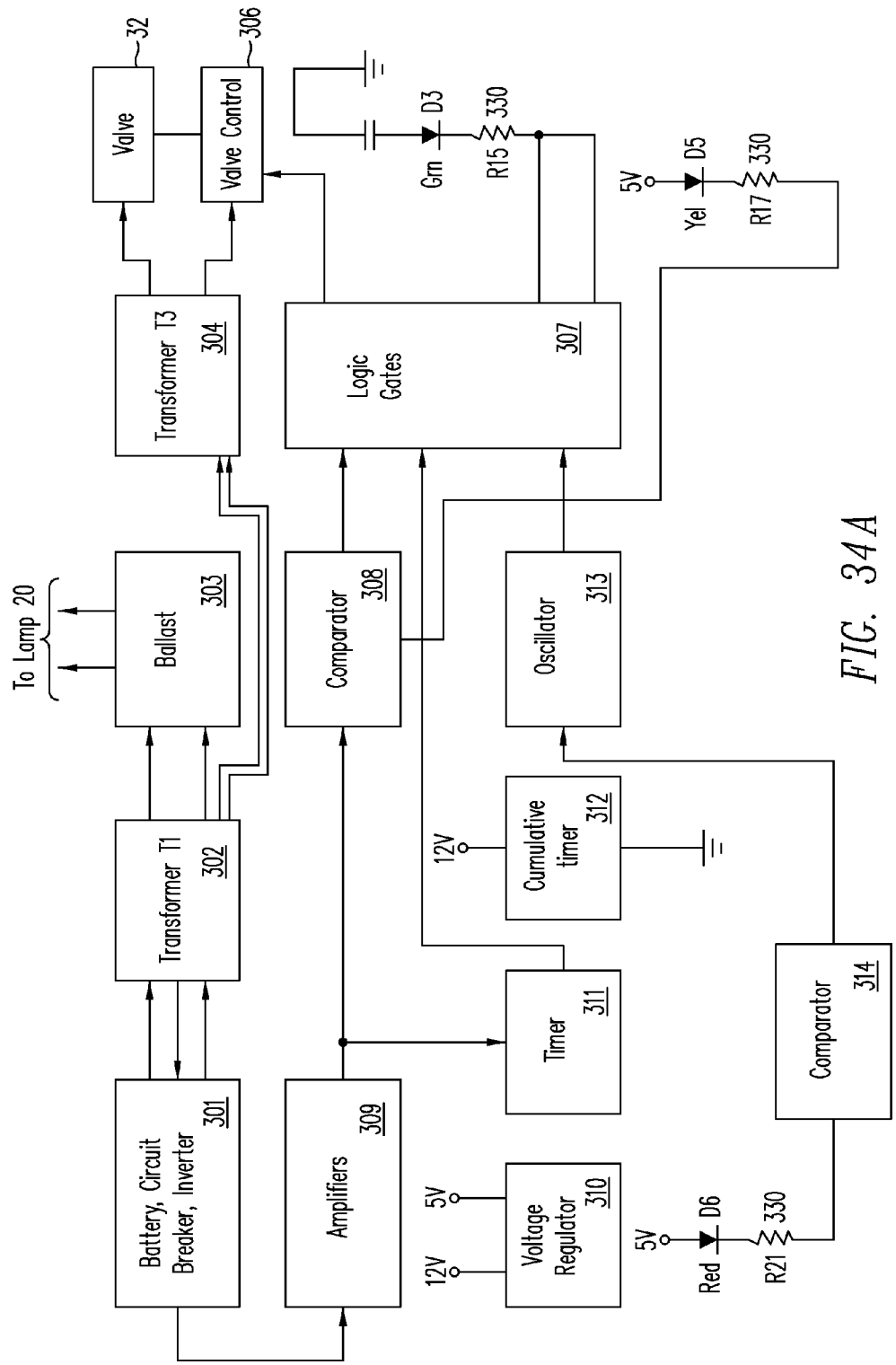
FIGS. 34a to 34m shown a block diagram (FIG. 34a) and related circuit schematics of a control system and control circuitry for use with embodiments of this invention

FIG. 34a shows the schematic of the analog control circuitry that performs the current monitoring, start-up delay, and valve control functions described below.

FIG. 34a shows the block diagram for an electronic circuit for use with the water purification system of this invention. In block 301 (shown in more detail in FIG. 34b) a switch connects a battery's plus and minus input terminals through a thermal circuit breaker to an inverter. The inverter, of well known design, converts the battery voltage (preferably twelve (12) volts) to a one hundred twenty (120) volt, sixty (60) cycle AC current or other suitable AC current. The circuit breaker shuts off the power when the temperature increases beyond a certain level (such as one hundred fifty (150) degrees centigrade). The circuit breaker also opens the connections between the battery and the remainder of the circuit should the battery be installed backwards resulting in large current which causes the thermal circuit breaker to open the connections to the remainder of the circuit.

Figure 34B:
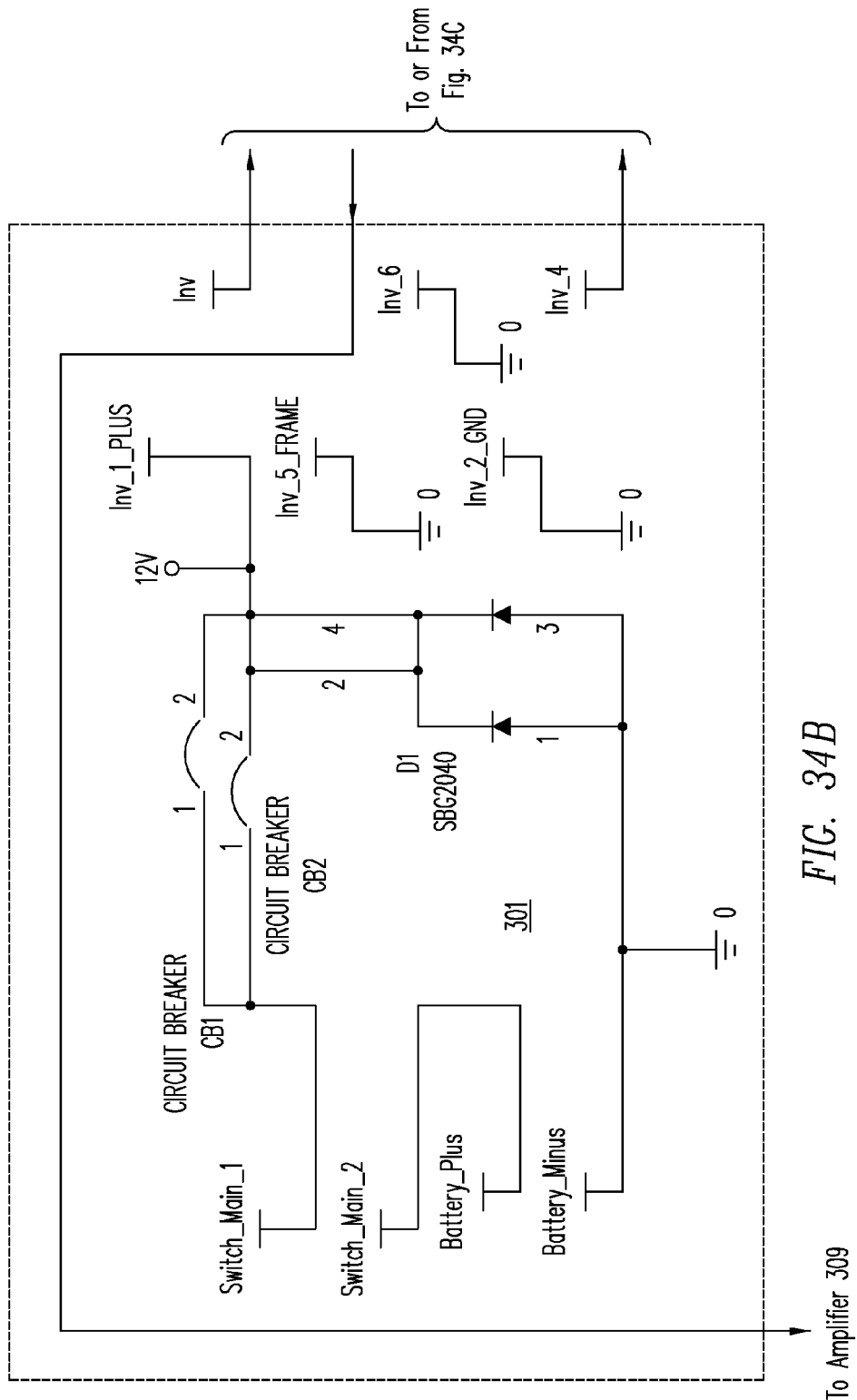
Figure 34C:
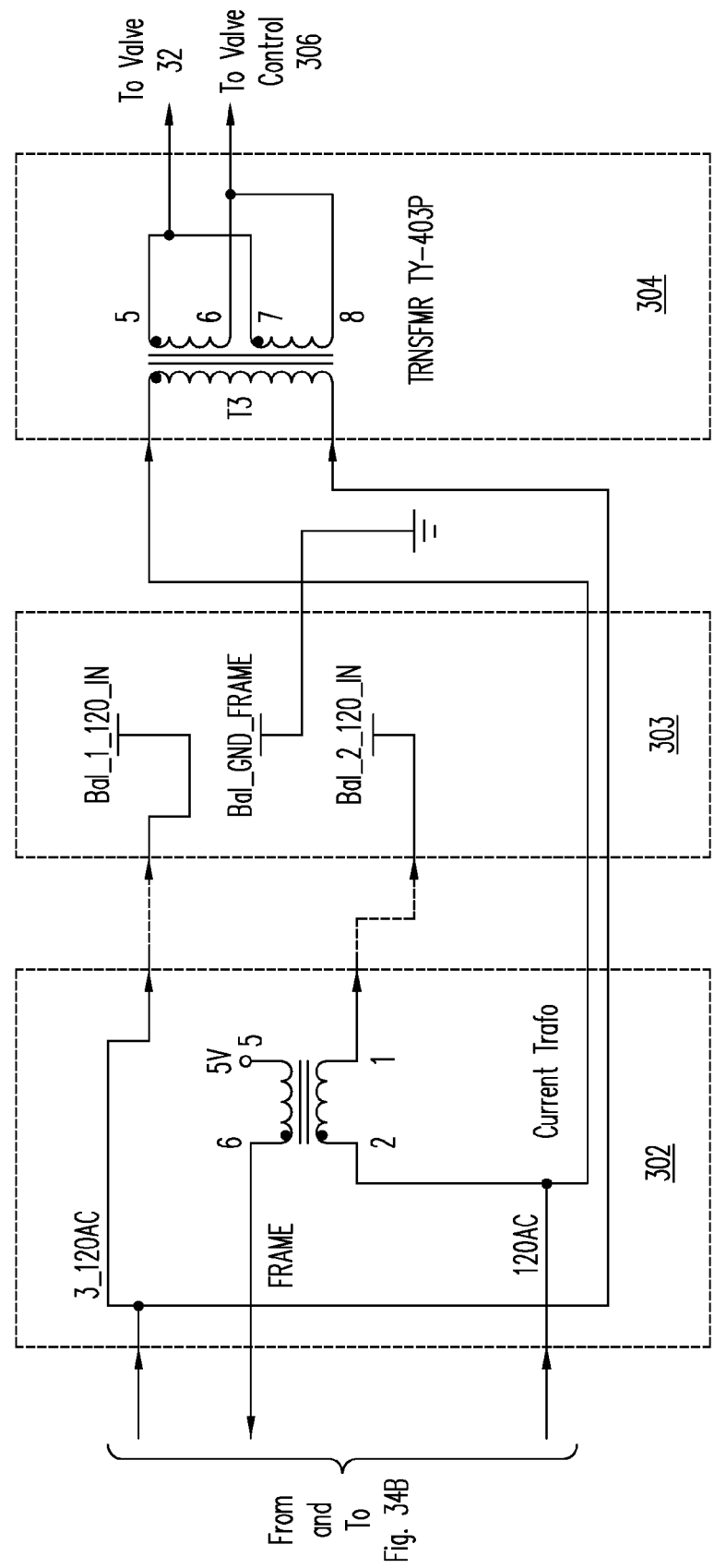

The inverter, (the input leads to which are denoted as INV_1 PLUS, INV_5 FRAME, and INV_2 GND in FIG. 34b) has an AC output signal that is transmitted to the input leads (shown by Bal_1_120IN and Bal_2_120_IN) to the ballast through the current transformer T1 shown in block 302 in FIG. 34c. The ground lead to the ballast is shown as BAL_GND_FRAME. Since the ballast is well known, and is available off the shelf, the ballast itself is not shown in the Figures. The ballast produces, in a well known manner, a high frequency signal which is sent directly to the lamps 20 in the tubes 40 to excite the gas in the lamps 20 and thus create the plasma which generates the UVC radiation used to purify the water or other liquid.

Current transformer T1 in block 302 (FIGS. 34a and 34c) provides a continuous signal to monitor the current to lamp(s) 20 and ballast 303 to indicate that the lamp(s) 20 are no longer capable of generating the UVC radiation required to purify the water or other liquid being purified. This signal from current monitoring transformer 302 is sent through block 301 to amplifier 309 and there is used in a manner to be described below to turn off valve 32 and thus stop the flow of water or other fluid being purified.

Figure 34D:
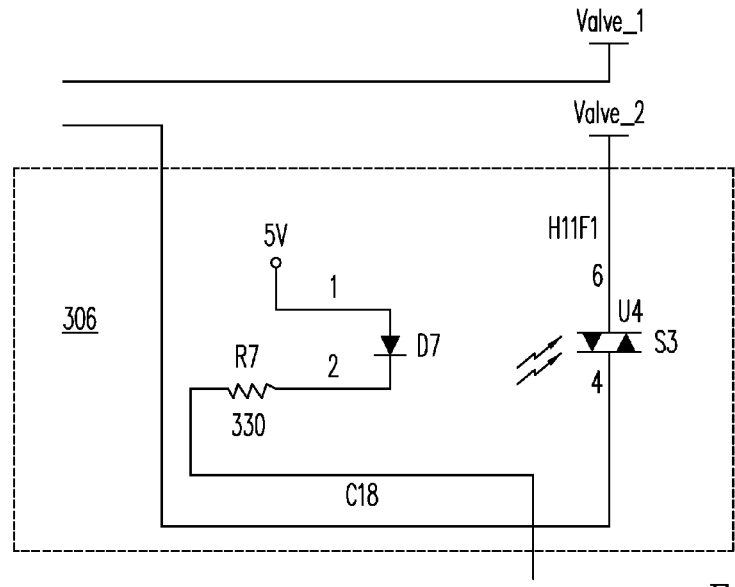
Figure 34F:
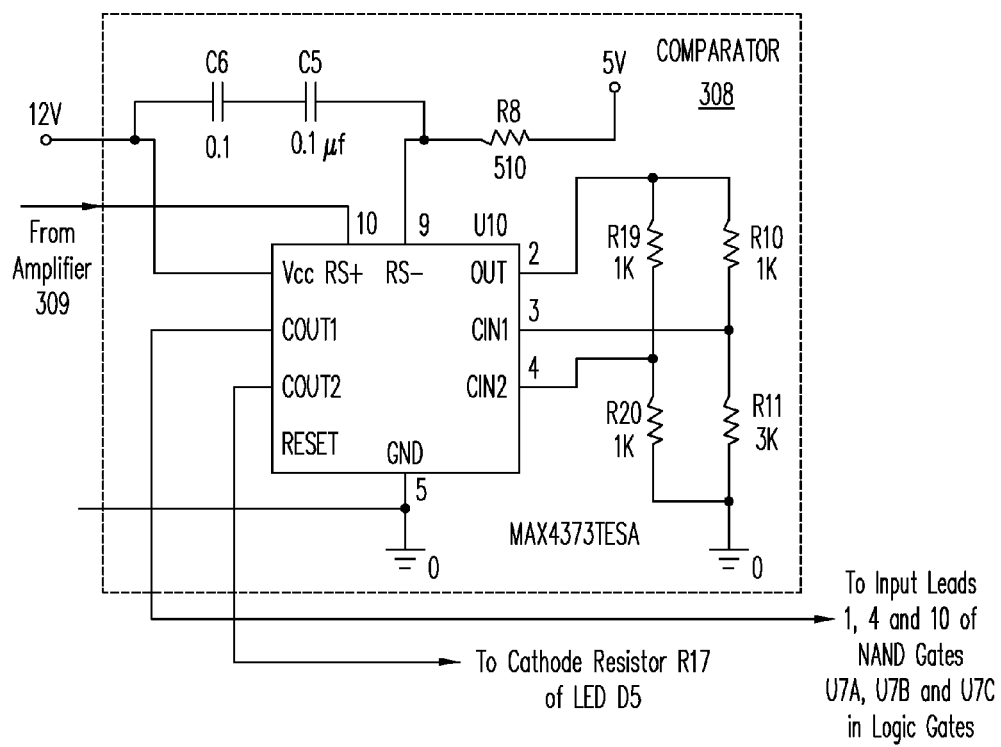

Transformer T3 in block 304 provides a signal to valve 32 and to valve control 306 (shown in more detail in FIG. 34d). Valve control 306 receives a signal (shown as five (5) volts in FIG. 34d) which turns on light-emitting diode D7, light from which is detected by photo-sensing switch S3 in response to a low level signal from logic gates 307 (FIGS. 34a and 34g). Switch S3 thus provides an electrical connection between input leads denoted as Valve 1 and Valve_2 (FIG. 34d) thereby turning on valve 32 in response to a low level signal from logic gates 307 (FIGS. 34a and 34g) in a manner to be described below.

Signals from the inverter are also sent directly to transformer T3 (block 304 in FIGS. 34a and. 34c). Transformer 304 receives one hundred twenty (120) volts from the inverter in block 301 and converts this signal to a twenty four (24) volt AC signal which is sent to valve 32 and to valve control 306 as described above. Valve 32 controls the flow of water through the unit. As will be explained below, valve 32 remains off for a selected time (in one embodiment about forty (40) seconds) after the unit is turned on to allow any water in the unit to be purified before additional water is brought into the unit with the initiation of fluid flow through the unit. The opening of valve 32 is controlled by a signal from logic gates 307 generated in a manner to be described below.

Figure 34E:
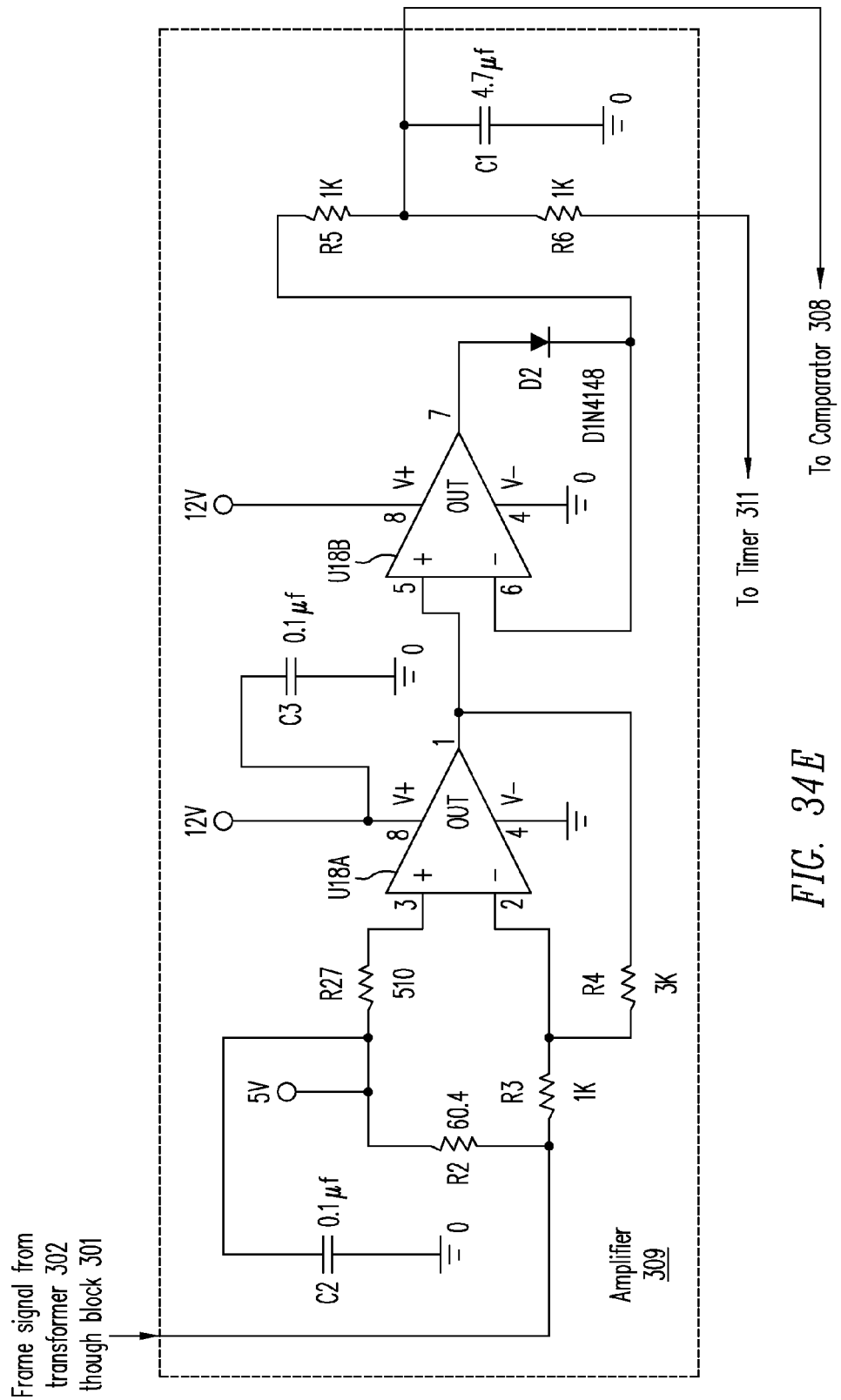
Figure 34G:
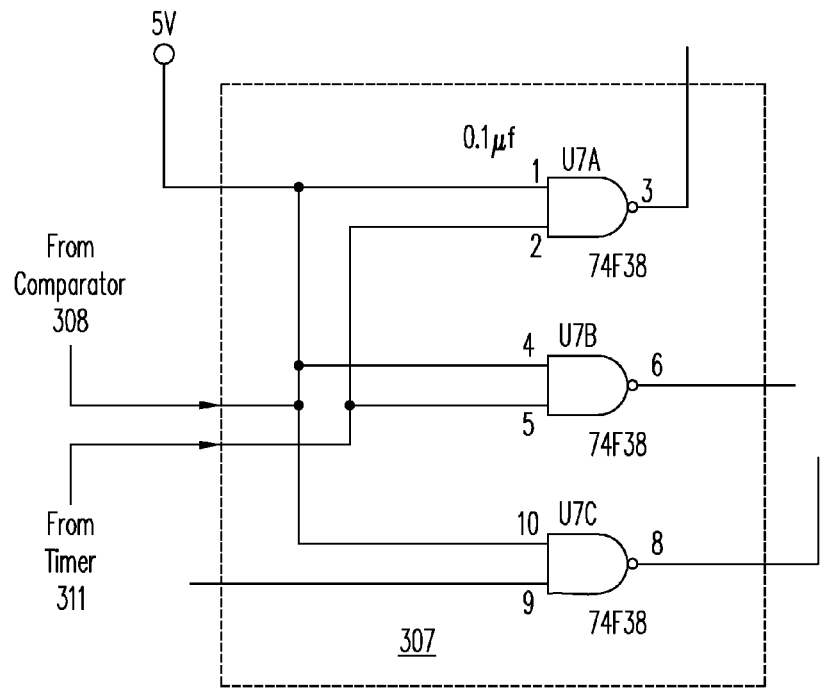
Figure 34H:
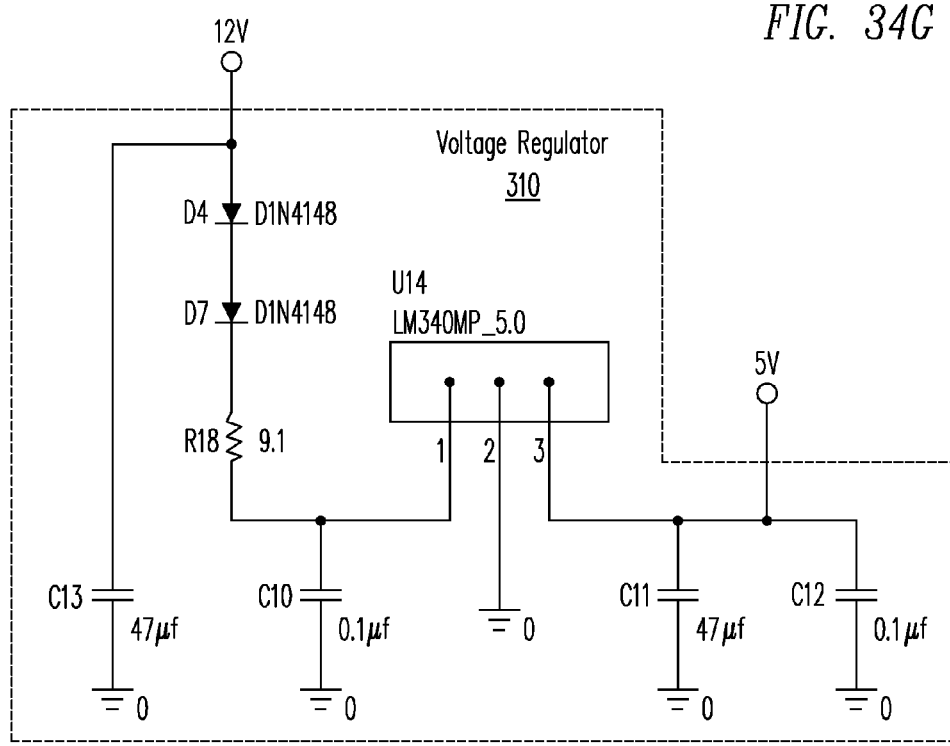
Figure 34I:
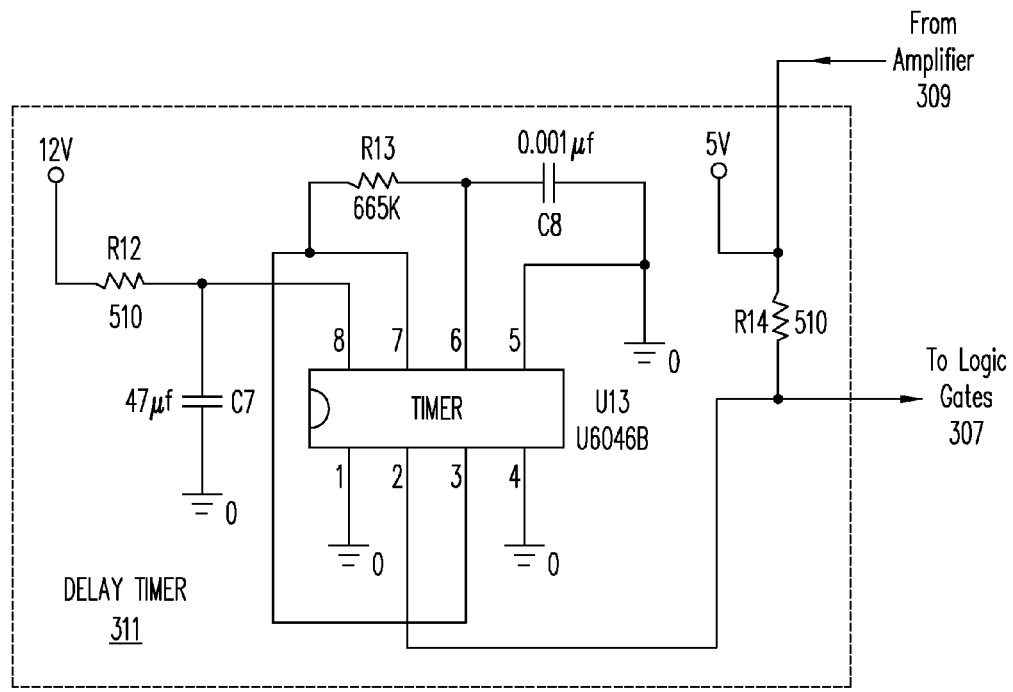
Figure 34J:
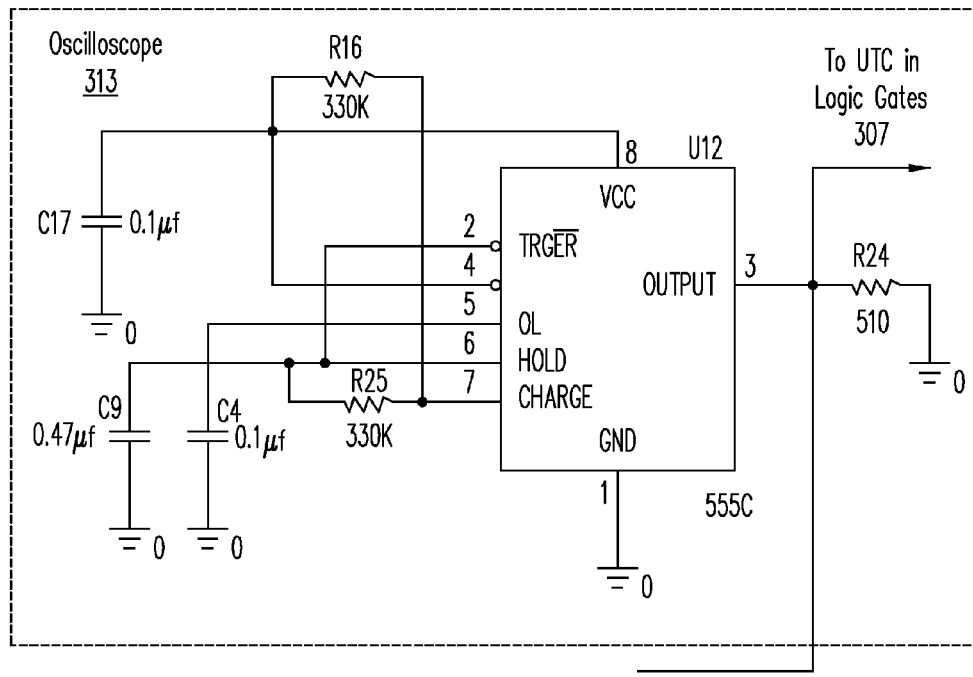

Logic gate U7A in logic gates 307 (FIGS. 34a and 34g) controls the turning on of valve 32 in response to a signal from timer 311 (FIGS. 34a and 34i). As shown in FIG. 34i, timer 311 (a U6046B from Atmel) receives a twelve (12) volt signal from the output lead from the circuit breaker (FIG. 34b). This signal turns on timer 311. The time delay set by timer 311 is controlled by setting the RC values of resistor R13 and capacitor C8. In one embodiment, timer 311 is set to produce a high level output signal on lead 2 from U13 about forty (40) seconds after the system turns on. This high level signal is transmitted to input lead 2 of NAND gate U7A in logic gates 307. Input lead 1 to NAND gate U7A has received a five (5) volt signal from voltage regulator 310 (FIGS. 34a and 34h) which produces this five (5) volt signal in response to receiving the twelve (12) volt signal from the output lead of the circuit breaker CB1 (FIG. 34b) when the system is turned on.

Upon receiving two high-level signals, NAND gate U7A produces on its output lead a low level signal. Because the output lead from NAND gate U7A is connected to the cathode of LED D7, and the five (5) volt power supply from voltage regulator 310 is connected to the anode of LED D7, LED D7 turns on and activates switch U4. This turns on valve 32. As a result, water to be purified starts flowing through the system and the water in the system before valve 32 is opened is purified before this water starts flowing.

Cumulative timer 312 (FIG. 34I) records and retains the total cumulative time that the system has been operated. This timer is mechanical in one embodiment causing mechanical elements like in an odometer to rotate and thus record the total operating time. An alternative timer can use a rechargeable battery and an LCD display if desired. Other electronic timers are also useable with this invention. The information retained by the timer, regardless of type, can be transmitted to a central control facility, if desired, using the wireless system described herein as combined with the water purification system of this invention.

When the current to ballast 303 (which is a measure of the current supplied to the lamps 20) is detected by a signal from current monitoring transformer 302 to fall beneath a selected value, a signal is sent on the output lead from transformer 302 through block 301 to amplifiers 309 (FIGS. 34a and 34e). This causes a low level signal to be generated by amplifiers U18A and U18B in block 309. This low level signal is sent through resistor R6 (1K ohms) (FIG. 34e) to and through resistor R14 in timer 311 (FIG. 34i) to the output lead from timer 311 to logic gates 307. This low level signal is transmitted to input leads 2 and 5 of NAND gates U7A and U7B, respectively, causing the output signals from the output leads of these NAND gates to go high. The high level output signal from NAND gate U7A shuts off diode D7 (FIG. 34d) and shuts off valve 32. This is necessary because the lower current to ballast 303 means that not enough electric current may be supplied to lamps 20 with the result that the water going through the system may not be properly purified.

In addition, the low signal on the output lead from amplifiers U18A and U18B in block 309 is sent directly to the RS input terminal of comparator U10 (block 308; FIGS. 34a and 34f). This drives the output signal on output lead OUT1 from comparator U10 to a low level. The low level signal on the output lead OUT 1 from comparator U10 in block 308 is applied to input leads 1, 4 and 10 of NAND gates U7A, U7B and U7C in logic gates 307. This low level signal ensures that the output signal from NAND gates U7A, U7B and U7C in logic gates 307 goes high thus shutting off green LED D3 (FIG. 34a). This tells the user that the system is no longer operating.

Figure 34K:
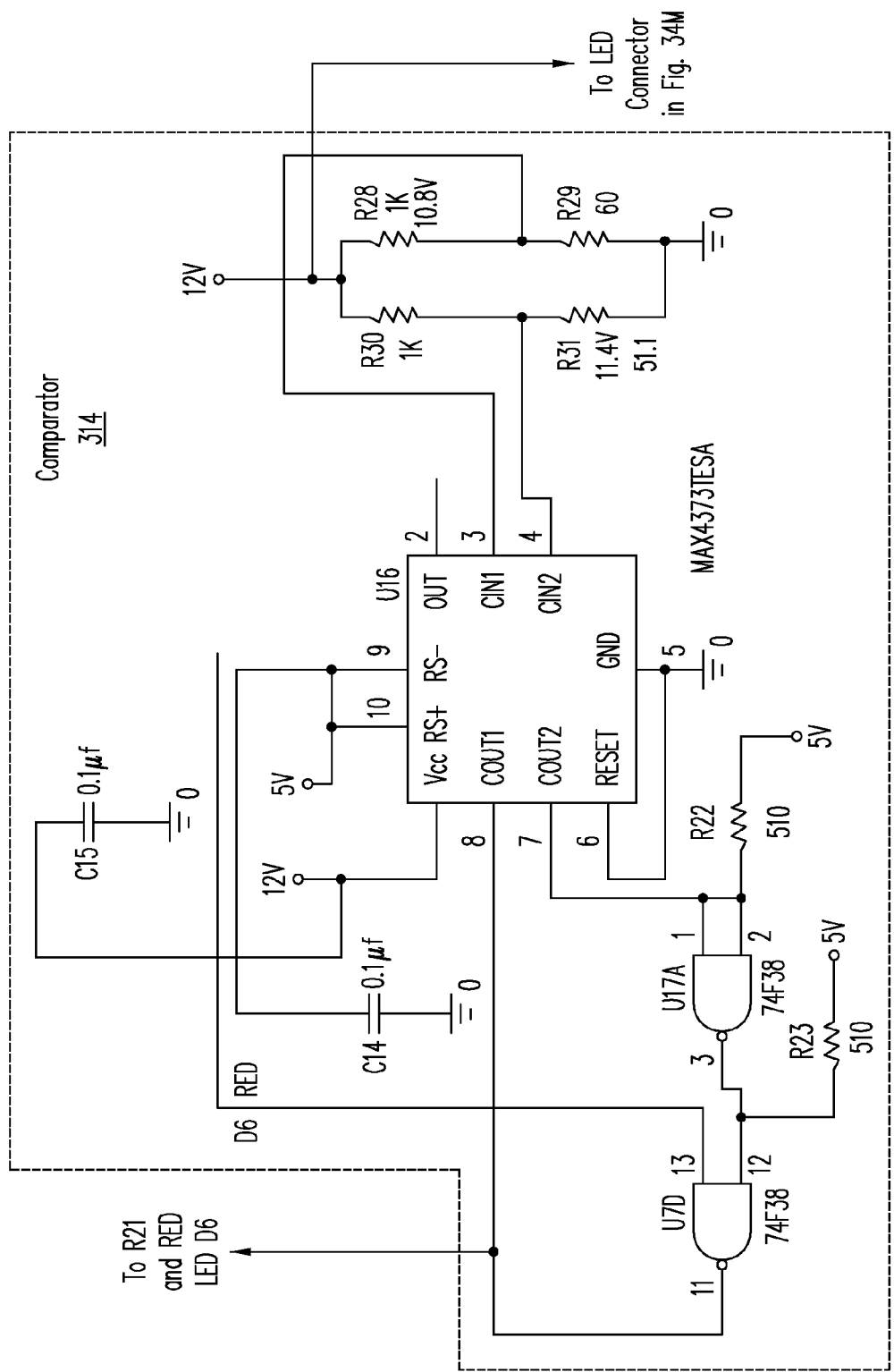
Figure 34L:
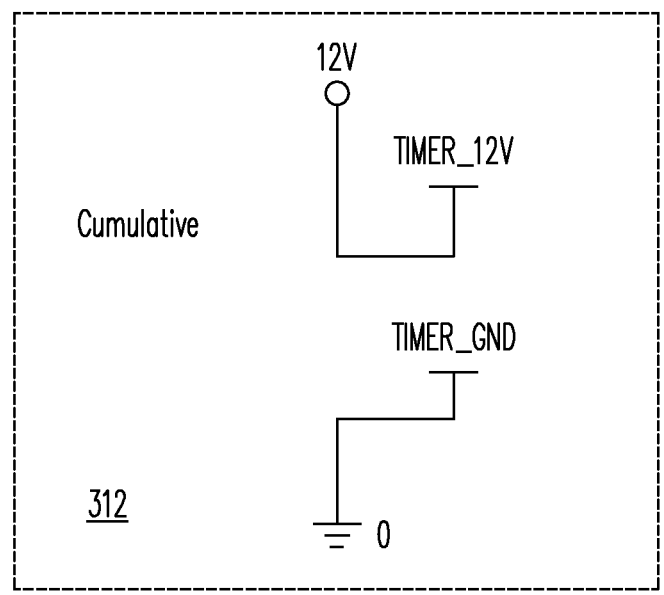

Comparator block 314 (FIGS. 34a and 34k) contains circuitry including comparator U16 which causes signals to be sent to the LEDs D3 (green), D5 (yellow) and D6 (red). The green LED D3 is on when the system is operating. However, oscillator U12 in block 313 creates an oscillating output signal which is sent to NAND gate U7C in logic gates 307 (FIGS. 34a and 34g) to cause the output signal from NAND gate U7C to oscillate back and forth from low to high to low et al. This oscillating output signal from U7C causes LED D3 to blink green on and off, indicating to a user that the system is in a start-up mode and is purifying any water left in the system before allowing new water to flow through the system.

Comparator U16 (block 314, FIG. 34k) senses a decline in the voltage from the battery to some voltage below twelve volts (ten point six (10.6) volts is the minimum voltage to which the battery voltage is allowed to fall). When this occurs, comparator U16 causes the output signal from NAND gate U7D to go low thereby turning on red LED D6 to indicate that the system power is low. Comparator U16 does this by sensing a drop in the battery voltage on input leads CIN1 and CIN2, and then producing a high output signal on output lead COUT2. This high output signal drives the output signal from NAND gate U17A low. This low output signal is applied to input lead 12 of NAND gate U7D. Applied to the other input lead 13 of NAND gate U7D is the oscillating output signal from oscillator U12 in oscillation block 313. This oscillating signal causes the output signal from NAND gate U7D to oscillate between high and low, thereby causing red diode D6 to oscillate off and on and thus to warn the user that the battery is low.

Figure 34M:
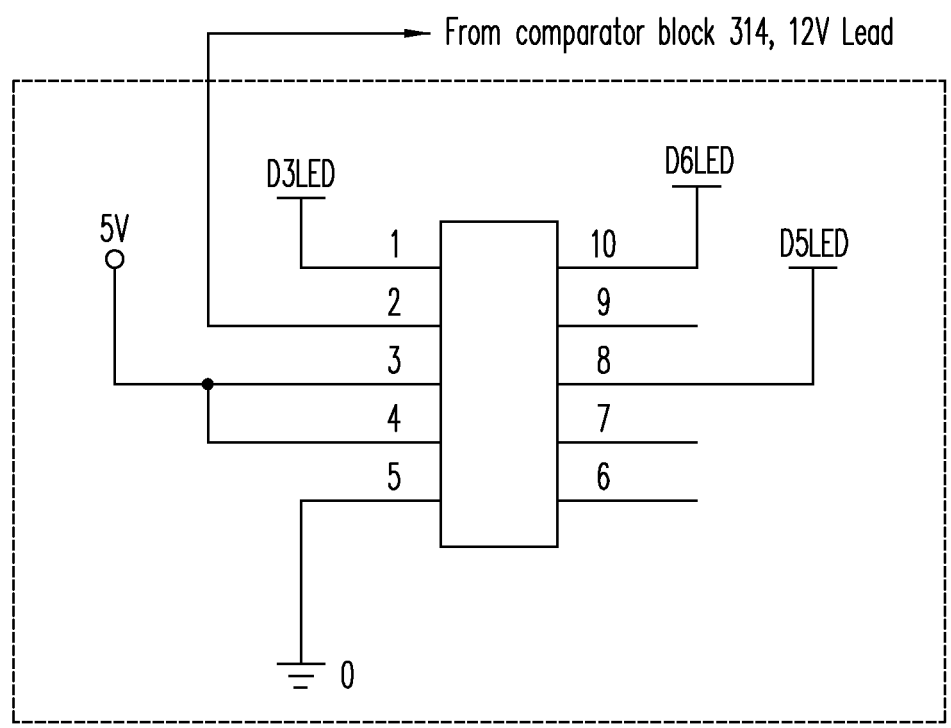

FIG. 34m shows the connections to the LEDs D3, D5 and D6. As shown in FIG. 34m, five (5) volts is applied to the anodes of LEDs D3, D5 and D6.

Figure 34N:
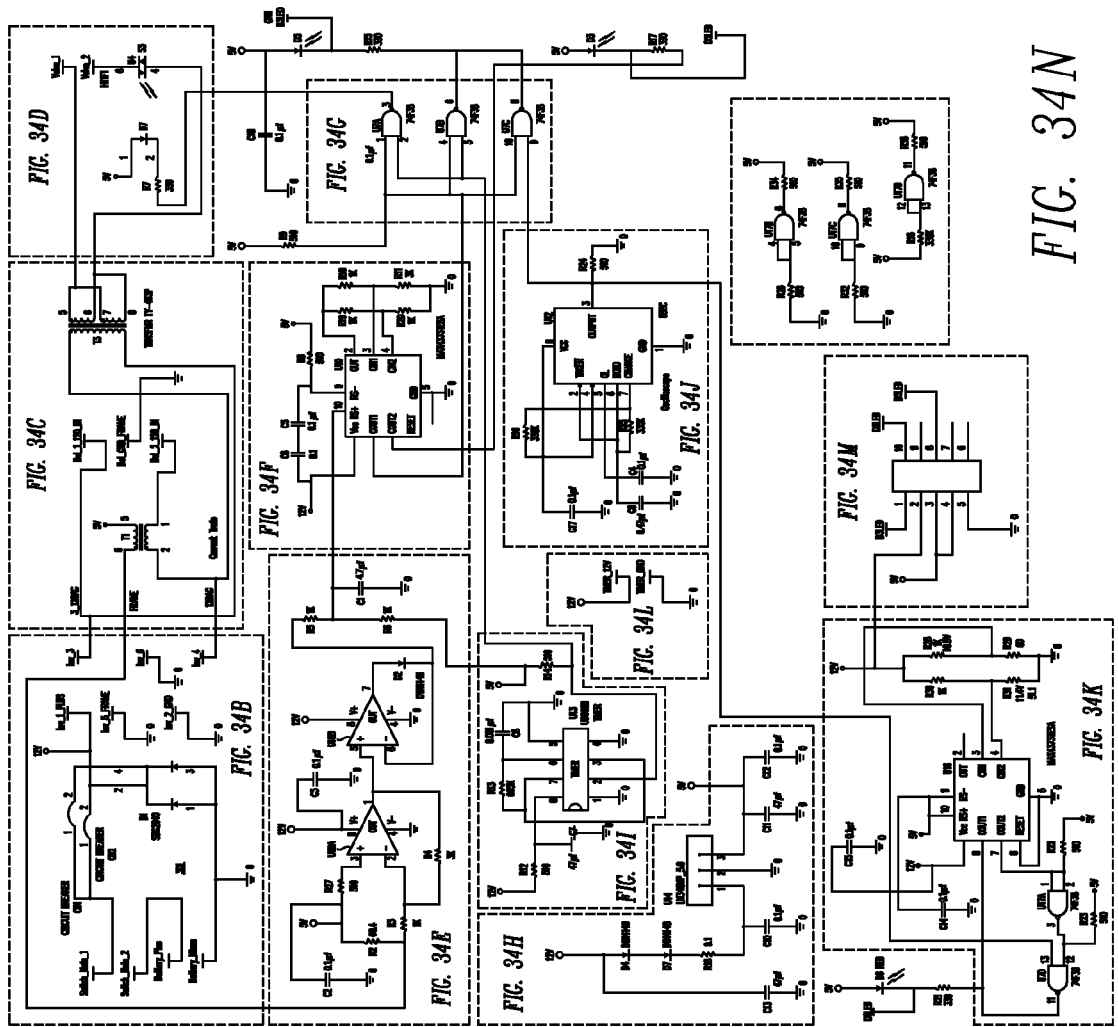
FIG. 34n shows the relationship FIGS. 34b to 34m.

FIG. 34n shows in one schematic, the interrelationship of the circuit components shown in FIGS. 34b to 34m. The values of the circuit components shown in FIGS. 34b to 34n are as follows:

| CB1 | CIRCUIT BREAKER |
|---|---|
| C1 | 4.7 uF |
| C2 | 0.1 uF |
| C3 | 0.1 uF |
| C4 | 0.1 uF |
| C5 | 0.1 uF |
| C6 | 0.1 uF |
| C10 | 0.1 uF |
| C12 | 0.1 uF |
| C14 | 0.1 uF |
| C11 | 47 uF |
| C13 | 47 uF |
| C15 | 0.1 uF |
| C16 | 0.1 uF |
| C17 | 0.1 uF |
| C18 | 0.1 uF |
| C7 | 47 uF |
| C8 | 0.001 uF |
| C9 | 0.47 uF |
| D1 | Schottky |
| D2 | D1N4148 |
| D3 | 1N6264/TO |
| D4 | D1N4148 |
| D5 | 1N6264/TO |
| D6 | 1N6264/TO |
| D7 | D1N4148 |
| L5 | VALVE |
| R10 | 1K |
| R11 | 3K |
| R12 | 510 |
| R13 | 665K |
| R14 | 510 |
| R15 | 330 |
| R16 | 330K |
| R17 | 330 |
| R18 | 9.1 |
| R19 | 1K |
| R2 | 60.4 |
| R20 | 1K |
| R21 | 330 |
| R22 | 510 |
| R23 | 510 |
| R24 | 510 |
| R25 | 330K |
| R26 | 510 |
| R27 | 510 |
| R3 | 1K |
| R4 | 3K |
| R5 | 1K |
| R6 | 1K |
| R7 | 330 |
| R8 | 510 |
| R9 | 510 |
| T1 | CURRENT SENSE_1 |
| T3 | 120 V to 24 V |
| U10 | MAX4373TESA+-ND |
| U18 | LM1458M |
| U12 | 555C |
| U13 | U6046B |
| U14 | LM340MP_5.0 |
| U16 | MAX4373TESA+-ND |
| U17 | SN74F38D |
| U4 | H11F1 |
| U7 | SN74F38D |
| R31 | 51.1 |
| R29 | 60 |
| R30 | 1K |
| R28 | 1K |
| R23 | 510 |
| R22 | 510 |
| R26 | 510 |
| R32 | 510 |
| R34 | 510 |
| R35 | 510 |
| R33 | 510 |
| R36 | 510 |
| J1 | Header |

Figure 37:
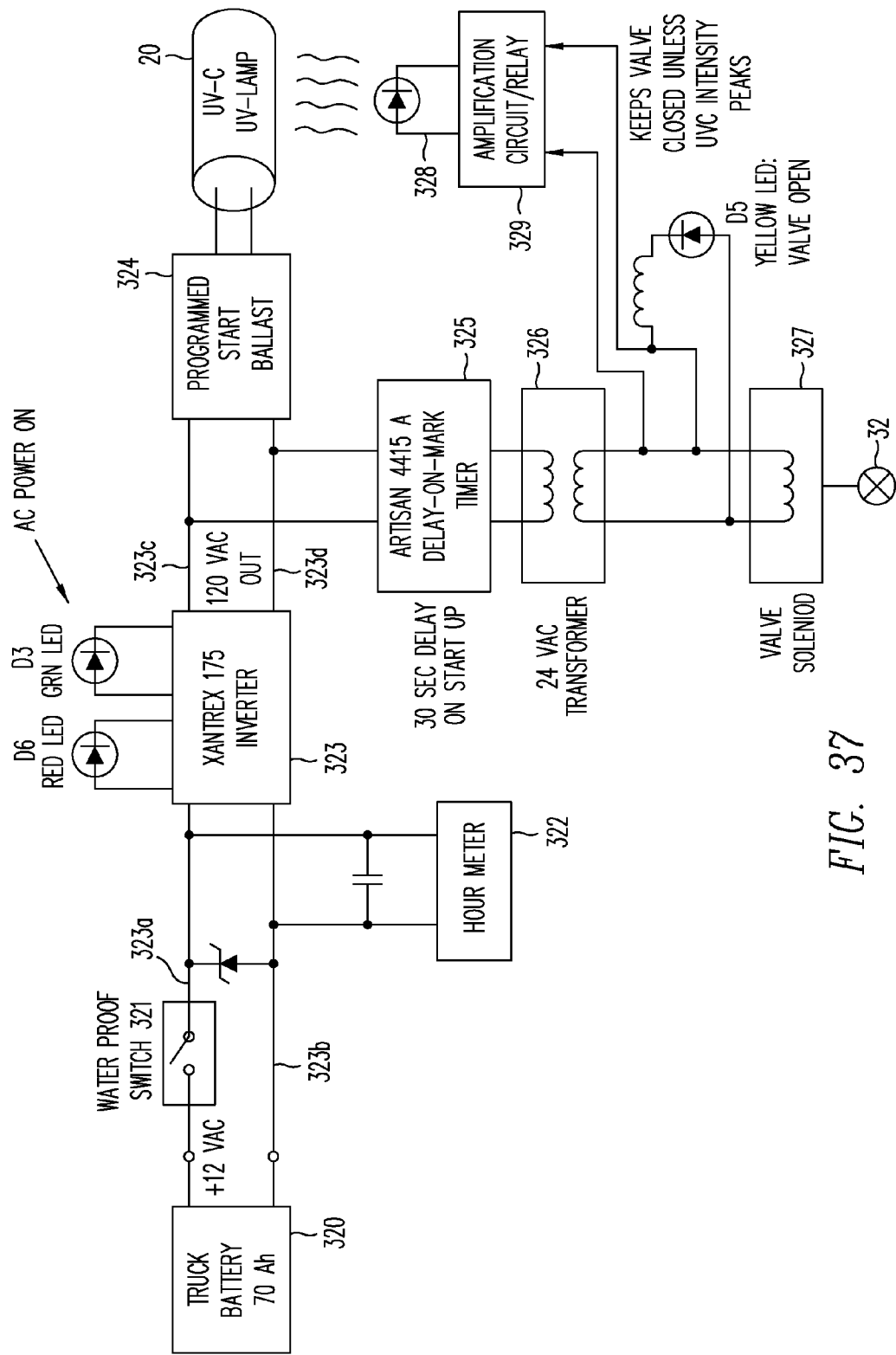
FIG. 37 shows a circuit block diagram .with a photodiode for sensing the UVC light from lamp 20.

FIG. 37 shows at the block diagram level, another embodiment of a control system for use with this invention. Waterproof switch 321 connects battery 320 (shown as a 70 amp-hour truck battery) to an inverter 323. Connected to inverter 323 is red LED D6 and green LED D3, the operation of which has been described above. An hour meter 322 is connected to the input leads 323a and 323b to inverter 323 to provide a measure of the total operating time of the system. A one hundred twenty volt (120) alternating current is output from inverter 323 to ballast 324. Ballast 324 drives lamp 20 which produces the UVC light used to purify the fluid flowing through the system. Photodiode 328 detects the intensity of the UVC light and produces an output signal which is amplified by amplifier 329. The output signal from amplifier 329 is sent to the input lead to valve solenoid 327 and turns off valve 32 when the photodiode 328 detects a drop below the minimum intensity UVC light required from lamp 20 to purify the fluid being purified. Delay timer 325 is connected to output leads 323c and 323d to receive the AC signal from inverter 323 and to delay the turning on of valve 32 for a selected time (shown in FIG. 37 as thirty (30) seconds but capable of being set to any other appropriate time required) to allow the system to purify the fluid in the system before new fluid is allowed to flow through the system. Delay timer 325 drives the input coil of transformer 326, the output coil of which is connected to drive the valve solenoid 327 and thus to turn on valve 32 when the timer sends the appropriate signal to the input coil of transformer 326.

With a digital control system, it is possible to record and save the system data and status for recall at a later time. The data for all the key variables may be sampled and recorded in a rolling record that continually rewrites itself, overwriting the oldest data first. Alternately, the data may be saved in fixed files. The data can be later accessed remotely through one or more techniques. Preferably, the system automatically transmits the data on flow and water condition to a central database over the Internet.

In addition, the system may contain an infrared port, or a Universal Serial Bus (USB) or Firewire (IEEE Standard 1394) port, or one of many possible standardized interfaces. Alternatively, the data may be retrieved through wireless means using a built in radio.

Figure 35:
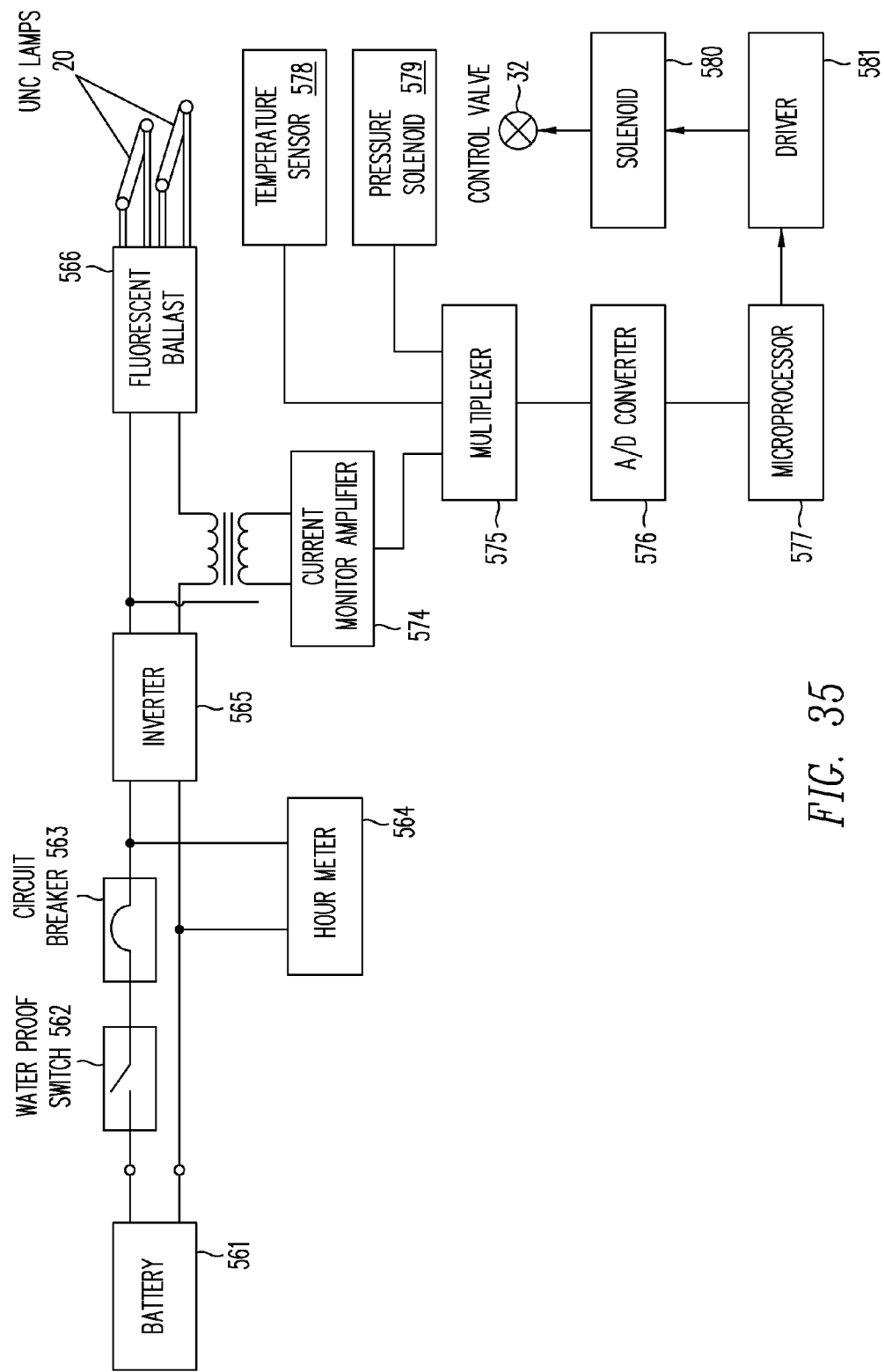
FIG. 35 shows the block schematic diagram of a digital control system.

A microprocessor 577 may control the valve 32 through a pulse width modulation (PWM) solenoid driver. FIG. 35 shows a typical schematic diagram for this circuit.

The system may alternately use a latching solenoid valve 32 designed to be turned on and off using a momentary 12 VDC pulse to reduce power consumption. The DC latching solenoid 580 does not require a constant supply of power. Instead, it uses current pulses to the solenoid 580 to open and close the valve 32.

Valve Delay Timer

The output valve 32 (FIGS. 3, 32 and 35) is closed when the system is turned off and upon start-up or restart. The valve 32 remains closed for a predetermined amount of time (40 sec for current volume from rate of system design) on initial start-up or upon restart before the output valve 32 is automatically opened. This time delay allows the UVC lamp 20 to irradiate the subchambers 22-1 through 22-N for enough time to purify the full volume of the water retained in the tube 40, thus ensuring that all the water which exits the system is fully purified even when the system is initially started or restarted. The start-up delay is implemented in the analog control system by the timer 311 shown in the circuit in FIG. 34a.

With the flow rate information above, the valve solenoid 569 (FIG. 32) may be controlled with a digital control system using pulse width modulated control to vary the valve flow rate.

For example, if the UVC light output has been reduced as measured by a current monitor or a photodiode, the valve 32 can be modulated to reduce the flow rate of the system as monitored by the flow sensors such as pressure sensors 579 (FIG. 35) in the system.

The system controller can monitor and reduce the flow if the current transformer 568 (FIG. 32) or the photodiode show that the system has decreased pathogen killing capability. The flow through the system may be stopped automatically by the control system by turning off the valve solenoid 569 (FIG. 32) or reducing the flow rate through the system by pulse width modulation of the valve solenoid 569 for proper purification level. If pressure sensors in the system detect a flow rate too high for effective pathogen elimination, possibly due to overpressurization of the input water, the control system can reduce the duty cycle of the valve solenoid 569 to slow the flow of water through the system in accordance with a predefined algorithm or look-up table embedded in the control system.

Current Monitor

The preferred embodiment of the system is equipped with a built in automatic continuous system to monitor the UVC power emitted by the germicidal lamps 20. The system may be designed to stop the flow of water from the purifier if conditions are triggered which infer that the water produced is not pure. The current monitor 574 (FIG. 35) may also be used to reduce the flow of water using PWM and a digital control system. The reduction of the lamp current below a predetermined level sufficient to kill the pathogens in the water will lead to the reduction of UVC emission by one or more of the lamps 20 and hence to the water quality not being maintained at acceptable levels. Since the UVC lamps 20 need to operate above a minimum threshold voltage and because the lamps 20 produce a fixed spectrum of frequencies, the current flow to the lamps 20 is a measure of the UVC power produced by the lamps 20 and hence a measure of the pathogenic inactivation rate of the system.

Two types of current monitoring systems have been tested with the system. The first and preferred embodiment (FIG. 35) uses a current transformer 574 to measure the AC current on the ballast input. This current monitor will show a reduced current to the lamps 20 when the lamps or ballast malfunction or when the input power level is too low. An appropriate comparator is shown in the circuit in FIGS. 34a and 34f. Alternately, the output of the current transformer may be input via an A/D converter 576 to a microprocessor 577 as shown in FIG. 35. Alternately, the current can be measured between the ballast 566 and the lamps 20, though multiple current transformers may be required.

A second embodiment uses a Hall effect sensor (not shown) to measure the current to lamps 20 at the input to the ballast 566. As in the previous embodiment, when at least one lamp 20 is not operating properly or when there is a decrease in current produced by the system or when the ballast 566 is not operating properly, this current monitor will measure a reduced current to the lamps 20 and produce a signal in response thereto which signal is input to the comparator in the circuit. Alternately, the output signal from the Hall effect sensor is input via an A/D converter to a microprocessor. Alternately, the current is measured between the lamp 20 and ballast 566, though multiple current sensors may be required with this latter approach.

With either the current transformer or Hall effect measurement technique, an analog or digital control system produces a signal to control the solenoid of the valve 32 and stop or reduce the flow when the current to the ballast 566 falls below the threshold value. An LED indicator may indicate when the current is still sufficient but near to the threshold value to alert the operator to the potential need for preventative maintenance to the system.

Photodiode Monitor

Figure 36:
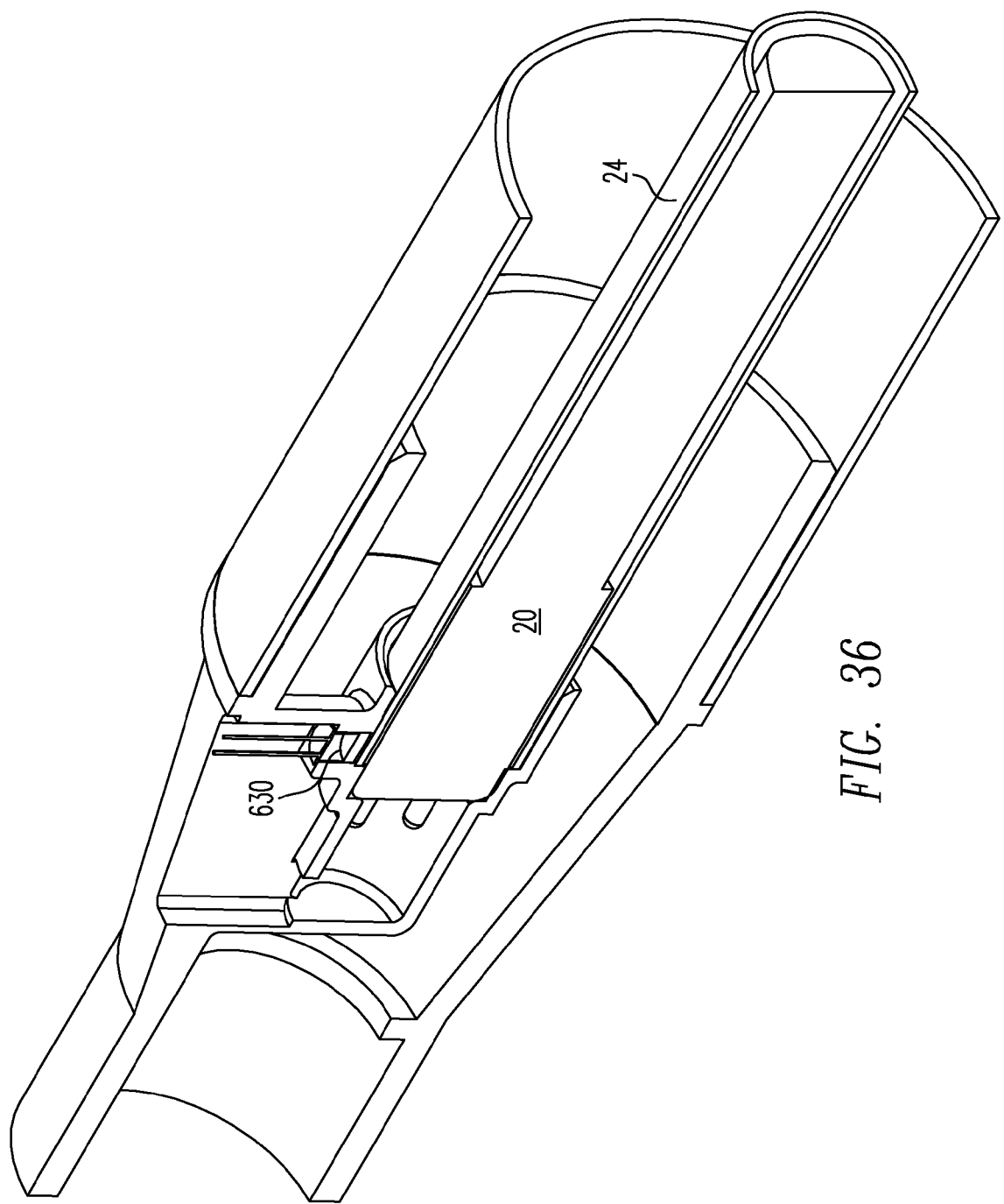
FIG. 36 shows a photodiode UVC output sensor 630 adjacent a UVC lamp.

Instead of measuring the lamp current, an alternate embodiment employs a photodiode 630 (FIG. 36) to measure actual light emitted by the UVC lamp as shown in FIG. 36. In this Figure, the photodiode 630 is exposed to light conducted by a quartz tube 24 surrounding the lamp 20, though photodiode 630 can get light directly from lamp 20 without the quartz sleeve 24.

The photodiode signal is amplified in a circuit and fed into a comparator for an analog circuit or an A/D converter in a digital control system to check for a minimum acceptable UVC light output for proper system operation. As in the approaches described above, either an analog or a digital control system produces a signal to control the solenoid of the valve and to stop the flow when the UVC light level falls below the threshold value. In the preferred embodiment, an LED indicator shows when the light level is sufficient but near to the threshold value to alert the operator to the potential need for preventative maintenance to the system.

The photodiode 630 may become partially blocked by sediment or deposits from the water, which may lead to false negative readings causing the valve to close or flow to reduce when not justified. A system using the photodiode 630 relies on an extremely sensitive amplifier that may not perform reliably under severe operating conditions and a wide range of temperatures. For these reasons, current monitoring is the preferred technique for obtaining feedback from the lamps 20. A study of the failure modes and operation of the unit shows that the critical failure modes detectable by the photodiode 630 would be detectable by the more robust and simpler current monitor 574 as shown in FIG. 35.

Turbidity Monitor

The turbidity of the water may be used as a criterion for stopping or reducing the flow of water through the system by feedback to a digital control system. The system may incorporate a nephelometric sensor to measure the turbidity of the water, using a simple phototransistor or photodiode and an LED source. If the turbidity of the water exceeds a critical value, the valve 32 (FIGS. 3, 32 and 35) may be modulated to reduce the flow rate of the system as fed back by the flow sensors. The information from the current monitor and the turbidity sensor can be combined to create a performance envelope for the system which allows the digital control system to modulate the flow according to the proper combination of UVC power, turbidity, and water temperature for a given flow rate. The performance map may be expressed as a formula within the digital control system, or preferably, held in a look up table as a set of values in a nonvolatile memory in the system.

Alternatively, the turbidity sensor is a UVC photodiode measuring the absorption of the water from the UVC emitted by the germicidal lamp or another light source.

Differential Flow Sensor

Figure 38:
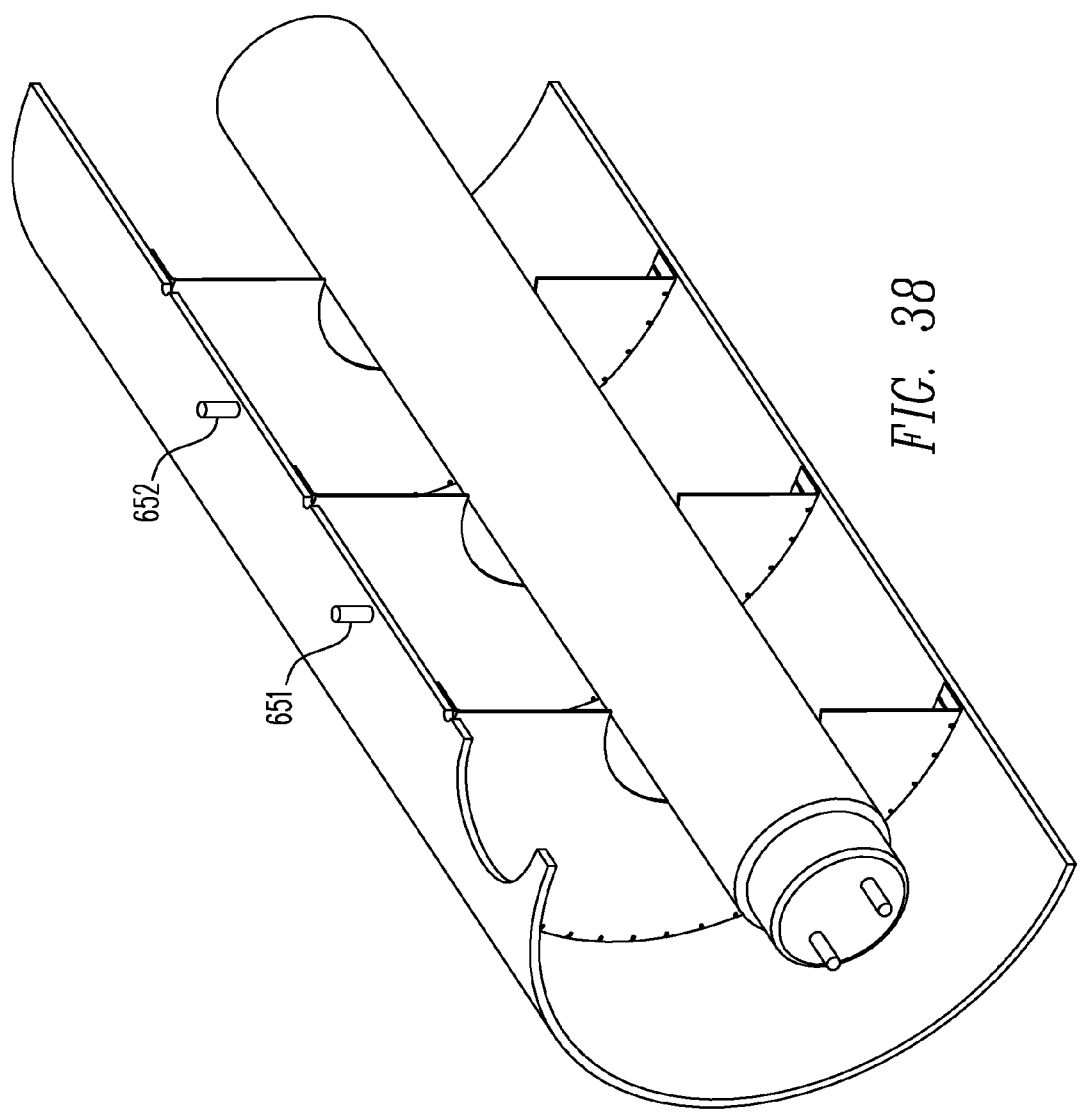
FIG. 38 shows a section view of pressure sensors integrated between baffles to help measure fluid flow.

The flow rate through the system can be measured using two or more solid state electronic pressure sensors 651 and 652 that span one or more baffles as shown in FIG. 38. The output signals from these sensors are used in a differential manner to obtain flow information through the system. The baffles cause a greater pressure drop along the length of the chamber than the chamber without the baffles, thus improving the flow measurement sensitivity. As the flow rate increases, the pressure drop across a given distance correspondingly increases so the differential pressure measured between these sensors 651 and 652 will increase.

Flow information is generated by comparing the output signal from sensors 651 and 652 in the case of an analog control system by using an analog comparator or wheatstone bridge circuit. For a digital control system, it is preferred to use a multiplexed analog-to-digital converter and compare the values from sensors 651 and 652 by embedded algorithms using an integrated microprocessor. The pressure sensors 651 and 652 are multiplexed to an A/D converter for use with a microcontroller based digital control system.

Alternately, a simple rotating flow meter or other suitable flow meter can be incorporated in the system. The flow meter can provide information to either an analog or digital control system.

Temperature Sensor

Similarly, the water temperature may be sensed by a thermocouple or thermistor or other thermal measurement device. The temperature information may be used by the digital control system to modulate the valve 32 (FIG. 32) to control the flow accordingly. At lower temperatures, more UVC power and therefore lower flow is needed to kill the pathogens.

Any of the sensors described above can be configured to communicate wirelessly with the control system as needed.

System Status Indicators

The water purification system preferentially includes indicator LEDs 25 which display the system status as shown in FIG. 3. In the preferred embodiment, a green LED glows continually when the power to the system is sufficient and the switch is turned on. The green LED glows solidly to indicate normal operation. The red LED flashes to indicate that the battery is low. The amber LED glows continuously when the valve 32 is open. The green LED blinks during the start-up delay period when the valve 32 is closed to purify the retained water volume in the system.

When a digital control system is used, an LCD or other display can be utilized to display the system status alphanumerically and allow the operator to interact with the system through menu-driven displays to alter settings in the system.

Ultrasonic Transducer in Combination with System to Clean Deposits from System.

In another aspect of the present invention, ultrasonic frequency is applied to each ultraviolet illumination subchamber as a means of removing deposits from the lamp and from tube 40. A common problem with ultraviolet purification systems is the accumulation of deposits on the surface of the ultraviolet lamp 20 or on the quartz tube 24 surrounding the lamp 20 and on the tube 40 in which lamp 20 is located. These deposits typically include biofilms, calcium deposits, and magnesium deposits. The calcium and magnesium deposits primarily result from the use of hard water in the purification process. Today, many ultraviolet purification units employ manual or automatic wipers to periodically remove these deposits from the lamp.

In this aspect of the invention, one or more ultrasonic transducers (shown in the embodiment of FIG. 42 as two transducers 1011-1 and 1011-2) are affixed to the ultraviolet tube 40. Each transducer receives power from an ultrasonic generator. When activated, each ultrasonic transducer creates pressure waves in the tube 40 which cause cavitation on surfaces of the tube 40 and the quartz cylinder 24 surrounding lamp 20. This cavitation removes biofilm deposits and calcium, magnesium and other deposits from the exposed surfaces of the quartz 24 and tube 40. The ultrasonic cleaning feature is intended to augment or replace traditional mechanical wiping. It could eliminate the need for an automated wiper arm system to clean the lamp 20.

Each transducer 1011 itself is typically fabricated from a piezoelectric material surrounded by a stainless steel housing. The transducer is connected to an ultrasonic generator. The transducer can be attached as shown in FIG. 42 to the housing of tube 40 through welding, bolting, brazing, or other methods. Ultrasonic generation systems are well-known in the art.

A single ultrasonic or sonic frequency can be used, or multiple frequencies may be used in sequence or simultaneously. Typically frequencies in the range from about 20 kHz to 120 kHz would be used. The higher frequencies generate smaller cavitation bubbles and remove smaller particles from the lamp and subchamber. Lower frequencies could be generated earlier in the cleaning sequence to remove the larger particles first. Then, higher frequencies could be generated to remove the smaller particles. Alternately, the system may use multiple frequencies simultaneously or in another sequence. If the higher ultrasonic frequencies are integer multiples of the lower frequencies, it is possible that multiple frequencies can be transmitted through the same transducers.

Using a control system, the system may automatically ultrasonically clean itself at predefined intervals. Alternately, the ultrasonic cleaning can be controlled manually. Of course, ultrasonic cleaning of a water purifier can be used with other types of purification systems including systems without baffles.

Combination with Other Filters

The UVC irradiation will kill waterborne pathogens, but may not be sufficient by itself to treat the other impurities in the water such as organic solvents, inorganic materials such as heavy metals, and pesticides. The current invention may require pre-or post- filters (not shown in the drawings) or ozone injection or hydrogen peroxide injection to remove these non-microbial contaminants.

Preferably, the water sources are measured for harmful organic compounds, inorganic compounds, heavy metals, and pesticides prior to the use of the water purification system to allow additional pre- or post-filters to be added as needed.

Sand Pre-Filter

In one embodiment, the water purifier system is used with a sand pre-filter to remove particulates down to 20 microns in size using commonly available silica sand media. Zeolite media can be used instead of sand media in the sand filter to remove even smaller particulate matter.

Alternately, the system can be used with a diatomaceous earth (DE) pre-filter in addition to or instead of a sand filter. DE pre-filters can remove particulates down to 3 microns. Alternately, a settling tank can be used instead of the sand filter or DE filter or in combination with them.

The sand filter, whether integrated into the UV unit or separate, may have a back flush valve which can be manually or automatically operated. An automatic valve would back flush the system on certain intervals that could automatically shorten or lengthen based on automatically measured cumulative water flow through the system, or the product of cumulative water flow and turbidity, using the information from embedded sensors fed back to the microcontroller.

Alternately, a very fine stainless steel screen (in one embodiment a sixty mesh stainless steel screen) is used on the inlet of the water purifier. A cone shaped or corrugated or cylindrical screen may be used to increase surface area to reduce flow resistance and to reduce clogging of this filter.

Embodiments of the present invention can be used in series with activated charcoal pre-filter or post-filter and a water softener before the reverse osmosis filter to prevent build-up on the reverse osmosis membrane.

Optionally, the system may employ a pre-filter such as a polypropylene spun bonded pre-filter. Alternatively, a fine cloth filter can be used on the inlet to filter out small particles. One or more layers of cloth may be used. The particles will become trapped by the fibers of the cloth.

Activated Carbon Pre-Filter

Another embodiment of the present invention integrates an activated carbon block filter or granular activated carbon (GAC) filter into the system either before or after the UV system to remove organic chemicals, pesticides, and other impurities which will adsorb onto the surface of the activated carbon filter.

Activated Alumina Filter

An activated alumina filter can be used to remove arsenic, phosphate, sulfate, chromate, fluoride, but not nitrate from the water. It is preferentially used as a pre-filter.

In one embodiment, the sand filters, the activated carbon filter, and the activated alumina filter are located in series in a third tube alongside the other two UVC irradiation tubes.

Alternately, a fourth parallel tube is employed as activated charcoal filter alongside the two UV tubes and the sand filter tube.

Water Softener

The system may be equipped with a water softener, either a powered salt-recharged type or a non-powered type to soften the water before entrance to the water purifier. The water softener can reduce or eliminate the precipitation of calcium and magnesium compounds which may occur on the inner surfaces of the system, possibly including the lamp or FEP coated lamp surface.

Alternate System Designs

Figure 39:
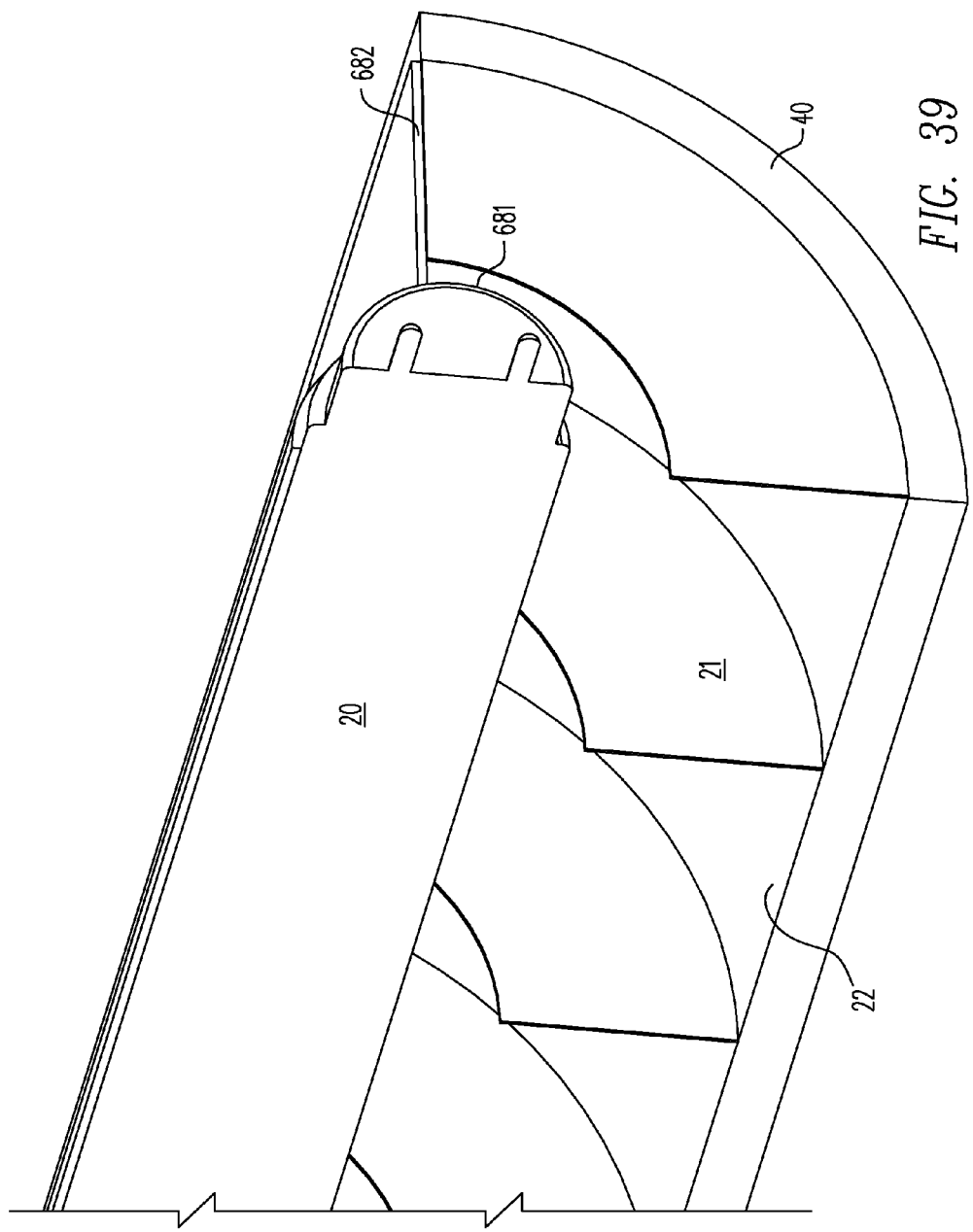
FIG. 39 shows an enlarged view of an alternate system design.

An alternate system design employs a non-submerged lamp using similar baffles as shown above to maximize the UVC irradiation of the water as described above. In this design, as shown in FIG. 39, a UVC transparent window 681 separates the lamp 20 from the set of baffles 21 and the water. This system preferentially uses a half cylinder shaped purification tube 40 to maximize the UVC irradiation of the water. Arc-shaped baffles 21 are placed in this half cylinder tube 40 with a flow annulus adjacent to the arc-shaped irradiation window 681. The top of the subchamber is preferentially angled as shown by top 682 rising at an angle from the horizontal to assist in channeling the bleed air from the system as shown. In one embodiment, the system is placed in an extruded PVC tube which is softened by heating, the components are inserted, and the PVC tube 40 is compressed to lock the baffles 21 into the wall as described previously. Alternately, a stainless steel or anodized aluminum or LDPE or HDPE or polypropylene housing is used. The system is preferentially gravity-fed, but may be pressurized to greater pressures.

The window 681 is preferentially constructed of an FEP membrane adjacent to the UVC lamp 20 over its length which separates lamp 20 from the water and a set of stainless steel baffles 21 as shown in FIG. 39. The FEP coating will reduce the tendency of organic matter to stick to the lamp 20 during the purification process. Alternatively, the window may be constructed of quartz or FEP coated quartz or FEP, PTFE, PVDF, PEI, PEEK or other UVC-resistant or UVC stabilized polymer or other material.

Figure 40:
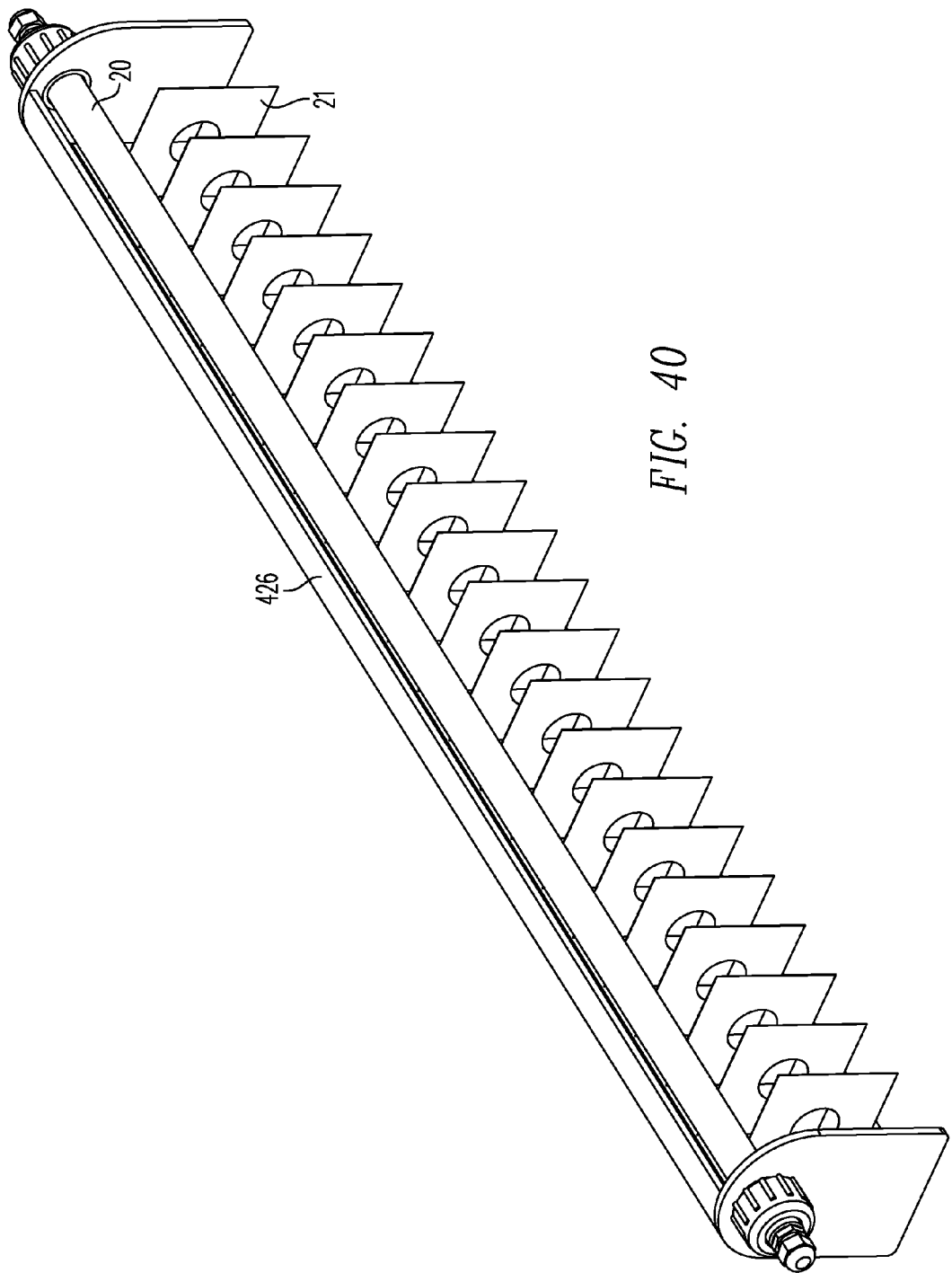
FIG. 40 shows a rectangular baffle system with the UVC light 20 above the baffles.

FIG. 40 shows the lamp 20 suspended above the baffles 21. A reflector 426 is preferentially used above and along the length of the lamp 20. The water flows through the set of baffles 21 and receives the irradiation from the lamp 20 above. A low pressure UVC lamp is preferentially used. This alternate design will protect the low pressure UVC lamps 20 from degradation of output which could occur through cooling below the optimum temperature of 40 degrees C. from flowing cold water through the preferred embodiment above. Alternately, a medium pressure UVC lamp 20 may be used. Alternately, a surface-discharge pulsed UV light source may be used.

Figure 41:
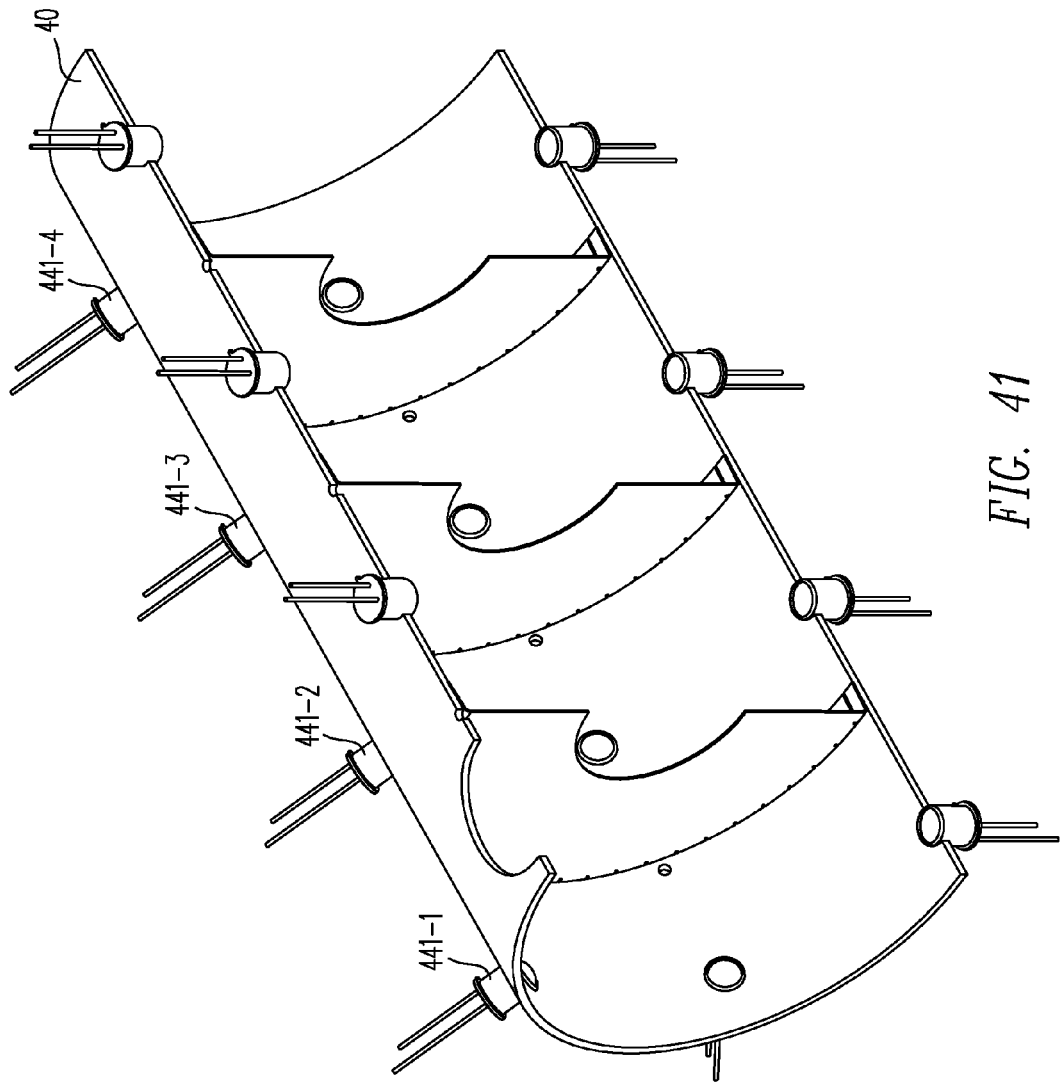
FIG. 41 shows a section view of a system with peripheral UVC LEDs.

Instead of a UVC lamp, UVC emitting LEDs may be used. As shown in FIG. 25, these LEDs 440-1 to 440-L may be simply coated with FEP, PTFE, PEI, PVDF, PEEK or other UVC-resistant polymer and placed in a row adjacent to the baffles. Alternatively, the LEDs 440 may be encased in a quartz tube or sleeve which can be FEP coated. Alternately, LEDs 441 may be placed around the circumference of the tube 40 as shown in FIG. 41. The LEDs may also be placed at the top of a curved or parabolic subchamber with baffles.

Wireless Data Transmission

The water purifier system of the present invention may be combined with wireless communications equipment to enable it to function as a node in a wireless mesh communications network. The combination of two or more of these nodes will create a wireless mesh network. Mesh networks are self-configuring systems wherein each node can relay messages on behalf of others, thus increasing the range and available bandwidth. Nodes in a mesh network will only connect with other nodes that are within a fixed range.

A battery or energy storage system may be used onboard to provide power for the communications system. The battery may be charged by the power source for the water purifier, and then discharged by the use of the communication system over a longer period of time after the water purification has been completed for the day.

Figure 48:
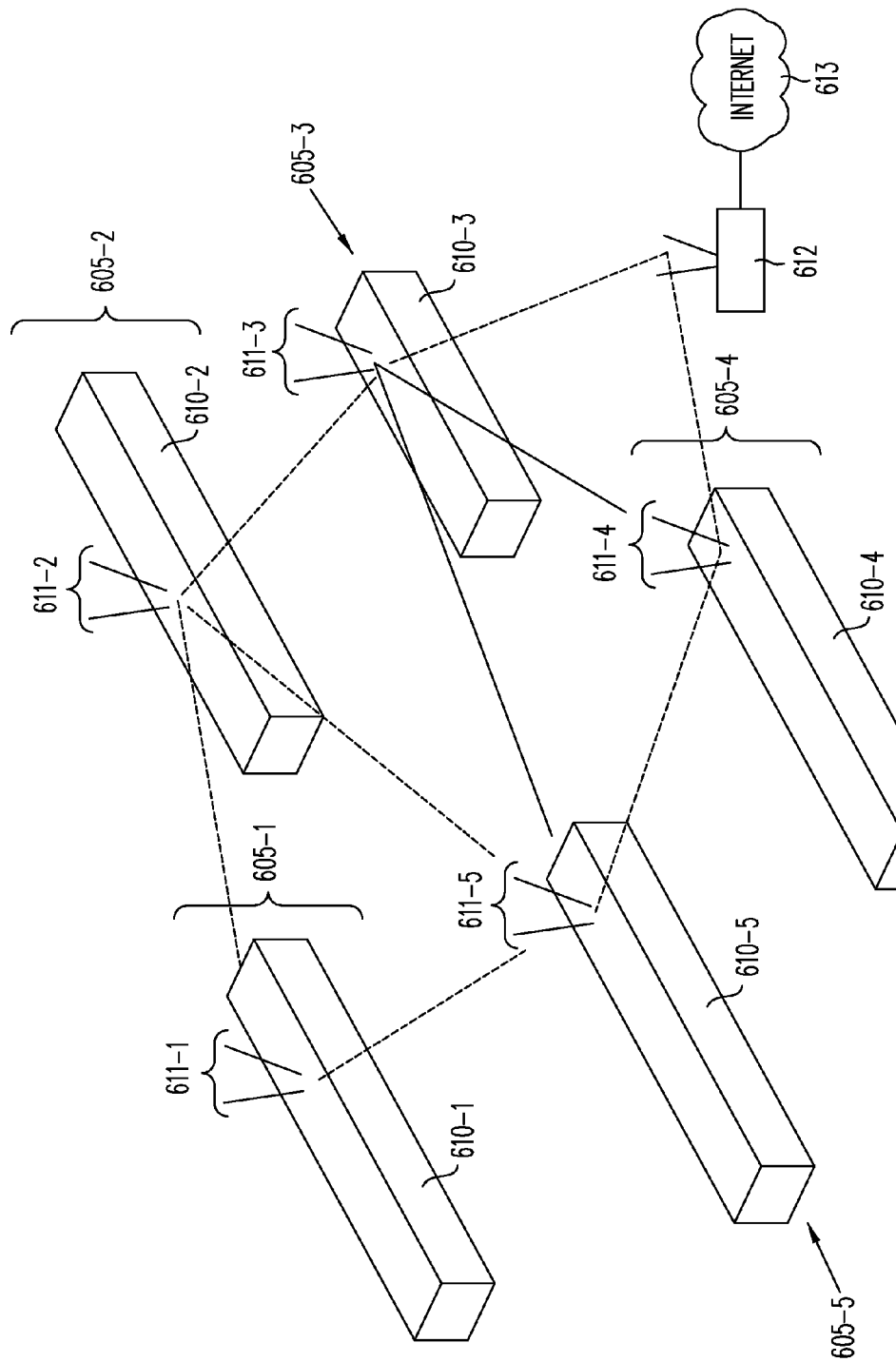
FIG. 48 shows an embodiment of this invention with a wireless network integrated with the water purification system to allow both data and voice communication between sites containing the water purification system.

In the preferred embodiment, all nodes communicate with the other in-range nodes directly, as shown in FIG. 48. Every mesh-enabled node 605 acts as a relay to further extend the network. Extension of the network may be automatic with the addition of more nodes. Therefore, as more water purification units are added to a region, the communications network automatically grows with them. The redundancy of the links enables the system to automatically detect routing problems and recover from them, making the system "self-healing" if one or more nodes go down and other nodes overlap that coverage area.

FIG. 48 shows an embodiment of such a mesh network with nodes 605-1 to 605-5 incorporating mobile wireless transmitters and receivers 610-1 to 610-5 with antennas 611-1 to 611-5. Base station 612 receives signals from selected ones of transmitters and receivers 610-1 to 610-5 and then connects these mobile transmitters and receivers to a network, such as the internet 613.

Figure 49:
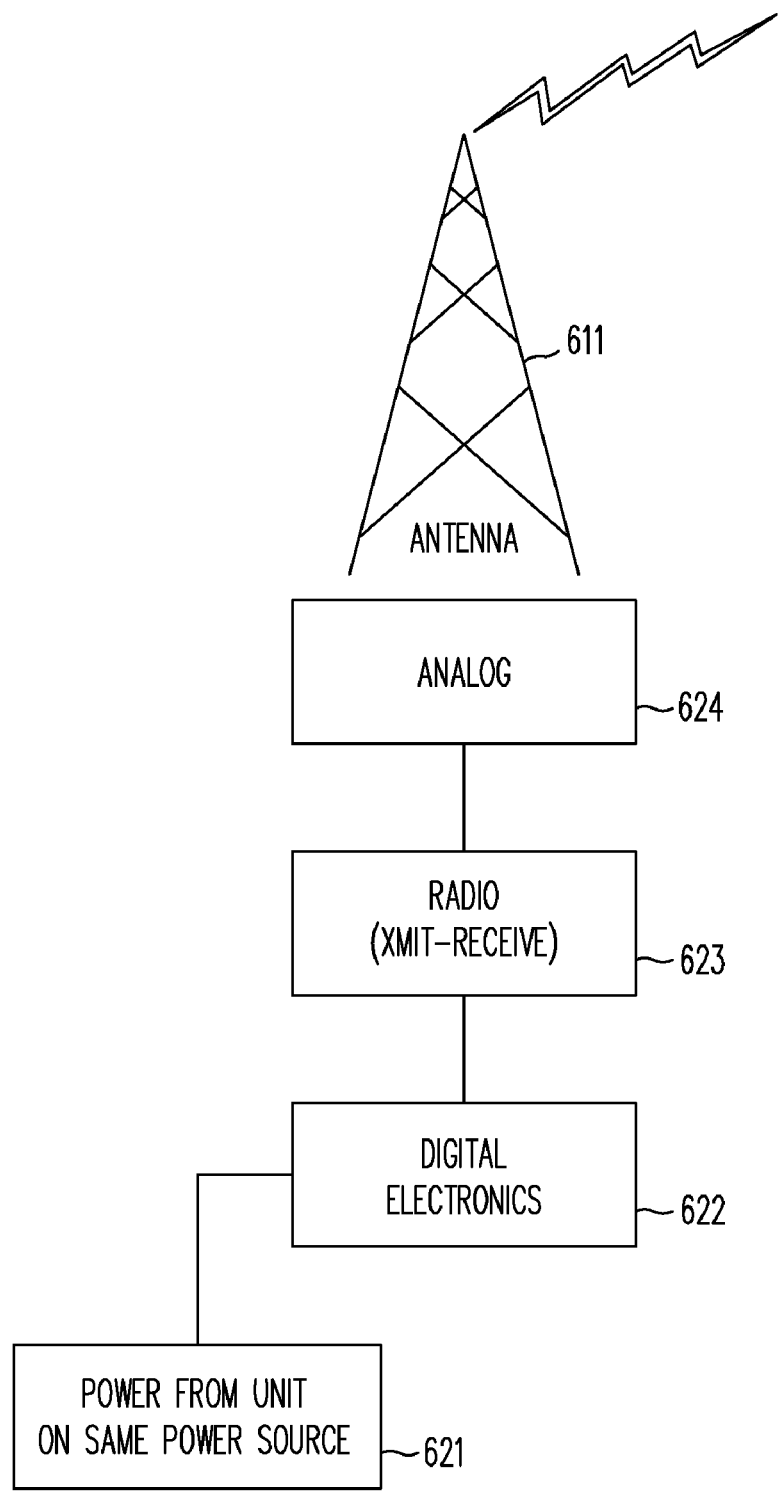
FIG. 49 shows a system block diagram for this communication system

FIG. 49 shows in block diagram form a typical wireless transmitter and receiver. Power source 621 from the water purification system of this invention provides power to the remainder of the circuitry making up the mobile wireless transmitter and receiver. Such a mobile device can include digital electronics 622 which can include RAM memory, ROM code for controlling the operation of the mobile device, and a microprocessor for controlling the receipt and transmission of information. The mobile device will also include an RF portion 623 capable of transmitting and receiving wireless signals and an amplifier 624 for amplifying both received and transmitted signals. Antenna 611 can be directional or omni-directional to allow the mobile device to send and receive signals from other mobile devices in the system and to allow the mobile device to send signals to the base station 612 (FIG. 48).

As more devices are added to the network, more bandwidth becomes available, provided that the number of transmissions in the average communication path is low enough. Repeaters may be used between nodes if distances between nodes are too large.

Data is preferrably transferred through the system from node to node in packets which contain a header with routing and other information followed by a small amount of data until each packet reaches the proper destination, where the packets are reassembled and used. Routing capabilities included in each device allow this to happen. To implement such dynamic routing capabilities, each device needs to communicate its routing information to every device it connects with. Each device then decides whether to pass the packet it received to the next device or to keep it.

Each node only needs to transmit as far as the next node. Nodes act as repeaters to transmit data from nearby nodes to peers beyond radio range, resulting in a network that can span large distances, even over rough terrain. Mesh networks are also extremely reliable, as each node may be connected to several other nodes. If one node is lost due to hardware failure or other reason, its neighbors simply find another route. It has been shown that the benefit of communicating at the highest data rate to the closest node outweighs the negative performance impact of packet forwarding in a multi-hop mesh.

Since every node on the network carries the load of every other as needed, each node must be capable of receiving and transmitting each frequency on the system. Each node must have a uniquely assigned static IP address although this may not be needed on all protocols.

The water purifier nodes may be used in combination with fixed or mobile nodes which are not part of water purifiers to create a wireless mesh network which will provide Internet access/phone service/video/data to and from the nodes.

A useful framework for describing the mesh network is the seven layer OSI model. For simplicity, here the model is reduced to three layers: physical, transport, and application layers.

Physical Layer

In the physical layer, the system consists of discrete nodes separated geographically with single- or multi-frequency capability. The nodes may be capable of point-to-point and point-to-multipoint communications to allow the system to find the best pathway through the network based on the chosen protocol.

The system may require antennas separate from the water purifier to obtain the proper range. For example, the antenna may be placed on a separate tower. High gain directional antennas may be needed due to the combination of low transmission power and long distances between some villages. In some cases, 802.11b links have been made without amplifiers that cover 200 km in distance using parabolic antennas at 11 Mbps data rates. Alternately, OFDM equipment operating in the 5.8 GHz band is used for the long distance links.

Single or multiple carrier frequencies may be used simultaneously to communicate between nodes. The multiple frequencies increase the speed of data transmission, while a single frequency would make the system easier to implement.

Any microprocessor based system with sufficient performance and systems resources may be programmed to interface with a proper radio transmitter/receiver to create a node in the wireless mesh as long as it operates on the proper frequency(ies) and protocol and has proper transmitting power, S/N ratio and antenna Alternately, the system may use a hybrid of high power/low power radios operating over two different frequencies (or sets of frequencies)—one for more local nodes and one for more distant nodes.

The communications equipment may be located on the water purifier and powered with the same power source. It may be possible to use one microcontroller to control the filter and function as the controller for the wireless node. Possibly the system may employ the Linux operating system.

Transport Layer

The transport layer enables automatic topology learning and dynamic path configuration. As part of the transport layer, auto-discovery and auto-configuration capabilities are provided with each node. Dynamic path configuration may also be provided to allow each mobile device to possibly select alternate paths for the transmission of information from the device. FIG. 49 (described above) shows one embodiment of structure which would incorporate the transport layer.

Protocols

One or more of many different techniques may be used as a protocol to format packets, determine mesh topology, and route packets in order to transfer information through the system. Currently, over seventy (70) different protocols exist for routing packets across mesh networks such as but not limited to:

IEEE Standard 802,11s—will mesh 20 to 25 nodes, low power
Locust World-will mesh 100 nodes
OSPF
AODV (Ad-Hoc On DemandDistance Vector)
DSR (Dynamic Source Routing)
HSLS (Hazy-Sighted Link State)
OLSR (Optimized Link State Routing Protocol)
PWRP (Predictive Wireless Routing Protocol)
TORA (Temporally-Ordered Routing Algorithm)

One option is to minimize the number of transmissions for the packet to reach its destination. Another option is to use statistics to determine error rate and thus determine the best routing to minimize error. This technique compares packet error rate and network conditions moment-by-moment to determine the optimal pathway for each packet. Some protocols employ routing tables which are automatically updated by the system as the network topology changes. Each packet may be transmitted with a complete specification of destination, source, size, sequence number, and priority.

802.11s adds extra functions to allow wireless nodes to discover each other and their relative locations (automatic topology learning), authenticate and establish connections, and to work out the most efficient route for a particular task.

The 802.11s standard uses auto-configuring paths between nodes over self-configuring multi-hop topologies enable automatic topology learning and dynamic path configuration.

Application Layer

Preferably, one or more nodes on the wireless mesh network is connected to the Internet. This Internet connection (see FIG. 48) can be shared among all of the clients at all of the intercommunicating nodes.

There are several methods to connect to the Internet: satellite uplink and/or downlink to transfer the data to and from the Internet. Alternately, one or more nodes may have a hardwired connection to a high speed Internet service provider using fiber optic trunk or cable modem or DSL or other high speed link to send data from the mesh network to an internet server or mail server.

Voice communications may be carried over the system using a packet-based voice communications protocol, such as SIP or another type of Voice over Internet Protocol (VoIP)[3]. By upgrading the mesh to support SIP routing, any wireless mesh network can be voice enabled in a few moments.

[3] Asterisk Phone Exchange operates over a wireless mesh already.

Preferably, voice traffic gets top priority on the mesh, so the quality of the call is not affected by the demands from broadband data users. With a VoIP mesh, customers can receive incoming calls and make outgoing calls, reaching the public telephone network, and connecting to other Internet voice users for free.

A telephone can be attached or connected by cable to the water purifier even though the telephone signal is going through packet communications and VOIP. The user interface can still look like a telephone.

The data for water collection, system status, power level, hours of use, flow rate, (even possibly built-in water quality checking and system functional status, for example, could be automatically transferred via the Internet to a website for monitoring of the system.

Data can be sent to and received from the water system. Thus one can diagnose and troubleshoot the system remotely and change settings on the system from remote locations. Data from the water purification system can be recorded in a data base that is connected to the internet. This allows central monitoring of the performance of the water purification system even if it is at a remote location.

Video may be routed in packets through the mesh either by streaming it or by sending it as a file, preferably compressed, to the destination node. A camera may be attached to the water purifier to transmit video images.

As an option a built in or attachable terminal or laptop computer or phone can be provided that may be powered by the battery powering the water purifier.

Security is also a concern since each node theoretically carries the traffic of every other node, enabling someone with evil intent to see the entire stream of packets from one or more sources and therefore reassemble and read the communication. One approach to security is to use WEP encryption. Alternately, WPA encryption is used.

Alternatively, under 802.11i—all of the nodes are controlled by a single logical administrative entity for security. One or more 802.11 radios can be allowed on each node in the mesh.

Handheld UV Water Purifier System

Another embodiment of the invention comprises a handheld water purification system consisting of a manual power source such as the squeeze handle. In this system, the user squeezes the handle repeatedly, moving a magnet in the handle in the vicinity of a coil to create a source of power. A spring in the handle automatically returns the handle to the previous position for the next power stroke. Alternately, the system could have two handles: one to hold, one to squeeze. Alternately, the system may be powered by repeatedly pressing on a foot pedal to create power through the same principle.

The power source provides power to an ultraviolet LEDs as shown in FIG. 25. The system preferentially employs a UVC LED having a 280 nm wavelength, which has been shown to be more effective on waterborne pathogens than the 253.7 nm low pressure mercury lamp. As shown in FIG. 25, the LED illuminates the water in a subchamber 22 which is preferentially constructed of stainless steel or anodized aluminum to maximize the UV energy reflection. The upper portion of the subchamber may also be covered with stainless steel or aluminum for the same reason.

An exit orifice is provided at the lower tip of the subchamber. This orifice is sized to provide a flow rate when the subchamber 22 is full which will provide sufficient UVC radiation to kill or inactivate all of the relevant bacteria, viruses, protozoa and helminthes, including the *cryptosporidium parvum* oocysts.

Other embodiments of this invention will be obvious to those skilled in the art in view of the above disclosures.

What is claimed is:

1. A fluid purification system comprising:
   a chamber through which fluid can flow, said chamber having an inlet through which fluid enters the chamber and an outlet through which fluid exits the chamber;
   a source for illuminating said chamber with ultraviolet light; and a plurality of baffles within said chamber for defining a multiplicity of subchambers within said chamber through which fluid to be purified flows from said inlet to said outlet; each subchamber being located to receive the ultraviolet light.

2. The system of claim 1 wherein said subchambers are located along said source of ultraviolet light.

3. The system of claim 1 wherein at least a portion of said source of ultraviolet light is located within each of said subchambers.

4. A water purification system comprising:
a chamber having an inlet through which water enters the chamber and an outlet through which water exits the chamber;
at least one ultraviolet light source for illuminating said chamber with ultraviolet light; and
a plurality of baffles defining a multiplicity of subchambers within said chamber through which water to be purified flows from said inlet to said outlet, said subchambers being located to receive the ultraviolet light.

5. The system of claim 4 wherein said at least one ultraviolet light source is coated with a UV transmissive material.

6. The system of claim 5 wherein said transmissive material comprises a fluoropolymer.

7. The system of claim 6 wherein said fluoropolymer comprises a material selected from the group consisting of fluoroethylenepropylene, polytetrafluoroethylene, PFA, AF, and ETFE.

8. The system of claim 4 including:
an ultrasonic generator arranged to remove deposits from said system.

9. The system of claim 8 wherein said ultrasonic generator is arranged to turn on from time-to-time during operation of said system.

10. The system of claim 9 wherein said ultrasonic generator is arranged to turn on periodically during operation of said system.

11. The system of claim 4 wherein each baffle comprises a disk with at least one opening, each disk being mounted in said chamber such that said at least one ultraviolet light source extends through said at least one opening.

12. The system of claim 11 wherein each baffle further includes a number of lips formed around the circumference of said opening.

13. The system of claim 12 wherein said lips cause water passing through said opening into a subchamber to dwell in said subchamber so as to be exposed to ultraviolet light from said source of ultraviolet light.

14. The system of claim 4 further comprising a circuit for causing a time delay between the turning on of the system and the beginning of the flow of water through the system to allow the system to purify any water dwelling in the system prior to the turning on of the system before water begins to flow through the system.

15. The system of claim 4 further comprising:
at least one sensor for sensing the ultraviolet light and for stopping the flow of water through said chamber should the ultraviolet light drop below a selected intensity.

16. The system of claim 8 further comprising:
at least one sensor for sensing the current to said at least one ultraviolet light source and for stopping the flow of water through said chamber should said current drop below a selected level.

17. The system of claim 16 further comprising:
means for turning on said ultrasonic generator in response to a signal from said sensor stopping the flow of water through said chamber.

18. The system of claim 4 further comprising:
a quartz tube surrounding each ultraviolet light source.

19. A method of purifying a fluid comprising:
providing a chamber having an inlet though which the fluid enters the chamber and an outlet through which the fluid exits the chamber, the chamber including a plurality of baffles for defining a multiplicity of subchambers within the chamber, wherein the fluid flows from the inlet to the outlet through the subchambers, the subchambers being located substantially along a source of ultraviolet light;
powering the source so as to illuminate the subchambers with ultraviolet light; and
flowing the fluid through the illuminated subchambers so that the fluid exiting through the outlet is purified.

20. Structure comprising:
an ultraviolet light source; and
an array of baffles formed of impervious material and spaced along said ultraviolet light source thereby creating subchambers along said ultraviolet light source with respect to a chamber including the subchambers, wherein the subchambers act in series to reduce the concentration of pathogens in water passed through the subchambers.

21. The structure of claim 20 wherein said baffles are substantially linearly-spaced along said ultraviolet light source.

22. The system of claim 12 wherein each baffle has at least one fluid passage near the edge of the baffle.

23. The system of claim 12 wherein each baffle includes one or more features to cause the fluid passing the baffle to flow at least in part circumferentially around the source of ultraviolet light.

24. The system of claim 23 wherein said one or more features comprises:
one or more openings in the baffle.

25. The system of claim 23 wherein each baffle is formed mainly in a plane and said one or more features comprises one or more portions of the baffle formed other than in said plane.

26. A water purification system comprising:
a UVC lamp with a ballast;
an array of baffles spaced along the UVC lamp so as to form subchambers along said UVC lamp with respect to a chamber including the subchambers, wherein the subchambers act in series to reduce the concentration of pathogens in water passed through the subchambers; and
means for monitoring lamp current or ballast current.

27. The system as in claim 26 further comprising:
means for controlling a valve through which said water being purified flows in response to a signal from said means for monitoring.

28. The system as in claim 27 wherein said means for controlling further comprises:
means for shutting off said valve thereby to prevent water from flowing through said system in response to said signal from said means for monitoring indicating that the UVC output energy has fallen below a threshold.

29. A method of using water purification systems as part of a communication network, said method comprising:
providing a plurality of electrically powered water purification systems, each system including a chamber separated by baffles into subchambers;
placing a wireless transmitter and receiver in combination with each system; and
connecting said plurality of systems to function as part of a communications network.

30. A method for controlling a water purification system, said method comprising:
- providing a chamber having an inlet through which water enters the chamber and an outlet through which water exits the chamber;
- providing at least one ultraviolet light source within said chamber for producing ultraviolet light; and
- providing in said chamber a plurality of subchambers through which water flows, said subchambers being located along said chamber such that said ultraviolet light source extends through each subchamber.

31. The method of claim 30 wherein said plurality of subchambers makes more uniform the exposure of water flowing through said chamber to said ultraviolet light, thereby to increase the kill rate of pathogens in the water compared to the kill rate of pathogens in water being treated by systems not containing the subchambers.

32. The method of claim 30 wherein providing in said chamber a plurality of subchambers comprises:
- providing a plurality of baffles defining a multiplicity of subchambers within said chamber.

33. A method comprising:
- providing a water purification system that includes: a chamber through which fluid can flow, said chamber having an inlet through which fluid enters the chamber and an outlet through which fluid exits the chamber; a source for illuminating said chamber with ultraviolet light; and a plurality of baffles within said chamber for defining a multiplicity of subchambers within said chamber through which fluid to be purified flows from said inlet to said outlet; each subchamber being located to receive the ultraviolet light; and
- generating ultrasonic waves for use in cleaning said system including said ultraviolet light source.

34. The method of claim 33 further comprising:
- placing one or more ultrasonic generators in said system so as to be capable of generating ultrasonic waves which will come in contact with selected internal portions of said system;
- measuring the build-up of impurities on one or more of said selected internal portions of said system; and
- providing a signal based on said measuring for controlling said one or more ultrasonic generators.

35. Structure comprising:
- an electrically powered water purification system including a chamber separated by baffles into subchambers; and
- a cooling system utilizing the water being purified to cool the electronics in said system.

36. A fluid purification system comprising:
- a chamber through which fluid can flow, said chamber having an inlet through which fluid enters the chamber and an outlet through which fluid exits the chamber;
- a source for illuminating said chamber with ultraviolet light; and
- a multiplicity of subchambers within said chamber through which fluid to be purified flows from said inlet to said outlet; said subchambers being located to receive said ultraviolet light.

37. The system of claim 36 wherein said subchambers increase the kill rate of pathogens in the fluid compared to the kill rate of pathogens in fluid being treated by systems not containing the subchambers.

38. The structure as in claim 4 wherein said baffles are arranged to increase the kill rate of pathogens in the water compared to the kill rate of pathogens in water being treated by systems not containing the subchambers.

39. Structure comprising:
- a plurality of electrically powered water purification systems, each system including a chamber separated by baffles into subchambers; and
- a wireless transmitter and receiver in combination with each system;
- thereby to allow said plurality of systems to function as part of a communications network.

40. A water purification system comprising:
- a UVC light source;
- an array of baffles spaced along the UVC light source so as to form subchambers along said ultraviolet light source with respect to a chamber including the subchambers, wherein the subchambers act in series to reduce the concentration of pathogens in water passed through the subchambers; and
- means for monitoring the current to said UVC light source.

* * * * *